United States Patent
Otsuka et al.

(10) Patent No.: US 6,263,089 B1
(45) Date of Patent: Jul. 17, 2001

(54) METHOD AND EQUIPMENT FOR EXTRACTING IMAGE FEATURES FROM IMAGE SEQUENCE

(75) Inventors: Kazuhiro Otsuka; Tsutomu Horikoshi; Satoshi Suzuki, all of Tokyo (JP)

(73) Assignee: Nippon Telephone and Telegraph Corporation, Tokyo (JP)

( * ) Notice: Subject to any disclaimer, the term of this patent is extended or adjusted under 35 U.S.C. 154(b) by 0 days.

(21) Appl. No.: 09/164,682

(22) Filed: Oct. 1, 1998

(30) Foreign Application Priority Data

| Oct. 3, 1997 | (JP) | 9-270263 |
| Mar. 2, 1998 | (JP) | 10-049091 |
| Mar. 2, 1998 | (JP) | 10-049092 |
| Apr. 22, 1998 | (JP) | 10-111731 |
| Apr. 22, 1998 | (JP) | 10-111732 |

(51) Int. Cl.$^7$ .................................................. G06K 9/00
(52) U.S. Cl. .......................................................... 382/107
(58) Field of Search .................................. 382/100, 107, 382/154, 191, 224, 225, 226, 227, 268, 285, 168, 276; 348/699

(56) References Cited

U.S. PATENT DOCUMENTS

| 5,109,425 | * | 4/1992 | Lawton | 382/107 |
| 5,587,927 | * | 12/1996 | Nagao et al. | 702/167 |
| 5,600,731 | * | 2/1997 | Sezan et al. | 382/107 |
| 5,633,728 | * | 5/1997 | Tachihara et al. | 356/429 |
| 5,657,402 | * | 8/1997 | Bender et al. | 382/284 |
| 5,777,690 | * | 7/1998 | Takeda et al. | 348/699 |
| 6,008,865 | * | 12/1999 | Fogel | 348/700 |

FOREIGN PATENT DOCUMENTS

| 10-197543A | 7/1998 | (JP) . |
| 10-206443A | 8/1998 | (JP) . |

OTHER PUBLICATIONS

"A Method for Estimating the Advection Velocity of Radar Echoes Using a simple Weather Radar System", Yoshio Asuma et al., Geophysical Bulletin of Hokkaido University, Sapporo, Japan, vol. 44, Oct. 1984, pp. 23–34.

"Statistical and Structural Approaches to Texture", Robert J. Haralick, Proceedings of the IEEE, vol. 67, No. 5, May 1979, pp. 786–804.

"Experiments for a Very–short–range Prediction of Snowfall Using a Simple Weather Radar System part 1, Outline and Possibility", Yoshio Asuma et al., Geophysical Bulletin of Hokkaido University, Sapporo, Japan, vol. 44, Oct. 1984, pp. 35–51.

Qualitative Recognition of Motion using Temporal Texture, Randal C. Nelson et al., CVGIP: Image Understanding, vol. 56, No. 1, Jul., pp. 78–89, 1992.

(List continued on next page.)

Primary Examiner—Andrew W. Johns
Assistant Examiner—Shervin Nakhjavan
(74) Attorney, Agent, or Firm—Kenyon & Kenyon

(57) ABSTRACT

A method and an equipment extracts image features from an image sequence in which frames indicating images are time-sequentially arranged with respect to time. The equipment includes a unit for inputting the image sequence, a unit for acquiring a motion trajectory of an image contour of a target included within a region defined by an arbitrary spatial range and time range within the input image sequence, as three-dimensional volume data drawn within a spatiotemporal space in which each of the frames is time-sequentially stacked, a unit for acquiring a plane histogram of one of tangent planes tangent to the motion trajectory and partial planes which may be included in the motion trajectory, and a unit for measuring temporal features and spatial features of the image from the acquired plane histogram. The three-dimensional volume data is obtained by forming difference images among the frames arranged in the time sequence and stacking the formed difference images. The plane histogram is obtained as votes accumulated in a plane parameter space obtained by use of the Hough transform.

76 Claims, 28 Drawing Sheets

OTHER PUBLICATIONS

"Temporal Texture Modeling", Macin Olof Szummer, M.I.T. Media Laboratory Perceptual Computing Section Technical Report, No. 346, 1995.

"Temporal Texture Modeling", Margin Szummer et al., IEEE International Conference on Image Processing, Sep. 1996.

"Image Velocity Estimation from Trajectory Surface in Spatio–temporal Space", Kazuhiro Otsuka et al., 1997 IEEE Computer Society Conference on Computer Vision and Pattern Recognition, San Juan, Puerto Rico, Jun. 17–19, 1997, pp. 200–205.

"Precipitation Forecast Based on Segmentation of Radar Echo Motion Field", Kazuhiro Otsuka et al., 28th Conference on Radar Meteorology, American Meteorological Society, Sep. 1997, pp. 218–219.

"Feature Extraction of Temporal Texture based on Spatiotemporal Motion Trajectory", Kazuhiro Otsuka et al., IAPR International Conference pattern Recognition (ICPR '98), Aug. 1998.

* cited by examiner

FIG. 22

|     | VELOCITY [pixel/frame] | DIRECTION [degree] |
|-----|------------------------|--------------------|
| (a) | 6.31                   | 94                 |
| (b) | 4.17                   | 250                |
| (c) | 5.14                   | 316                |

Velocity:
1[pixel/frame]

METHOD AND EQUIPMENT FOR EXTRACTING IMAGE FEATURES FROM IMAGE SEQUENCE

BACKGROUND OF THE INVENTION

1. Field of the Invention

The present invention generally relates to techniques for recognizing a target within an image sequence, and more particularly to a method and an equipment for extracting image features from the image sequence which describes a time sequence of frames of the image.

The image sequence refers to an image which is obtained from a video camera, weather radar equipment, remote sensing or the like, for the purposes of monitoring people, traffic and the like, controlling fabrication processes, analyzing or predicting natural phenomena such as the weather.

2. Background Art

Local (for example, several tens to several hundreds of km$^2$) and short-term (for example, 5 minutes to several hours) precipitation phenomena such as heavy rain, heavy snow and thunderstorm have yet to be elucidated completely. However, the effects of the local and short-term precipitation phenomena on daily lives and various industrial activities are large, and it is an important task to predict the precipitation phenomena.

Conventionally, in order to forecast such local precipitation phenomena, an expert such as a meteorologist visually specifies the phenomena from an observed weather radar image and creates a weather forecast. In addition, the weather forecast is created by analyzing a motion of an echo pattern within a weather radar image, and referring to a predicted echo image which is obtained by predicting a future echo pattern. The former prediction is based on the regularity of the weather phenomena acquired by the expert from past experiences, and requires years of skill. On the other hand, according to the latter prediction using image analysis, it is assumed in most cases that the phenomenon of immediately preceding several hours is maintained, and it is thus impossible to follow a rapid change in the phenomenon even though the forecast most expected to predict such a rapid change. Furthermore, because it is impossible to satisfactorily represent the phenomena such as an accurate moving velocity, appearance, disappearance, deformation and the like of a precipitation region, there is a problem in that the prediction accuracy is insufficient.

Accordingly, as one method of making an improvement with respect to the above described problem, it is conceivable to utilize a repeatability of the weather phenomena that "similar weather phenomena occur repeatedly", and to automatically retrieve past weather radar images with similar phenomenons based on the weather radar image, so as to present the similar past weather radar images to the expert. Alternatively, it is conceivable to categorize the weather radar images into categories of the weather phenomena, and to select and apply a prediction technique suited for each specified weather phenomenon. In order to realize such methods, it is necessary to extract an image feature value (hereinafter also simply referred to as an image feature) from the weather radar image which is an image sequence data.

Conventionally, as methods of extracting the image feature of the image sequence, texture analysis techniques which obtain the features of a texture within a still image, and motion estimation techniques which obtain a displacement quantity of the image pattern between frames of the image sequence have been proposed.

For example, Robert M. Haralick, "Statistical and Structural Approaches to Texture", Proceedings of the IEEE, Vol.67, No.5, May 1979 proposes a statistical texture analysis which is one approach of the conventional texture analysis technique. According to this statistical texture analysis, statistics such as "a frequency of existence of a combination of a certain pixel and another pixel located 3 pixels to the right of the certain pixel having a luminance difference of 1 between the certain pixel and the other pixel" is calculated, and the image features are extracted. This statistical texture analysis is used to detect a difference in two-dimensional image features such as a pattern (called "texture") on the image surface obtained by a repetition of basic graphic elements. More particularly, a set of basic elements called primitives is first obtained from the image of 1 frame of the image sequence by a process such as image binarization. Next, a spatial feature such as directionality is calculated as the statistics such as the direction and length of an edge of each primitive. In addition, the spatial feature such as the regularity of the above described repetition of the primitives is calculated from relative position vectors among the primitives.

The image feature proposed by Robert M. Haralick referred above includes a feature value which is defined from a co-occurrence matrix of the image gray level. The co-occurrence matrix is a matrix having as its element a probability $P_\delta(i, j)$, $(i, j=0, 1, \ldots, n-1)$ that a point which is separated by a constant displacement $\delta=(r, \theta)$ from a point having a gray level (or brightness or intensity) i in the image has a gray level j. For example, feature values such as those described by the following formulas (0.1) and (0.2) can be calculated from the co-occurrence matrix, where $\delta$ is set to r=1, $\theta$=0 (deg), for example.

$$\text{angular second moment} = \sum_{i=0}^{n-1}\sum_{j=0}^{n-1} \{P_\delta(i, j)\}^2 \tag{0.1}$$

$$\text{entropy} = -\sum_{i=0}^{n-1}\sum_{j=0}^{n-1} P_\delta(i, j) \cdot \log\{P_\delta(i, j)\} \tag{0.2}$$

The angular second moment described by the formula (0.1) represents the concentration and distribution of the elements of the co-occurrence matrix, and it is possible to measure the uniformity of the texture. Such a feature value is used to analyze the geographical features from an air photograph and sandstone. However, in general, the feature value obtained from the co-occurrence matrix is in many cases unclear as to what is being physically measured.

According to the conventional technique using the texture analysis, each frame of the image sequence is treated as an independent image. For this reason, no measurement is made with respect to the features related to the motion, although the motion is an essential element in determining the features of the image sequence.

On the other hand, as conventional motion estimation methods, Yoshio Asuma et al., "A Method for Estimating the Advection Velocity of Radar Echoes Using a Simple Weather Radar System", Geophysical Bulletin of Hokkaido University, Sapporo, Japan, Vol.44, October 1984, pp.23–34 or Yoshio Asuma et al., "Short-Term Prediction Experiment (Part 1) of Snow Precipitation Using a Simple Weather Radar System", Geophysical Bulletin of Hokkaido University, Sapporo, Japan, Vol.44, October 1984, pp.35–51 propose methods of obtaining 2 frames of the image sequence, matching each small region within the frames, and measuring the motion (velocity component) of a target included in the small region, for example. These proposed methods use the images of 2 different frames of the image sequence. First, a best matching position where a certain region (normally, a square region) within the image of one frame best matches the image of the other frame is searched. Next, the moving velocity of the object within the target region is estimated from a displacement between the 2 frames and the frame interval of the 2 frames. A cross-correlation coefficient of the image gray level value is used to describe the degree of matching of the 2 image regions. When the gray level distributions within the 2 image regions are respectively denoted by $I_1(i, j)$ and $I_2(i, j)$, the cross-correlation coefficient can be: calculated from the following formulas (0.3), (0.4) and (0.5), where M and N indicate the sizes of the 2 image regions.

$$\sigma = \left[\sum_{i=1}^{M}\sum_{j=1}^{N}(I_1(i, j)I_2(i, j) - MN\bar{I}_1\bar{I}_2)\right] / \tag{0.3}$$

$$\left[\left(\sum_{i=1}^{M}\sum_{j=1}^{N}I_1(i, j)^2 - MN\bar{I}_1^2\right)\left(\sum_{i=1}^{M}\sum_{j=1}^{N}I_2(i, j)^2 - MN\bar{I}_2^2\right)\right]^{\frac{1}{2}}$$

$$\bar{I}_1 = \left[\sum_{i=1}^{M}\sum_{j=1}^{N}I_1(i, j)\right] / (MN) \tag{0.4}$$

$$\bar{I}_2 = \left[\sum_{i=1}^{M}\sum_{j=1}^{N}I_2(i, j)\right] / (MN) \tag{0.5}$$

The cross-correlation coefficient is calculated while shifting the position of one image region on the image, and a search is made for a displacement (K, L) which makes the cross-correlation coefficient a maximum. Based on the displacement (K, L) which is obtained, moving velocity components can be calculated from the following formulas (0.6) and (0.7), where $V_x$ and $V_y$ respectively denote a x-component and a y-component of the velocity component, and Δ denotes the frame interval. If adjacent frames are used, Δ=1. In addition, the obtained velocity uses the units "pixels/frame".

$$V_x = K/\Delta \tag{0.6}$$

$$V_y = L/\Delta \tag{0.7}$$

The above described method calculates the moving velocity using an assumption that the target within the block where the matching is carried out does not change shape with time and translates uniformly. However, the calculated moving velocity does not sufficiently reflect the features of the target non-rigid body which appears and disappears and locally includes various motion components. According to the method of measuring the velocity component from the image sequence, it is only possible to measure the velocity component such as the translation of the target. In addition, it is impossible to measure the spatial features such as the shape and surface texture of the target within the image sequence, and the arrangement of the image elements.

Furthermore, Japanese Laid-Open Patent Applications No.10-197543 and No.10-206443 propose methods of detecting a motion trajectory which has a surface shape and is drawn by the edge or contour of the target within the image plane in a space (hereinafter also referred to as a spatiotemporal space) which is formed when the image sequence is stacked in the time-base direction, and measuring the motion (velocity component) of the target from the directions of intersection lines formed by a plurality of different tangent planes tangent to the motion trajectory.

According to the method of measuring the motion of the target in the spatiotemporal space, the Hough transform (also called voting) is first used, for example, and the spatiotemporal space image is transformed into a parameter space which represents the velocity component (direction and magnitude of the velocity) of the target object. Next, a peak of the distribution within the parameter space is detected, and the velocity component of the target object is obtained from the peak coordinate values. In this method of measuring the motion of the target, it is known that the most dominant translational velocity component within the target region can be acquired robustiously with respect to noise and occlusion.

Furthermore, as a conventional method of detecting a dynamic target within the image sequence and measuring the motion of the target, a method based on a gradient of the local gray level value is also known.

According to the conventional texture analysis technique, each frame of the image sequence is treated as an independent image, and thus, it is impossible to measure the features related to the motion which is an essential element of the features of the image sequence. In addition, since this conventional texture analysis technique extracts the features for each frame, it is impossible to distinguish the dynamic target and the background, thereby being easily affected by concealment, that is, occlusion and noise. As a result, it is difficult to stably extract the space features of the dynamic target.

Moreover, according to the above described conventional method of measuring the velocity component from the image sequence, it is only possible to measure the velocity component such as the translation of the target, and it is impossible to measure the features such as the shape and the surface texture of the target within the image sequence. In addition, according to the conventional method of measuring the velocity component, it is assumed that a single and only conspicuous motion component exists in the region of the image sequence of interest. For this reason, if a plurality of objects having different motions coexist in the same region, it is impossible to accurately estimate the velocity component included in the image sequence.

On the other hand, in the case of the conventional method of measuring the motion of the dynamic target, it is assumed that the continuity of the target motion and the unchangeability of the target shape are maintained. For this reason, in a situation where an occluding object exists between an observer and the moving target and the target becomes visible and invisible, it is difficult to accurately measure the target motion. In such a situation which is often referred to as an occlusion state, information such as the existence of the occlusion, the degree of occlusion and the position of the occlusion so as to realize a highly accurate measurement of the motion. However, in the situation where the occlusion occurs, the moving target which is to be observed appears, disappears and re-appears, thereby making it difficult to track the target, and from the practical point of view, it is impossible to acquire information related to the occlusion.

An image sequence such as a weather radar image obtained from a weather radar equipment is an example of a target which has an indefinite shape, includes a non-rigid body which appears and disappears, and is characterized by the motion within the image. According to the conventional technique, it is difficult to obtain the features peculiar to such an image sequence. The reason for this difficulty is that, essentially, the features peculiar to the above described image sequence cannot be obtained from the image features obtained from a single image frame or 2 image frames.

Research related to the motion pattern which changes with time, that is, the temporal texture, is introduced in Randal C. Nelson and Ramprasad Polana (Nelson et al.), "Qualitative Recognition of Motion Using Temporal Texture", CVGIP: Image Understanding, Vol.56, No.1, July, pp.78–89, 1992, and Martin Szummer, "Temporal Texture Modeling", M.I.T. Media Laboratory Perceptual Computing Section Technical Report No.346, 1995, for example.

Nelson et al. define feature values such as the non-uniformity of the flow direction using statistics calculated from an optical flow field. For example, these feature values are extracted in the following manner. First, a normal flow, which is a component in a direction perpendicular to a gray level gradient within components of the optical flow, is obtained for each pixel within the image. Next, a value obtained by dividing an average value of the magnitudes of the normal flows by a standard deviation is calculated or, values of positive and negative curls and divergence of the flow are calculated or, the direction of the flow is made discrete in 8 directions, and a histogram is thereafter created, and the statistics of the absolute deviation is calculated from the uniform distribution.

The feature value which is obtained in this manner has an advantage in that the value does not change with respect to the illumination and color. However, this feature value cannot sufficiently represent information related to the shape, and there is a problem in that the optical flow itself cannot be accurately estimated. The measures taken with respect to the phenomena such as the appearance and disappearance of the target are also insufficient.

On the other hand, Martin Szummer and Rosalind W. Picard, "Temporal Texture Modeling", IEEE International Conference on Image Processing, September 1996 proposes a method of modeling temporal texture using a spatiotemporal auto regressive model.

In the spatiotemporal auto regressive model, the value of each pixel is represented, spatially and time-wise, by a linear combination of the values of a plurality of surrounding pixels, as described by the following formula (0.8), where s(x, y, t) denotes a luminance value of the image sequence, a(x, y, t) denotes a Gaussian white noise, and $\Delta x_i$, $\Delta y_i$ and $\Delta t_i$ denote neighboring pixels.

$$s(x, y, t) = \sum_{i=1}^{p} \phi_i \delta(x + \Delta x_i, y + \Delta y_i, t + \Delta t_i) + a(x, y, t) \qquad (0.8)$$

A model parameter $\phi_i$ is estimated from the input image sequence using the method of least squares. It may be regarded that the estimated model parameter $\phi_i$ represents the temporal and spatial features of the input pattern. A pattern recognition or the like is made using this model parameter $\phi_i$.

However, since this technique uses the local gray level value of the image, the modeling is easily affected by the change in illumination and noise added to the image. In addition, the physical meaning or significance of the obtained model parameter $\phi_i$ is unclear. Further, because the modeling is based on the image gray level, there is a disadvantage in that the structural features of the image cannot be clearly obtained.

Therefore, the echo pattern included within the weather radar image is a motion pattern of a non-rigid body which repeats appearing and disappearing, and it is difficult to represent the features of such a motion pattern using the conventionally proposed techniques. Accordingly, there are demands to realize a method and an equipment for extracting image features which can represent the features of the motion pattern of the non-rigid body which repeats appearing and disappearing and is included in the image. In addition, it is expected that the image feature of the motion pattern of the non-rigid body is also effective with respect to retrieval, indexing and the like of a general video database or the like.

SUMMARY OF THE INVENTION

Accordingly, it is a general object of the present invention to provide a novel and useful method and equipment for extracting image features from image sequence, in which the problems described above are eliminated and the above described demands are satisfied.

Another and more specific object of the present invention is to provide a method for extracting image features from image sequence, which can obtain both spatial features and temporal features which are required as features of the temporal texture. It is also an object of the present invention to provide an equipment for extracting image features from image sequence, which uses the method for extracting image features from the image sequence. It is also an object of the present invention to provide a recording medium recorded with an image sequence feature extraction program.

The above described objects of the present invention can be achieved by each of the following sub-goals or, an arbitrary combination of the sub-goals.

A first sub-goal of the present invention is to provide a technique for measuring from a plurality of frames within an image sequence, image features of images including target shapes and patterns, motion features, and complex non-rigid bodies which appear and disappear.

A second sub-goal of the present invention is to provide a technique for stably extracting spatial features of a dynamic target within an image sequence.

A third sub-goal of the present invention is to provide a technique for estimating, from an image sequence which includes a plurality of objects having different motion, a plurality of velocity components corresponding to each of the moving objects within the image sequence.

A fourth sub-goal of the present invention is to provide a technique for extracting, from an image sequence, information related to complex motion caused by appearance and disappearance of a target and a non-rigidity of the target.

A fifth sub-goal of the present invention is to provide a technique for detecting an occlusion of a dynamic target within an image sequence.

In the present invention, in order to obtain spatial features such as shape and arrangement of image elements and temporal features such as motion and occlusion, a motion trajectory is extracted from within a spatiotemporal space image which is obtained from a plurality of frames of a moving image. The spatiotemporal space image is a volume which is obtained by successively stacking each of the frames of an image sequence in a time-base direction, and a trajectory drawn by each point of a target within the spatiotemporal space is referred to as the motion trajectory. By use of the motion trajectory, it is possible to obtain a velocity of the target from a direction of the motion trajectory within the spatiotemporal space. Particularly in a case where a contour or edge is used as each point of the target, the moving contour draws a motion trajectory which has a surface shape (hereinafter referred to as a trajectory surface)

within the spatiotemporal space. In the present invention, a tangent plane which is tangent to this trajectory surface or, a partial plane which is a portion of the trajectory surface, is regarded as a basic element of feature representation.

Hence, in order to achieve the first sub-goal described above, a method according to the present invention for extracting image features from an image sequence in which frames describing a spatial image are arranged with respect to time, includes:

a step of inputting the image sequence,
  a step of acquiring, a motion trajectory of an image contour included within a region which is defined by an arbitrary space range and time range within the input image sequence, as three-dimensional volume data drawn within a spatiotemporal space in which each of the frames are stacked in time sequence, and
  a step of measuring temporal features and spatial features of the image from the motion trajectory.

The following advantages can be obtained according to the present invention by use of the motion trajectory when measuring the image features. In other words, the features such as the movement, shape, deformation, position, appearance and disappearance of a target within the image are fully described as characteristics of the trajectory surface, and can be comprehended as the three-dimensional volume data. As a result, it is possible to simultaneously represent the spatial image features and temporal image features.

In addition, when measuring the temporal features and the spatial features of the image from the motion trajectory in the present invention, a histogram of one of tangent planes which are tangent to the motion trajectory and partial planes which may be included in the motion trajectory is acquired, and the temporal features and the spatial features of the image are measured from the acquired histogram of the planes.

It is advantageous to use the histogram of the tangent planes or the partial planes, because the temporal features and the spatial features can be measured robustiously with respect to the noise and the occlusion. Particularly, by acquiring a histogram of intersection lines of the tangent planes from the histogram of the tangent planes, it becomes possible to locally obtain a most dominant velocity component even from a target which is a non-rigid body such as a temporal structure and deforms, appears and disappears.

The advantages of obtaining, from the motion trajectory, the histogram of the tangent planes of the motion trajectory when measuring the image features, are as follows. That is, a distribution of motion components (to be more accurate, normal velocity components) of a target included in a target spatiotemporal space can be measured stably and accurately even from an intermittent motion trajectory caused by appearance and disappearance of the target, occlusion and noise. The normal velocity component is a velocity component in a direction perpendicular to a direction of a tangent line at a point on a contour.

In addition, since information related to the shape of the contour and the arrangement of the image elements is obtained as the histogram of the tangent planes, together with the measurement of the motion component, it becomes possible to also measure the spatial features.

A simplest method of obtaining the normal velocity component calculates a local gradient of an image gray level component. In this case, the features of local surfaces obtained from among adjacent pixels or the like are extremely sensitive to the deformation of the target. For this reason, it is difficult to acquire the normal velocity component with a high accuracy. On the other hand, according to the method of the present invention which obtains the histogram of the tangent planes of the motion trajectory, it is possible to obtain a likelihood that an original motion exists from the degree of the tangent planes being tangent to the motion trajectory, even in a case where motion trajectory is intermittent (for example, a case where a point moves while repeating ON and OFF states). This degree of the tangent planes being tangent to the motion trajectory can be obtained from a weighted sum total of gray level values of a number of pixels of the motion trajectory where the tangent plane passes within the spatiotemporal difference image.

According to a first embodiment of the present invention, attention is drawn to graphics or a set of pixels included within a region having an arbitrary spatial range and a time range within an image sequence, that is, attention is drawn to a target or an edge or contour of the target. When each of the frames within the image sequence are successively stacked in the time-base direction, it is possible to obtain a motion trajectory drawn within the spatiotemporal space by the target or the edge or contour of the target. Next, by measuring the image features of the image sequence from the features of the motion trajectory such as the shape, position and direction, the features (spatial features) such as the surface shape of the target within the image sequence are measured together with information (temporal features) related to the motion which is an essential element of the features of the image sequence. By extracting the contour of the moving target and defining feature values based on the distribution of the tangent planes which are tangent to the motion trajectory, it becomes possible to clarify the significance of the defined features and to obtain structural features of the image.

In addition, in the first embodiment of the present invention, the histogram of the tangent planes tangent to the motion trajectory or the histogram of the partial planes forming the motion trajectory is obtained as a distribution of votes accumulated in a parameter space (voting space) which is obtained by a three-dimensional Hough transform, for example. As a result, it is possible to obtain a histogram related to the directions of the contour and edge of the target, and to obtain information related to the shape of the target from this histogram. In addition, by investigating the direction of the intersection lines from the plurality of different tangent planes, it is possible to simultaneously obtain the velocity components in the image of the target.

The three-dimensional Hough transform calculates the weighted sum total of the gray level values of the number of pixels of the motion trajectory where the tangent plane passes within the spatiotemporal difference image, with respect to parameters $\theta$, $\phi$ and $\rho$ of each plane. By using the Hough transform to obtain the distribution of the tangent planes of the motion trajectory, there is an advantage in that the distribution of the tangent planes can be obtained robustiously with respect to the noise and the occlusion. The Hough transform takes into consideration, with respect to each of the pixels forming the motion trajectory, all of the planes which may pass the pixels. In addition, an operation of increasing the value of the element within the parameter space corresponding to the set of the planes by the value of the pixel is repeated with respect to all of the pixels. Thus, even if a portion of the pixels are missing, the undesirable effects with respect to the accuracy of the tangent planes as a whole are suppressed, and the distribution of the tangent planes can be measured stably.

In the first embodiment of the present invention, the image features are extracted from the motion trajectory spanning a plurality of frames. As a result, it is possible to extract the features robustiously with respect to an external disturbance which occurs is a burst manner in only a single frame. In addition, the dominant velocity components and other motions (appearance, disappearance and the like) can be detected separately, and various information related to the motion can be obtained by obtaining a combination of the motions and the frequency of the motions.

Furthermore, the first embodiment of the present invention utilizes the histogram of the intersection lines in order to obtain the dominant translational velocity components. In a case where the target translates uniformly within a certain spatiotemporal space region, 2 mutually non-parallel tangent planes tangent to the trajectory surface have a unique intersection lines. This intersection line has a characteristic such that the direction of this intersection line matches a moving direction of the target within the spatiotemporal space. Hence, a histogram of the directions of the intersection lines made up of various combinations of the tangent planes included within the spatiotemporal space region is obtained. Velocity components corresponding to the directions of the intersection lines indicating the most frequent values within the histogram are obtained as the dominant translational velocity components within the spatiotemporal space region. For this reason, in a case where the tangent plane is partially occluded and a portion of the tangent plane disappears or, even in a case where the noise exists, there is an advantage in that the translational velocity components can be obtained in a relatively stable manner. Random noise has the effect of uniformly increasing the distribution of the tangent planes. Hence, it is possible to reduce the effect of the estimated velocity components becoming different from the original velocity components due to the random noise.

Moreover, according to the present invention, in order to achieve the second sub-goal described above, the spatial features such as the strength of the directionality and the scattering (or concentration) of the contour of the target which. moves at the velocity estimated from the histogram of the tangent planes as described above are obtained. Hence, the distribution of the tangent planes corresponding to the contour moving at the estimated velocity component, that is, the partial space of the parameter space of the tangent planes, is extracted, and used for the measurement of the spatial features. The advantages of using the histogram of the tangent planes corresponding to the contour which moves at a certain velocity component in order to measure the spatial image features are that it is possible to select only a target which moves at a specific translational velocity component and to extract the spatial features of the selected target.

In the second embodiment of the present invention, the contour and the edge of the target within the. image sequence is transformed into a motion trajectory drawn within the spatiotemporal space. For this reason, it is possible to simultaneously comprehend the spatial features such as the shape and the arrangement (or orientation) of the target and the temporal features such as the velocity component. As a result, it is not only possible to obtain the dominant translational velocity of the target, but to also extract the spatial features of the target from the tangent planes corresponding to the contour and the edge of the target.

Further, in the second embodiment of the present invention, the contour and the edge within the image are treated as one group in a case where the contour and the edge are arranged discretely and linearly. Consequently, it is possible to extract the image features by taking into account the effects of grouping by the human senses.

The feature values of the strength of the directionality extracted in the second embodiment of the present invention is one of spatial feature values (pattern, texture) of the pattern. The strength of the directionality describes the degree of the strength of the directionality of the contour of the pattern or, the arrangement of the contour. The feature value of the strength of the directionality becomes large in the case of a pattern having many linear contours and contour arrangements. On the other hand, the feature value of the strength of the directionality becomes small in the case of a pattern in which contours in various directions coexist. For example, in the second embodiment of the present invention, the strength of the directionality is defined to be large when only a straight line in one direction exists within the target image region and to be small in the case of a circle in which components in all directions uniformly exist within the target image region.

In addition, the feature value of the concentration of the contour is also one spatial feature value of the pattern, and describes the degree of concentration of the contour. The concentration becomes large for a fine image, and becomes small for an image having clear edges such as the case of a line drawing.

The third sub-goal of the present invention can be achieved by acquiring a plurality of relatively dominant velocity components based on a histogram of the intersection lines of the tangent planes which are obtained as described above, and measuring the motion of the plurality of targets.

In a third embodiment of the present invention, a histogram of the tangent planes which are tangent to the trajectory surface drawn within the spatiotemporal space by the moving object, for each of a plurality of objects which move differently within the image sequence. Next, a histogram of the directions of the intersection lines formed by mutually different tangent planes is obtained. The directions of the intersection lines formed by mutually different and non-parallel tangent planes are all the same with respect to the motion trajectories of the moving objects which translate uniformly at equal velocities and to equal directions, and the intersection lines have characteristics such that the directions of the intersection lines match the moving directions of the moving objects within the spatiotemporal space. Accordingly, assuming a case where a plurality of objects which move differently and are included in the image sequence translate uniformly at equal velocities and to equal directions, peaks with respect to the moving objects appear in the histogram of the directions of the intersection lines of the tangent planes. Hence, the third embodiment of the present invention detects the plurality of peaks, and the velocity component is estimated for each of the detected velocity components. As a result, it is possible to obtain a plurality of velocity components corresponding to the moving objects from the image sequence including the plurality of objects which move differently.

Moreover, in the third embodiment of the present invention, the distribution of the directions of the intersection lines of the tangent planes is obtained with respect to the plurality of objects which move differently and are included in the image sequence. Then, with respect to each of the velocity components estimated from the plurality of peaks within the histogram, a judgement is made to determine whether or not each velocity component can be represented as a sum of a combination of other plurality of velocity components. Only the velocity component which is judged as not being representable by the sum of the combination of other plurality of velocity components is output as the final result. Therefore, in the third embodiment of the present invention, only the independent and basic velocity components are selected and output with respect to the plurality of moving objects.

The fourth sub-goal of the present invention can be achieved as follows. According to the present invention, for example, the distribution of the normal velocities (normal flows) of the contour can be obtained from the distribution of the normal parameters of the tangent planes projected in a certain space. Next, the uniformity of the motion or, a specific component of the motion, such as a ratio of a high-velocity component, is calculated from the normal flow distribution. By obtaining the histogram of the normal flow from the distribution of the tangent planes, it is possible to stably and accurately obtain the histogram of the normal flow, even from an image in which the appearance and disappearance of the target, occlusion and noise exist.

According to the optical flow which is a conventional representation of motion of the general image sequence, there is a problem in that the optical flow is affected by the aperture problem. For example, in a case where a linear edge with invisible end points exists within an observation range (within a cut out spatiotemporal region) and this linear edge uniformly translates, the true velocity of the target cannot be uniquely determined. For this reason, when an attempt is made to estimate the true velocity in the image including such an image structure, the estimated velocity easily becomes indefinite and unstable. In addition, the application range becomes limited because the translation of the target is estimated. Accordingly, in the fourth embodiment of the present invention, the histogram of the normal flow, and not the optical flow, is obtained, and it is possible to calculate from this histogram the feature values related to the motion, because the normal flow can be uniquely determined even in the case of the linear edge with invisible end points. As a result, it is possible to comprehend complex and wide variety of motions without being affected by the aperture problem. Furthermore, it is possible to stably and simply obtain from the spreading of the histogram the feature values of the motion uniformity of the target within the image sequence.

When obtaining the normal flow of a pixel within the image sequence according to the prior art, a gray level difference of the pixels which are spatially and time adjacent is calculated. Hence, in a case where the noise is superimposed on the image, the feature values of the motion of the target cannot be accurately and stably obtained because the feature values are excessively affected by the noise. On the other hand, according to the fourth embodiment of the present invention, the histogram of the normal flow is obtained by obtaining the motion trajectory having the surface shape and drawn in the spatiotemporal space by the moving contour of the target, and then extracting the histogram of the tangent planes tangent to this motion trajectory. The fourth embodiment of the present invention focuses on the point that the histogram of the normal flow is obtained as the histogram of the tangent planes tangent to the motion trajectory. In other words, in the fourth embodiment of the present invention, the moving contour of the object is represented as the surface within the spatiotemporal space, and the most appropriate tangent plane to the surface is obtained. Therefore, the normal flow is calculated based on a wide range of information as compared to the prior art, and there is an advantage in that the normal flow can be detected stably even in a case where noise traverses the image. As a result, even under an environment in which the noise added to the image and the appearance and disappearance of the target occur, it is possible to accurately and stably calculate the motion features depending on the effects of the noise added to the image and the appearance and disappearance of the target.

In the fourth embodiment of the present invention, the motion uniformity is calculated as the feature value. This motion uniformity describes the diversity of the motion included within the spatiotemporal space region. Although the motion uniformity is high with respect to the motion of a rigid body, the motion uniformity is low with respect to a non-rigid body which easily appears and disappears and is easily deformed. In addition, even in the case of the same target, the feature value of the motion uniformity decreases when the amount of noise added to the image increases. For this reason, the feature value of the motion uniformity can be used to judge the rigidity or non-rigidity and to measure the amount of noise. For example, a specific motion uniformity $f_2$ in the fourth embodiment of the present invention takes a maximum value when the linear edge (contour) within the spatiotemporal space region translates uniformly. On the other hand, in a case where the contours of all velocities and directions exist at the same ratio, the motion uniformity $f_2$ has a characteristic such that the value of $f_2$ approaches 0 in the case of random noise, for example.

Furthermore, in the distribution of the normal flow component, the fourth embodiment of the present invention extracts a ratio occupied by velocity components greater than or equal to a certain velocity as the feature value of the velocity. Such high-velocity components of the velocity occur in many cases where the target abruptly disappears or appears. Moreover, the high-velocity components also occur in cases where the gray level value of the target surface abruptly changes over a wide range. Therefore, the ratio of the high-velocity components, that is, the feature value, is effective for use in detecting the abrupt appearance or disappearance of the target, the change in the surface gray level value and the like.

In addition, according to the present invention, the temporal features related to the occlusion, appearance and disappearance of the target are extracted. Thus, the tangent planes tangent to the motion trajectory are detected from the histogram of the tangent planes, and the distribution of the motion trajectory on the detected tangent planes is output as the image. Next, information related to the occlusion is defined from the intermittence or run length of the motion trajectory along the moving direction. As a result, the fifth sub-goal of the present invention is achieved.

Therefore, the following advantages can be obtained by utilizing the distribution image of the motion trajectory on the tangent planes in order to obtain the degree of occlusion. That is, one point on the contour of the uniformly translating target has a characteristic such that this one point moves on one tangent plane. Thus, it is possible to measure the intermittence of the motion trajectory by tracking the distribution of the motion trajectory on the tangent planes in the moving direction. On the other hand, in general, when an attempt is made to measure the intermittence of the motion by tracking each individual contour point on the image, it is necessary to make a correspondence of the contour points among the frames. However, in the actual environment which is full of noise and the like, such a correspondence of the contour points is difficult to make, and the degree of occlusion cannot be measured stably and accurately.

In the fifth embodiment of the present invention, the distribution of the motion trajectory within the spatiotemporal space is first obtained with respect to the dynamic target (moving target) included in a plurality of frames within the image sequence. Next, the motion trajectory is represented as a set of the tangent planes. When the dynamic target is occluded, that is, when occlusion occurs, a discontinuity occurs in the motion trajectory of the target corresponding to the occlusion part. Accordingly, when the target makes a translation motion on the image, the motion trajectory of the target is transformed into the set of the same tangent planes regardless of whether or not the occlusion exists. Hence, according to the fifth embodiment of the present invention, the distribution of the motion trajectory on the tangent planes is extracted as the image, and the motion trajectory in the image is tracked, so that the information related to the occlusion can be measured by measuring the run length of the motion trajectory.

In addition, the fifth embodiment of the present invention is also applicable to cases other than the general occlusion. For example, the fifth embodiment of the present invention may be applied to a target which repeats appearing and disappearing, such as the case of an echo cell which is included in a weather radar image and repeats appearing and disappearing while moving generally along the atmospheric flow. In this case, by regarding the appearance and disappearance of the target as the occlusion, it is possible to extract the information such as the life cycle and appearing frequency of each element which is called the echo cell within the weather radar image.

An occlusion ratio can be obtained by measuring the lengths of an interval in which the target is visible (existing) and an interval in which the target is invisible (not existing), and obtaining a ratio of the length of the invisible interval with respect to the entire interval. The occlusion ratio is an effective feature value for evaluating a situation where an occluding object exists between the moving object and the camera, for example. When the moving object moves to the rear side of the occluding object, this moving object becomes invisible. The moving object becomes visible when this moving object comes out from the rear side of the occluding object. In addition, even in a case where the target has a life cycle and repeats disappearing after appearing, the target becomes visible and invisible, and it may be regarded that the utilization of the occlusion ratio is effective. In the case where the weather radar image is the target, the length of the interval in which the target is visible (existing) corresponds to the life cycle of the echo cell, and thus, this length may be used as an index corresponding to the life cycle of the atmospheric structure called a convection cell.

Therefore, according to the present invention, it is possible to obtain from the distribution of the tangent planes of the motion trajectory both the temporal features including information related to the velocity components (directions and magnitudes), motion uniformity, ratio of specific velocity components and occlusion, and spatial features including information related to the concentration (scattering) of the contour arrangement and the strength of the directionality of the contour arrangement.

Other objects and further features of the present invention will be apparent from the following detailed description when read in conjunction with the accompanying drawings.

BRIEF DESCRIPTION OF THE DRAWINGS

FIG. 22 is a diagram showing velocity components obtained from the image sequence shown in FIGS. 19A, 19B and 19C by the application of the first embodiment of the present invention;

DESCRIPTION OF THE PREFERRED EMBODIMENTS

Figure 1:
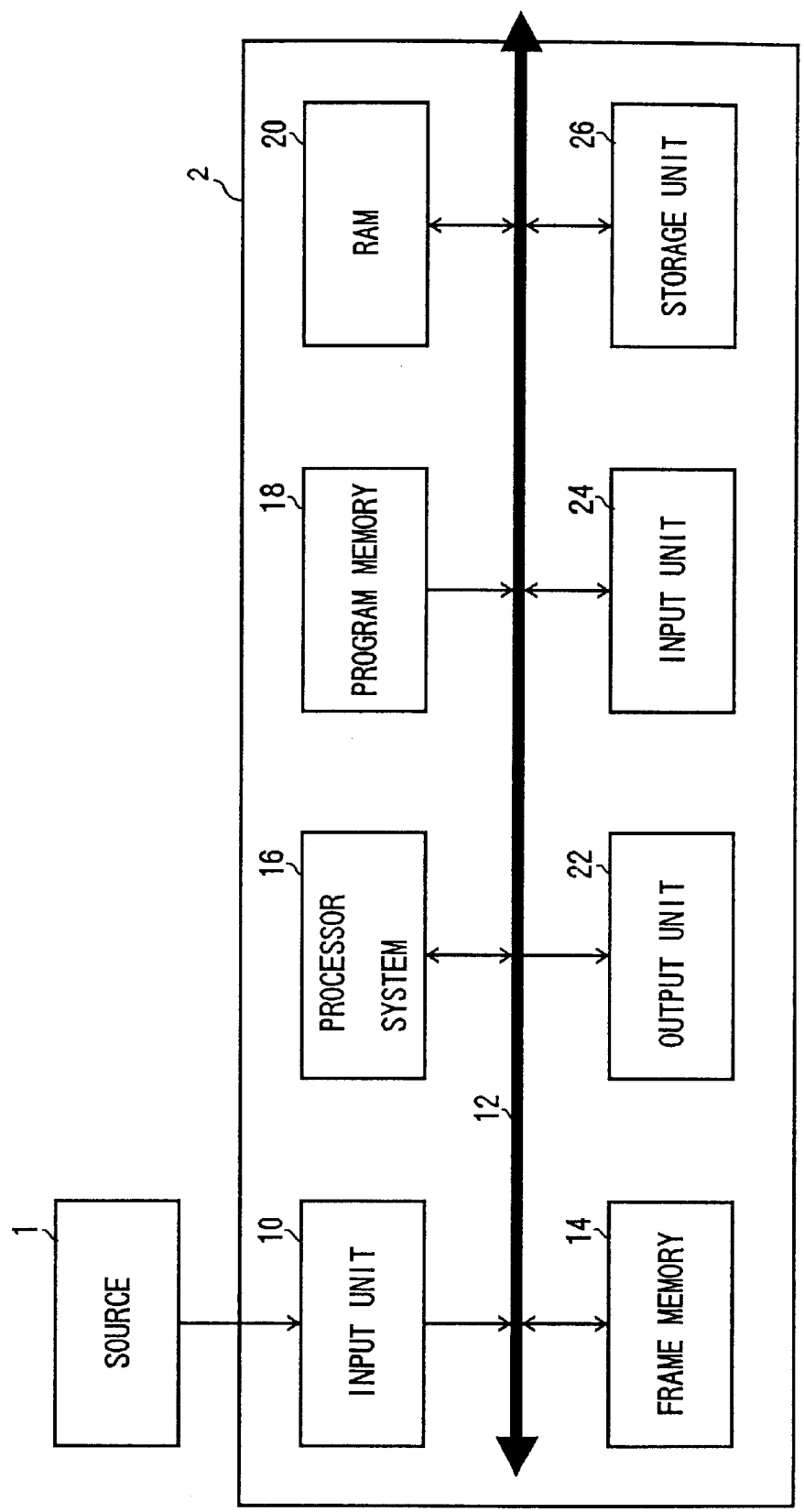
FIG. 1 is a system block diagram showing a construction of a system for extracting image features from an image sequence according to the present invention.

FIG. 1 shows the construction of a system for extracting image features from an image sequence according to the present invention. The system shown in FIG. 1 includes an image sequence supply source 1 and an image feature extraction equipment 2. The image feature extraction equipment 2 includes an input unit 10 which receives an image sequence from the image sequence supply source 1 by a communication, via a recording medium or the like, for example, and a frame memory 14 which is coupled to the input unit 10 via a bus 12 and stores image data of the image sequence or the like from the input unit 10. The image feature extraction equipment 2 also includes a processor or a processor system 16 which carries out an image feature extraction process, a program memory 18 such as a ROM which stores an image feature extraction process program to be executed by the processor system 16, and a RAM 20 which stores data used by the image feature extraction process. The image feature extraction equipment 2 further includes an output unit 22 such as a printer and a display which displays a processed result or image data, an input unit 24 such as a keyboard and a mouse which inputs instructions from an operator, and a storage unit 26. This storage unit 26 stores the processed result of the image feature extraction process, and may also store the image feature extraction process program. The processor system 16 may be formed by a general-purpose CPU. However, the processor system 16 may also be formed by a combination of the general-purpose CPU and a signal processor which carries out a high-speed operation, a hardware exclusively for processing images, or the like.

Next, a description will be given of various embodiments of an image feature extraction method according to the present invention which may be used in the above described system which extracts the image features from the image sequence.

Figure 2:
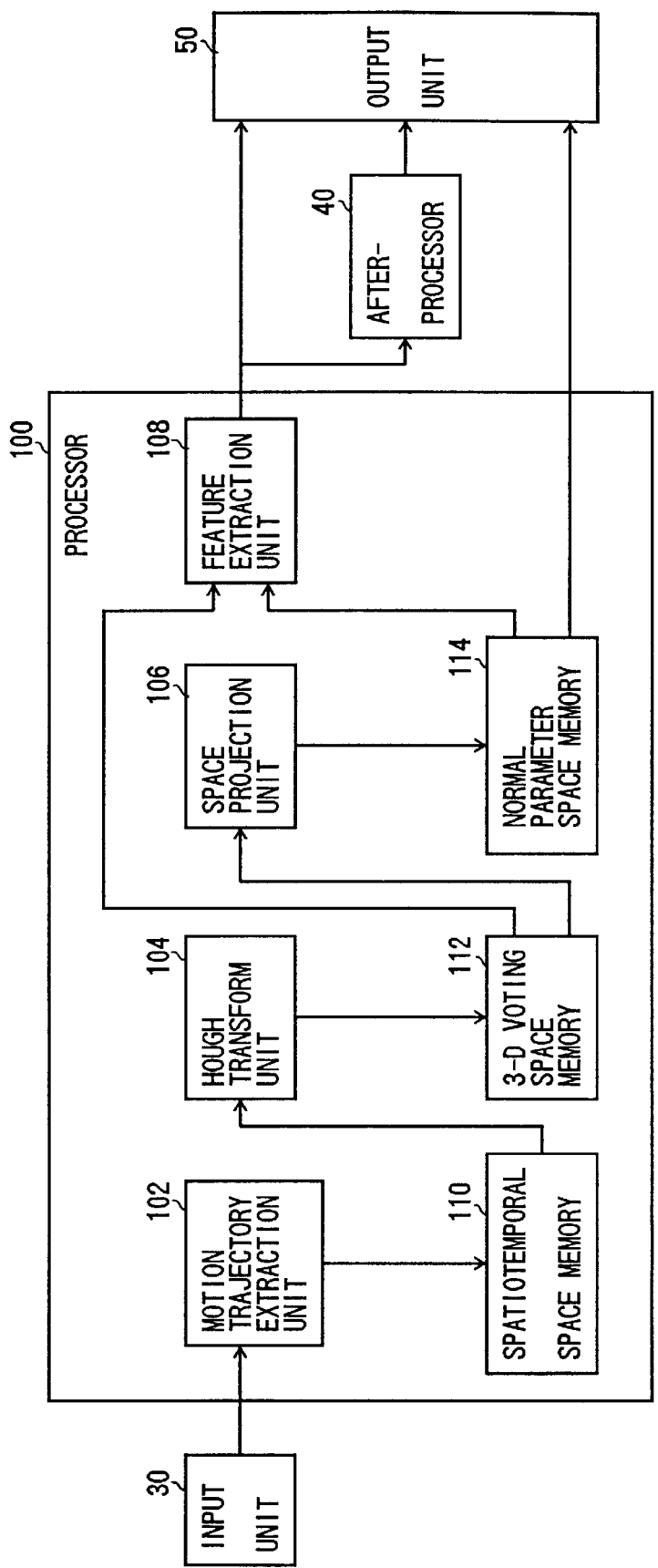
FIG. 2 is a system block diagram showing a functional system structure of a first embodiment of the present invention.

FIG. 2 shows the functional system structure of a first embodiment of the present invention. This embodiment realizes a technique for measuring image features of images from a plurality of frames within the image sequence. The image features include the shape and pattern of the target, motion features, and appearance and disappearance of complex non-rigid bodies.

The system structure of the first embodiment of the present invention includes an input unit 30 which inputs image sequence data, a processor 100 which extracts image features from the image sequence data, an after-processor 40 which further processes a processed result of the processor 100, and an output unit 50 which outputs processed results of the processor 100 and the after-processor 40.

Figure 3:
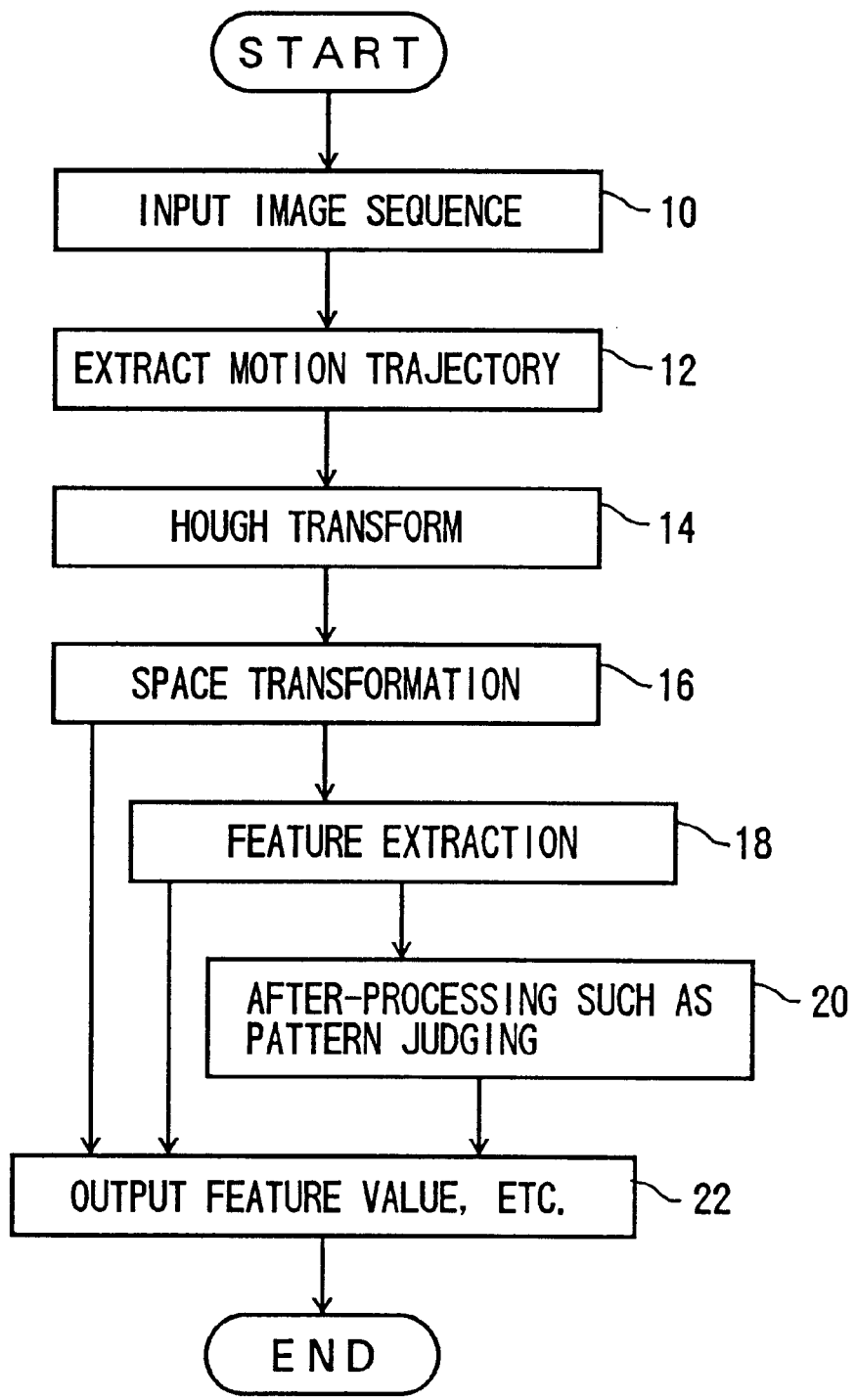
FIG. 3 is a flow chart for explaining an operation of the system structure of the first embodiment of the present invention.

FIG. 3 shows a flow chart for explaining the operation of the system structure of the first embodiment of the present invention. A description of the first embodiment of the present invention will now be given with reference to FIGS. 2 and 3.

In a step 10 shown in FIG. 3, the image sequence data is input to the input unit 30. The processor 100 includes a motion trajectory extraction unit 102, and in a step 12, the motion trajectory extraction unit 102 extracts from the image sequence data input to the input unit 30 a target region where the image features are to be measured, and extracts a motion trajectory drawn by an edge or a contour within this target region. The motion trajectory extracted by the motion trajectory extraction unit 102 is stored in a spatiotemporal space memory 110 of the processor 100.

Next, in a step 14, a Hough transform unit 104 of the processor 100 carries out a three-dimensional Hough transform with respect to the target region to be measured, and measures the features of the motion trajectory. A three-dimensional voting space obtained by the Hough transform carried out by the Hough transform unit 104 is stored in a three-dimensional voting space memory 112 of the processor 100.

In a step 16, a space projection unit 106 of the processor 100 projects the three-dimensional voting space stored in the three-dimensional voting space memory 112 to a two-dimensional space, and stores a distribution of projected results in a normal parameter space memory 114 of the processor 100. The distribution of the projected results stored in the normal parameter space memory 114 may be output as it is via the output unit 50 in a step 22.

In a step 18, a feature extraction unit 108 of the processor 100 extracts temporal features and spatial features of the image sequence, based on the distribution of votes stored in the normal parameter space memory 114 and the three-dimensional voting space stored in the three-dimensional voting space memory 112. The extracted temporal features and spatial features may be output as they are via the output unit 40 in the step 22.

Alternatively, in a step 20, the after-processor 40 receives values of the temporal features and spatial features extracted in the feature extraction unit 108 as feature values, and carries out an after-process such as a classification of the image sequence which is first input based on the feature values. In the step 22, results of the after-process carried out by the after-processor 40 are output via the output unit 50.

The output unit 50 makes an output to a display unit or a file unit in response to the vote distribution stored in the normal parameter space memory 114, the feature values generated by the feature extraction unit 108, and the classification results of the image sequence generated by the after-processor 40.

Next, a more particular description will be given of the operation of each of the constituent elements of the processor 100.

After extracting from the image sequence the target region where the image features are to be measured, the motion trajectory extraction unit 102 constructs the motion trajectory which is drawn by the edge of contour of the target within the image in the spatiotemporal space in the form of three-dimensional volume data.

As an example of the three-dimensional volume data describing the motion trajectory, it is possible to calculate a difference between the frames of the image sequence, for example, and to utilize a spatiotemporal difference image $D(x, y, t)$ using a positive value, a negative value or an absolute value of this difference. This spatiotemporal difference image $D(x, y, t)$ is stored in the spatiotemporal space memory 110 as the motion trajectory. When using the positive value of the difference, the spatiotemporal difference image $D(x, y, t)$ can be calculated from the following formula (1), where I denotes the image sequence.

$$\begin{cases} D(x, y, t) = I(x, y, t+1) - I(x, y, t) \\ \qquad \text{if } I(x, y, t+1) - I(x, y, t) > 0 \text{ and} \\ D(x, y, t) = 0 \text{ otherwise} \end{cases} \quad (1)$$

Accordingly, a cylindrical motion trajectory is generated, and the edge and the contour within the image can be represented as a base curve of a cylinder. The magnitude of the gray level value of the spatiotemporal difference image $D(x, y, t)$ is approximately proportional to the motion quantity and the magnitude of the discontinuity seen in the spatial distribution of the luminance of the edge and the contour within the image. Of course, any method capable of extracting the motion trajectory as the three-dimensional volume data may be used in place of the above described method using the spatiotemporal difference image.

Next, in order to acquire the features related to the motion trajectory, the Hough transform unit 104 inputs the three-dimensional volume data representing the motion trajectory extracted by the motion trajectory extraction unit 102, that is, the spatiotemporal difference image $D(x, y, t)$ in this particular case, and generates the vote distribution by voting within the parameter space (also referred to as the voting space).

In this embodiment in particular, the distribution of the tangent planes which may be tangent to the motion trajectory within the spatiotemporal space (or the distribution of partial planes of the motion trajectory) is detected by the three-dimensional Hough transform, and the histogram of the tangent planes is stored in the three-dimensional voting space memory 112 in the three-dimensional array.

Figure 4:
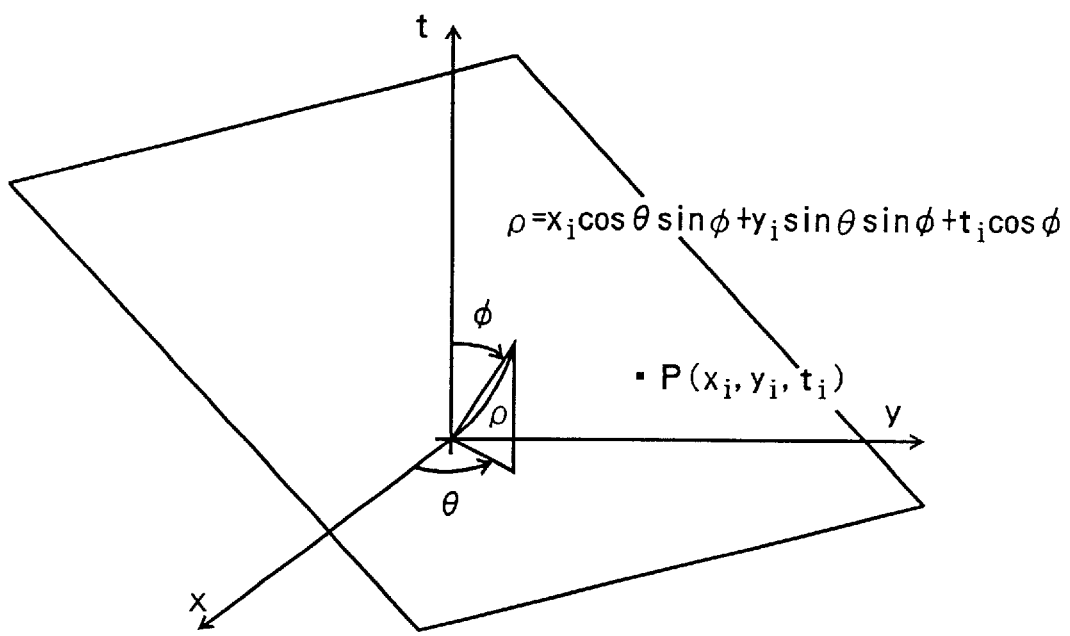
FIG. 4 is a diagram for explaining a polar coordinate representation of a plane within a three-dimensional space in the first embodiment of the present invention.

FIG. 4 shows a polar coordinate representation of a plane within a three-dimensional space. As shown in FIG. 4, a plane which passes a point $(x_i, y_i, t_i)$ in the three-dimensional space can be described by the following formulas (2) through (5) using polar coordinates $(\theta, \phi, \rho)$, where $(\theta, \phi)$ indicates the normal direction of the plane and $\rho$ indicates a minimum distance from the origin to the plane.

$$x_i \cdot \cos\theta \cdot \sin\phi + y_i \cdot \sin\theta \cdot \sin\phi + t_i \cdot \cos\phi = \rho \quad (2)$$

$$0 \leq \theta < 2\pi \quad (3)$$

$$0 \leq \phi < \pi/2 \quad (4)$$

$$\sqrt{'} < \rho < \sqrt{'} \quad (5)$$

A space in which a plane described by 3 parameters exists will be referred to as a plane parameter space $S_P$. From the formula (2), it may be seen that 1 point $(x_i, y_i, t_i)$ within the three-dimensional space corresponds to 1 surface within the plane parameter space $S_P$.

Figure 5:
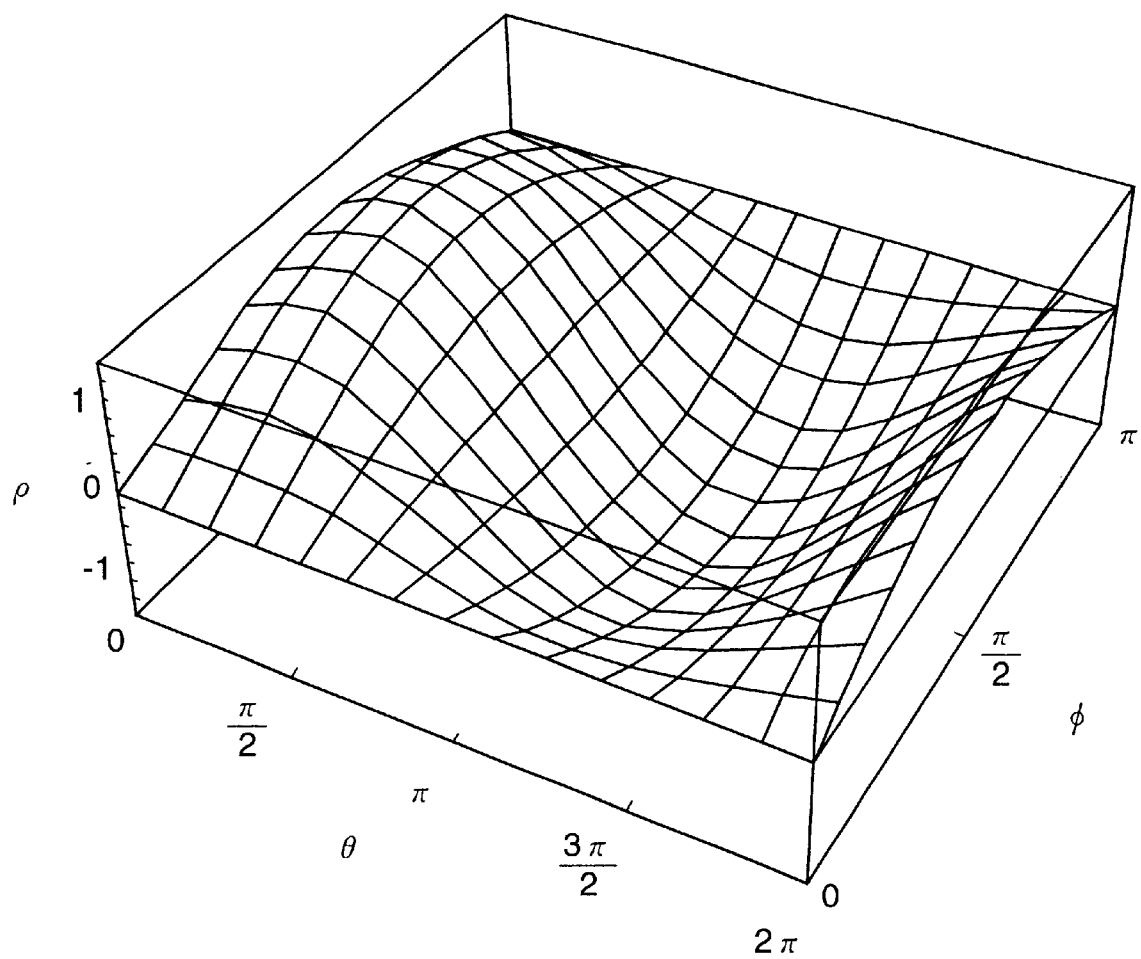
FIG. 5 is a diagram showing a distribution of parameters of planes which can pass one point in a spatiotemporal space region in the first embodiment of the present invention.

FIG. 5 shows a distribution of parameters of planes which can pass 1 point in a spatiotemporal space region. Actually, the plane parameter space $S_P$ is made discrete by intervals $(\Delta\theta, \Delta\phi, \Delta\rho)$, and is stored in a three-dimensional array having discrete micro spaces as elements. In this embodiment, the three-dimensional array is provided in the three-dimensional voting space memory 112. The elements of the three-dimensional array are called cells.

Next, by use of a voting process, the distribution of the tangent planes of the motion trajectory within the target region represented as the spatiotemporal difference image D is acquired as values of the cells within the plane parameter space $S_P$. The voting process calculates surfaces described by the formula (2) with respect to all pixels of the spatiotemporal difference image $D(x, y, t)$, and increases the values of the cells within the plane parameter space $S_P$ where the surfaces pass by the value of the pixel $D(i, j, t)$ of the spatiotemporal difference image $D(x, y, t)$. After the voting process is carried out with respect to all of the pixels, a total value of the voting accumulated at each cell of the plane parameter space $S_P$ is regarded as the strength of the tangent planes of the motion trajectory having the parameters $(\theta, \phi, \rho)$. Accordingly, the voting result represents the histogram of the target tangent planes. Hence, in a case where the distribution of the votes in the plane parameter space $S_P$ forms a peak, coordinates $(\theta, \phi, \rho)$ where the peak occurs correspond to the parameters representing the tangent planes of the motion trajectory included in the spatiotemporal space.

The space projection unit 106 searches in a $\rho$ direction for a maximum value of the votes accumulated at the cells, with respect to each $(\theta, \phi)$ of the plane parameter space $S_P(\theta, \phi, \rho)$ formed in the three-dimensional voting space memory 112 by the process carried out by the Hough transform unit 104. The maximum values found by the search are stored in the two-dimensional normal parameter space memory 114 in a two-dimensional array. A space formed by $(\theta, \phi)$ is referred to as a normal parameter space $S_N$. This normal parameter space $S_N$ can be described by the following formula (6).

$$S_N(\theta, \phi) = \max_\rho S_P(\theta, \phi, \rho) \quad (6)$$

A space projection process has a function of integrating the distribution of the tangent planes of the motion trajectory drawn in the spatiotemporal space by the contour and edge within the target region to a distribution viewed for each of the same normal directions independently of the time and position. That is, the integrated distribution represents a distribution of the tangent planes of the motion trajectory which is constant with respect to the time and position. Accordingly, by carrying out the space projection process, this first embodiment of the present invention can obtain feature values which will not change with respect to the time and position.

The distribution of the votes within the normal parameter space $S_N$ obtained in the above described manner reflects the image features of the input image sequence. For example, in a case where the target translates at a constant velocity in a constant direction within the measuring region, a sharp peak appears in the normal parameter space $S_N$. It may be seen that the edge and contour of the moving target form a linear shape when an isolated peak appears, and that the edge and contour of the moving target form a curved shape when peaks appear in a curved shape. Furthermore, the vote at the peak represents the frequency with which the corresponding edge and contour in the ρ direction appear. The vote distribution obtained in the normal parameter space $S_N$ represents the temporal features and the spatial features of the image sequence.

The peaks within the normal parameter space $S_N$ spread when the target motion within the region is inconsistent. Moreover, when the target appears and disappears at random within the measuring region, the votes in the normal parameter space $S_N$ assume states as if added with a bias, and it is possible to obtain an approximately uniform vote distribution.

Or, in a case where various motions of the target overlap, there is an advantage in that the effects of the various motions appear additively in the votes in the normal parameter space $S_N$.

The feature extraction unit 108 extracts the image features by extracting the temporal features and the spatial features of the image sequence. For example, in the case described above, the image features are qualitatively represented by the vote distribution obtained in the normal parameter space memory 114, but the features can be extracted by evaluating the isolation of the peak, the connectivity of the peaks, the vote at the peak and the like.

As described above, according to this first embodiment of the present invention, the motion trajectory drawn within the spatiotemporal space by the target or by the edge and contour of the target within the image when measuring the image features such as the surface shape and motion of the target included within the image sequence is obtained. In addition, the histogram of the tangent planes tangent to the drawn motion trajectory or, the histogram of the partial planes included in the motion trajectory, is acquired by the Hough transform. Next, the features within the image sequence are measured from the histogram. Therefore, it is possible to extract from the plurality of frames within the image sequence the spatial features such as the shape and pattern of the target and the temporal features such as the motion of the target. Furthermore, it is also possible to measure the image features of a complex non-rigid body which appears and disappears.

Figure 6:
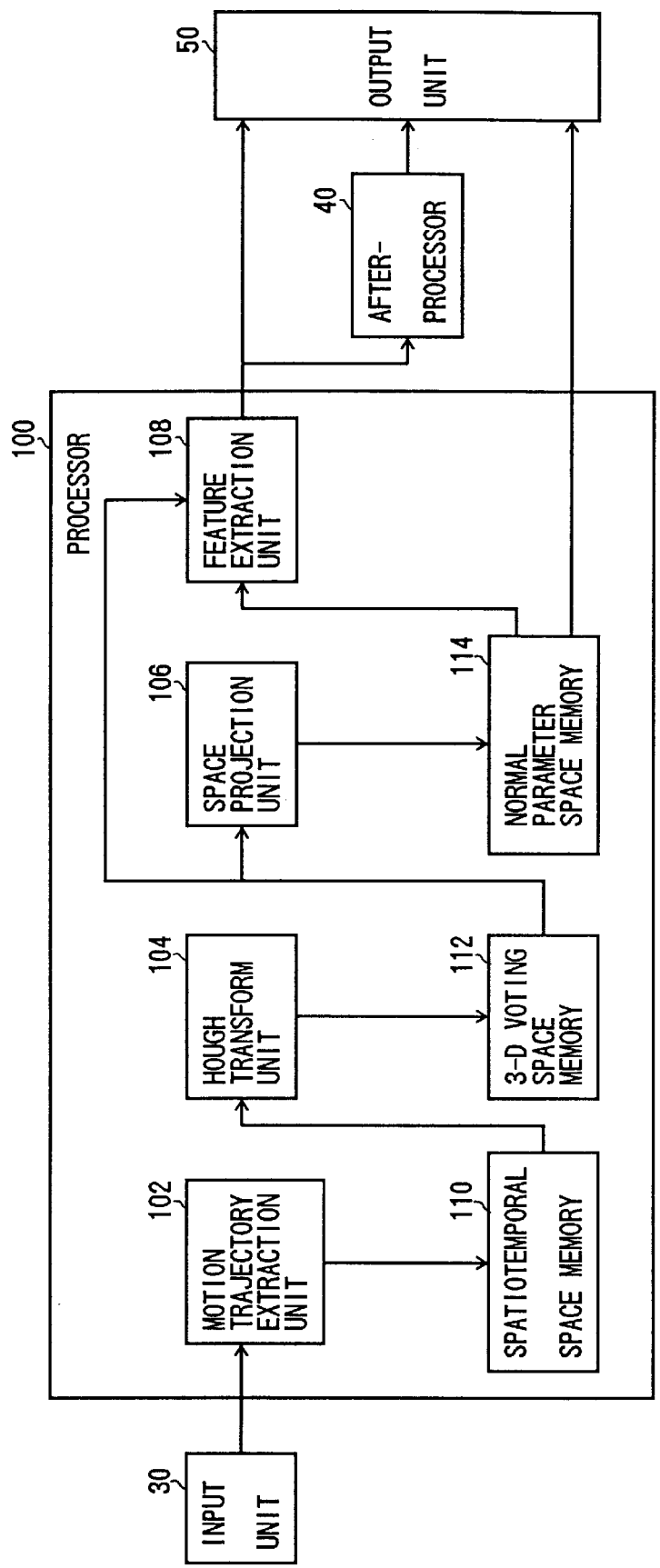
FIG. 6 is a system block diagram showing the functional system structure of a second embodiment of the present invention.

FIG. 6 shows the functional system structure of a second embodiment of the present invention. In this embodiment, the temporal features and the spatial features are extracted in the feature extraction unit 108.

The difference between the system structure of the second embodiment of the present invention shown in FIG. 6 and the system structure of the first embodiment of the present invention shown in FIG. 2 is that the output of the three-dimensional voting space memory 112 is connected to the feature extraction unit 108 in the system structure of the second embodiment. Otherwise, the system structure of the second embodiment is the same as the system structure of the first embodiment. Accordingly, a description will only be given of the feature extraction unit 108 in the following description. A description of the construction and operation of other constituent elements of the system structure, namely, the input unit 30, the motion trajectory extraction unit 102, the Hough transform unit 104, the space projection unit 106, the spatiotemporal space memory 110, the three-dimensional voting space memory 112, the normal parameter space memory 114, the after-processor 40 and the output unit 50, will be omitted since the construction and operation of these other constituent elements are the same as those of the first embodiment of the present invention described above.

Figure 7:
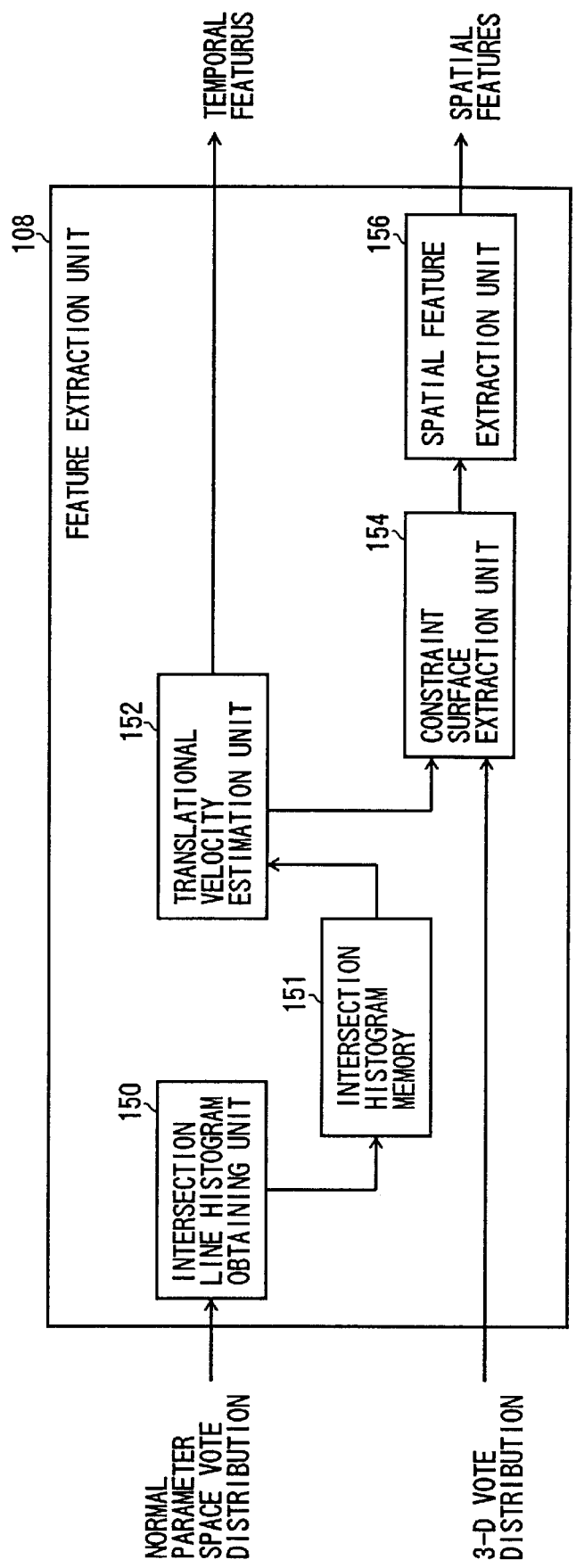
FIG. 7 is a system block diagram showing a construction of a feature extraction unit of the second embodiment of the present invention.

FIG. 7 shows the construction of the feature extraction unit 108 of the second embodiment of the present invention.

The feature extraction unit 108 extracts the image features of the image sequence from the three-dimensional vote distribution obtained by the Hough transform unit 202 and the normal parameter space vote distribution obtained by the space projection unit 106, by extracting the features of the vote distributions. In the case of this embodiment, the most dominant translational velocity components are extracted as the temporal features, and the spatial features of the contour and edge of the target within the image are extracted as the spatial features. Of course, various other kinds of feature values may be extracted as the features.

Figure 8:
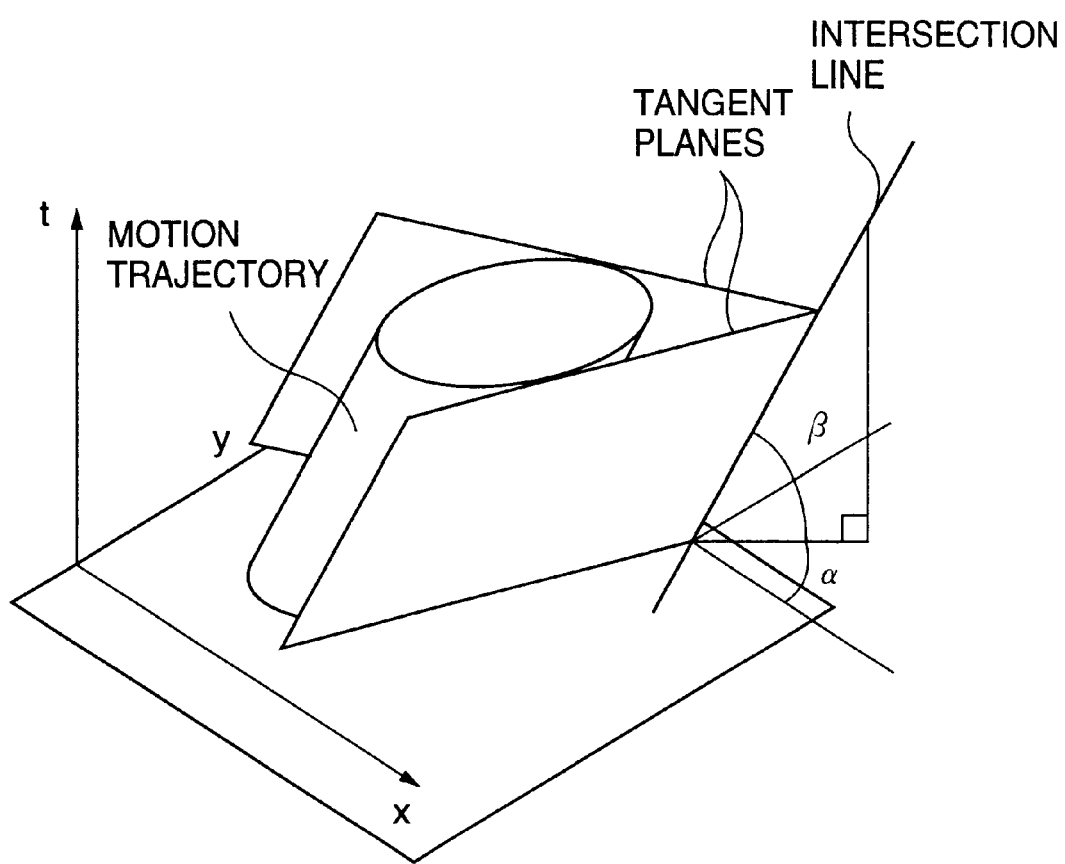
FIG. 8 is a diagram for explaining that a direction of intersection lines of tangent planes of a motion trajectory within the spatiotemporal space in the second embodiment of the present invention matches a direction of the motion trajectory.

The vote distribution stored in the two-dimensional normal parameter space memory 114 by the space projection unit 106 is a histogram of the tangent planes of the motion trajectory drawn within the spatiotemporal space by the contour and edge within the target region to be measured, when viewed for each of the normal directions of the tangent planes. In a case where the target translates in the same direction at a constant velocity, the intersection lines of the tangent planes have a characteristic such that the directions of the intersection lines of the tangent planes all match the directions of the target motion, as shown in FIG. 8. Hence, in this second embodiment of the present invention, this characteristic of the intersection lines of the tangent planes is utilized, and an intersection line histogram obtaining unit 150 of the feature extraction unit 108 shown in FIG. 7 obtains a histogram of the intersection lines formed by the tangent planes, and stores this histogram in an intersection histogram memory 511. Next, a translational velocity estimation unit 152 obtains a most dominant translational velocity component within the target region from the direction of the intersection line having the highest frequency within the histogram stored in the intersection line histogram memory 151.

Figure 9:
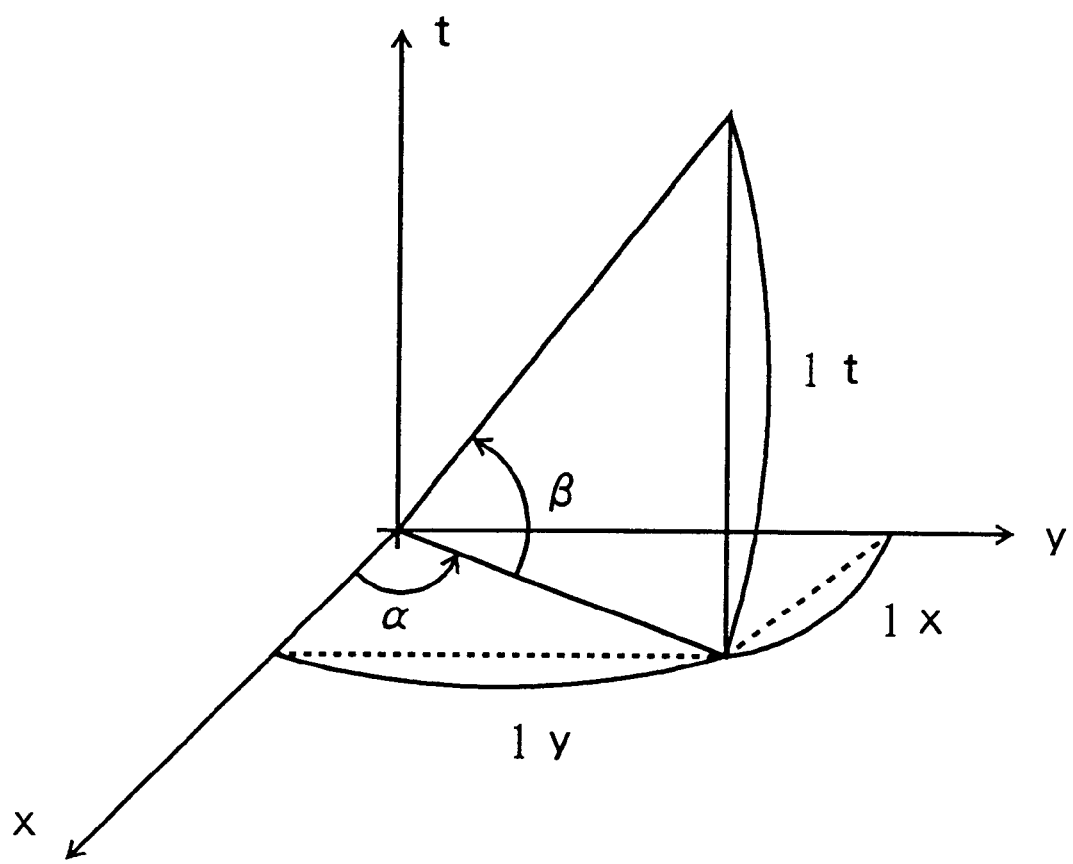
FIG. 9 is a diagram for explaining a method of representing a straight line within the three-dimensional space in the second embodiment of the present invention.

FIG. 9 is a diagram for explaining a method of representing a straight line. In this embodiment, the direction of the intersection line can be represented by the following formulas (7) through (9) using an angle α which is formed by an intersection line passing the origin and an x-axis when this intersection line is projected on a x-y plane, and an angle β which is formed by this intersection line and the x-y plane (image plane), where $0 \leq \alpha < 2\pi$ and $<\beta<\pi/2$.

$$l_x = x_2 - x_1 = \cos\alpha \cdot \cos\beta \tag{7}$$

$$l_y = y_2 - y_1 = \sin\alpha \cdot \cos\beta \tag{8}$$

$$l_t = t_2 - t_1 = \sin\beta \tag{9}$$

A space which represents the histogram of the intersection lines is defined as a space formed by the 2 parameters α and β, and this space is referred to as an intersection parameter space $S_L$. In addition, 2 different points on the intersection line are denoted by $P_1(x_1, y_1, t_1)$ and $P_2(x_2, y_2, t_2)$.

By simultaneously solving the formula (2) with respect to the 2 points $P_1$ and $P_2$ and substituting the formulas (7) through (9), it is possible to obtain a relationship of the normal parameter space $S_N$ and the intersection parameter space $S_L$ as described by the following formula (10).

$$\beta = -\tan^{-1}\{\tan\phi \cdot \cos(\alpha - \theta)\} \tag{10}$$

2 tangent planes are described as 2 points in the normal parameter space $S_N$, and a curve described by the formula (10) is obtained when these 2 points are transformed into the intersection parameter space $S_L$. The direction of the intersection line of the tangent planes is obtained as an intersection point of the curve described by the formula (10).

In the second embodiment of the present invention, with respect to all elements or cells (θ, ø) within the normal parameter space $S_N$, the value of the normal parameter space $S_N(\theta, \phi)$ is voted for the cell within the intersection parameter space $S_L$ where the curve described by the formula (10) passes. By making such a voting, that is, by carrying out another Hough transform, the velocity components of the target which may be included in the target region representing certain velocity components of the target object are reflected to the vote distribution within the intersection parameter space $S_L$.

Next, the translational velocity estimation unit 152 detects the peak of the vote distribution within the intersection parameter space $S_L$, and obtains the most dominant translational velocity component of the target object within the target region from the coordinate values $(\alpha_P, \beta_P)$ of this peak. The direction of the motion is obtained as $$\alpha_P \quad (11)$$

and a magnitude V of the velocity is obtained by the following formula (12).

$$V=1/\tan\beta_P \quad (12)$$

A vote $S_L(\alpha_P, \beta_P)$ indicating the peak is information representing the likelihood of a translational velocity component having a velocity V and a direction $\alpha_P$ existing within the target region. The translational velocity component is a feature value representing the temporal feature, more particularly, motion feature.

Then, a constraint surface extraction unit 154 of the feature extraction unit 108 shown in FIG. 7 operates so as to extract the spatial features. The constraint surface extraction unit 154 extracts the distribution of the tangent planes tangent to the motion trajectory drawn by the contour and edge having the translational velocity component obtained in the translational velocity estimation unit 152 from the distribution of the tangent planes stored in the three-dimensional voting space memory 112.

When the translational velocity component within the target region is denoted by $(\alpha_P, \beta_P)$, a relationship described by the following formula (13) which is uniquely determined depending on the velocity component stands between the parameters $\theta$ and $\phi$ in the normal directions of the tangent planes, based on the formula (9) described above.

$$\phi=-\tan^{-1}\{\tan\beta_P/\cos(\alpha_P-\theta)\} \quad (13)$$

Figure 10:
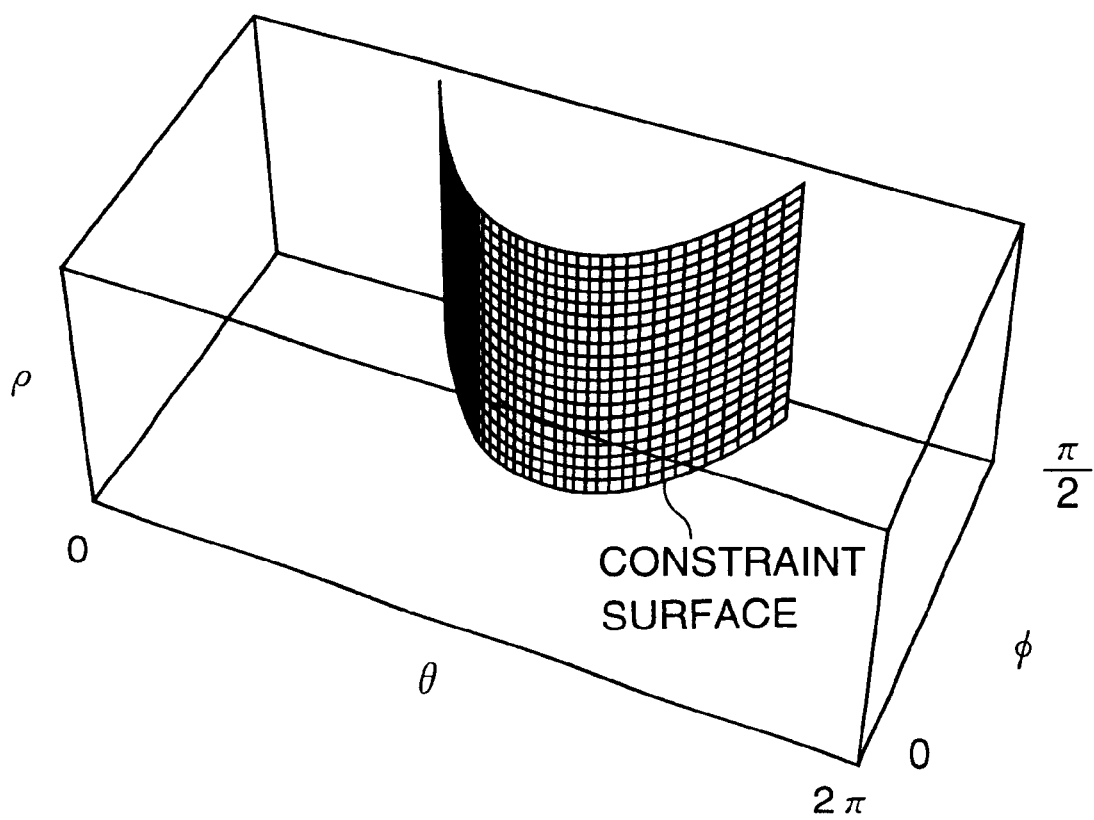
FIG. 10 is a diagram showing a range of a tangent plane distribution corresponding to a target having uniform translational velocity components within a parameter space.

From the relationship described by the formula (13), the tangent plane distribution corresponding to the contour and edge of the target having the translational velocity component $(\alpha_P, \beta_P)$ becomes restricted on the constraint surface within the $\theta$-$\phi$-$\rho$ space. FIG. 10 shows a range of the tangent plane distribution corresponding to the target having uniform translational velocity components within the parameter space, that is, the constraint surface within the parameter space.

The constraint surface extraction unit 154 obtains a tangent plane distribution CS on the constraint surface from the following formula (14), based on the characteristic that the tangent plane distribution corresponding to the target having the uniform translational velocity components becomes restricted on the constraint surface, where $\theta$ corresponds to a tangent line direction of the contour and edge, and $\rho$ corresponds to a length of a perpendicular from the origin within the target region to the tangent line. In addition, the tangent line direction $\theta$ is the direction of a perpendicular from the origin within the target region to a tangent line on the contour.

$$CS(\theta, \rho)=\{S_P(\theta, \phi, \rho)|\tan\phi\cdot\cos(\alpha-\theta)+\tan\beta=0\} \quad (14)$$

In the case described above, the constraint surface extraction unit 154 extracts the spatial features by use of the translational velocity components obtained by the translational velocity estimation unit 152. However, the constraint surface extraction unit 154 may acquire the tangent plane distribution CS on the constraint surface using arbitrary velocity components obtained from other than the translational velocity estimation unit 152.

Next, a spatial feature extraction unit 156 of the feature extraction unit 108 shown in FIG. 7 extracts the spatial features of the contour and edge of the target within the image, based on the tangent plane distribution on the constraint surface obtained by the constraint surface extraction unit 154.

Features related to the directionality of the contour and edge are extracted as first spatial features. The first spatial features are extracted from the distribution of the tangent planes along the parameters in the tangent line direction of the contour and edge. Features related to the spatial arrangement of the contour and edge are extracted as second spatial features. The second spatial features are extracted from a histogram of the tangent planes in directions perpendicular to the tangent line direction. More particularly, in this embodiment, the first spatial features are features related to the uniformity of the contour direction, that is, the strength of the directionality. On the other hand, the second spatial features are features related to the repetition of the contour, that is, concentration or density of the contour. Next, a description will be given of the extraction of the features related to the uniformity of the contour direction and the features related to the repetition of the contour.

First, in order to obtain the uniformity of the contour direction, a distribution CC representing a histogram of the tangent line directions of the contour is obtained by the following formula (15) from the tangent plane distribution CS on the constraint surface.

$$CC(\theta)=\max_\rho CS(\theta, \rho) \quad (15)$$

This distribution CC is called a tangent line direction histogram or a directionality histogram. In a case where the contour is linear, the tangent line direction histogram $CC(\theta)$ has a sharp peak at $\theta$ corresponding to the direction of the straight line. On the other hand, the peak of the tangent line direction histogram $CC(\theta)$ becomes gradual as the contour approaches a smooth circular shape. Hence, in this second embodiment of the present invention, a uniformity $f_1$ of the contour direction is defined by the following formula (16). The uniformity $f_1$ approaches 1 when the contour is linear and has a uniform direction.

$$f_1=(\max_\theta CC(\theta)-\overline{CC})/\max_\theta CC(\theta) \quad (16)$$

In addition, in order to obtain the features related to the repetition of the contour, this second embodiment of the present invention considers a distribution in the $\rho$ direction of the tangent plane distribution CS on the constraint surface. The tangent plane distribution $CS(\theta, \rho)$ with respect to a certain tangent line direction $\theta$ corresponds to the distribution of the tangent planes on the contour located at a distance $\rho$ from the origin within the target region. For this reason, in the case of a contour pattern having the repetition, the tangent plane distribution $CS(\theta, \rho)$ in the p direction also has the repetition. Accordingly, a repetition $f_2$ of the contour having the tangent line direction $\theta$ is defined by the following formula (17).

$$f_2=1-(\max_\rho CS(\theta, \rho)-\overline{CS(\theta, \rho)})/\max_\rho CS(\theta, \rho) \quad (17)$$

Moreover, a repetition $f_3$ of the entire contour can be calculated from the following formula (18).

$$f_3=1-\max_\theta\{(\max_\rho CS(\theta, \rho)-\overline{CS(\theta, \rho)}\}/\max_\rho CS(\theta, \rho) \quad (18)$$

Therefore, according to the second embodiment of the present invention, the motion trajectory drawn within the spatiotemporal space by the contour and edge of the target which moves in the image is extracted when measuring the spatial features such as the shape and arrangement of the target which has motion and is included within the image sequence. Next, a histogram of the tangent planes tangent to this motion trajectory is obtained, and the dominant translational velocity component within the target region is estimated from the histogram. Then, the spatial features of the target are measured from the tangent plane distribution corresponding to the contour and edge of the target having the estimated velocity component. Thus, the spatial features of a conspicuous target included in a plurality of frames can be robustiously extracted with respect to the noise and partial occlusion of the target.

Next, a description will be given of a third embodiment of the present invention which measures the motion of a plurality of targets by acquiring a plurality of relatively dominant velocity components based on a histogram of intersection lines of the tangent planes which are obtained as described above.

A functional system structure of this third embodiment of the present invention is the same as that of the first embodiment of the present invention shown in FIG. 2. The feature extraction unit 108 is the only structural difference between this third embodiment of the present invention and the first embodiment of the present invention. Thus, in the following, a description will only be given of the feature extraction unit 108 of this third embodiment of the present invention by referring to FIG. 11. A description of the construction and operation of other constituent elements of the system structure, namely, the input unit 30, the motion trajectory extraction unit 102, the Hough transform unit 104, the space projection unit 106, the spatiotemporal space memory 110, the three-dimensional voting space memory 112, the normal parameter space memory 114, the after-processor 40 and the output unit 50, will be omitted since the construction and operation of these other constituent elements are the same as those of the first embodiment of the present invention described above.

Figure 11:
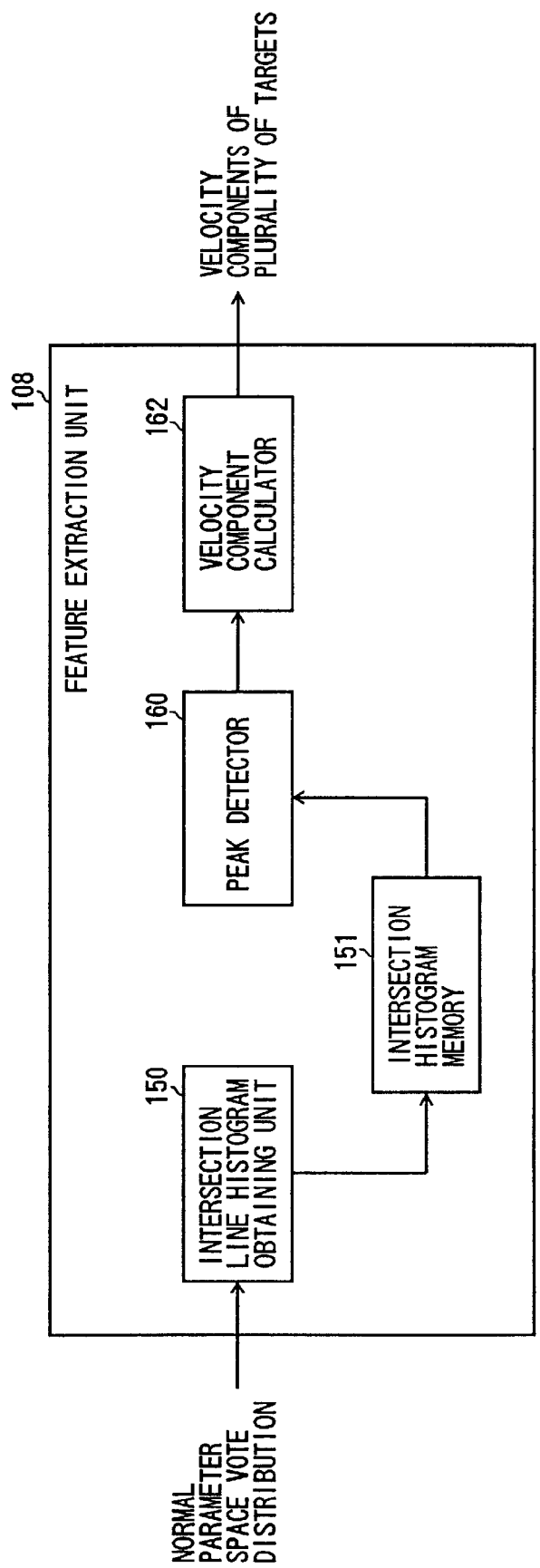
FIG. 11 is a system block diagram showing a construction of a feature extraction unit of a third embodiment of the present invention.

The feature extraction unit 108 of the third embodiment of the present invention includes an intersection histogram obtaining unit 150 and an intersection histogram memory 151, as shown in FIG. 11. The intersection histogram obtaining unit 150 obtains a histogram of the intersections formed by the tangent planes, from the normal parameter space vote distribution which is stored in the normal parameter space memory 114 by the space projection unit 106. The intersection histogram memory 151 stores the intersection histogram obtained by the intersection histogram obtaining unit 150. The intersection histogram obtaining unit 150 and the intersection histogram memory 151 may have the same construction and functions as the intersection histogram obtaining unit 150 and the intersection histogram memory 151 of the second embodiment of the present invention shown in FIG. 7. Hence, in the following, a description will be given of the case where the intersection histogram obtaining unit 150 and the intersection histogram memory 151 of the second embodiment of the present invention are applied to this third embodiment of the present invention. For this reason, a description will not be repeated of the intersection histogram obtaining unit 150 and the intersection histogram memory 151 of this third embodiment of the present invention.

In addition, the feature extraction unit 108 shown in FIG. 11 further includes a peak detector 160 and a velocity component calculator 162. The peak detector 160 detects a plurality of peaks from the intersection histogram stored in the intersection histogram memory 151. The velocity component calculator 162 which is connected to the peak detector 160 estimates the velocity component of the target from the plurality of peaks detected by the peak detector 160.

Next, a detailed description will be given of the process of the peak detector 160 for detecting the peaks from the intersection histogram of the intersections formed by the tangent planes of the trajectory surface stored in the intersection histogram memory 151.

In the third embodiment of the present invention, the peak detector 160 judges whether or not the following formula (19) stands with respect to all combinations of $\alpha$ and $\beta$ of an intersection histogram $S_L(\alpha, \beta)$ within the intersection parameter space, where $S=\{(\alpha, \beta)|(\alpha_i-\alpha)^2+(\beta_i-\beta)^2 < r^2, \alpha \approx \alpha_i, \beta \approx \beta_i\}$.

$$\forall(\alpha, \beta) \in S, S_L(\alpha_i, \beta_i) > S_L(\alpha, \beta) \qquad (19)$$

A combination of $(\alpha_i, \beta_i)$ such that the formula (19) stands is detected as the vertex of the peak. In the formula (19), it is judged that a vertex candidate point $(\alpha_i, \beta_i)$ is the vertex of the peak when a value $S_L(\alpha_i, \beta_i)$ of the vertex candidate is greater than all values $S_L(\alpha, \beta)$ falling within a radius r about the vertex candidate point $(\alpha_i, \beta_i)$ which is taken as the center. A plurality of peak positions $(\alpha_1, \beta_1), (\alpha_2, \beta_2), \ldots, (\alpha_N, \beta_N)$ obtained in this manner are output from the peak detector 160.

If course, methods other than the above described method may be used as long as a plurality of peaks are obtainable.

The velocity component calculator 162 of the third embodiment of the present invention receives as the input the positions of the peaks in the histogram of the intersection line direction detected by the peak detector 160, and calculates the plurality of velocity components within the image sequence. In addition, the velocity component calculator 162 judges the independence with respect to each of the calculated velocity components. Judging the independence corresponds, for example, to judging whether or not the velocity component is represented by a sum of other velocity components. Next, the velocity component calculator 162 excludes the velocity components having no independence, that is, a composite (or combined) velocity component of a plurality of moving objects, and selects and outputs only the velocity components corresponding to the moving objects.

In the third embodiment of the present invention, by applying the formulas (7) through (9) with respect to the position $(\alpha_i, \beta_i)$ of the peak point, an x-component and a y-component of the velocity can respectively be obtained from the following formulas (20) and (21), where a velocity component with respect to an ith peak is denoted by $v_i =(vx, vy)$.

$$v_x = \cos\alpha_i/\tan\beta_i \qquad (20)$$

$$v_y = \sin\alpha_i/\tan\beta_i \qquad (21)$$

A peak corresponding to a composite velocity component of the velocity components of the plurality of moving objects may occur in the histogram $S_L$ of the intersection line direction. It is desirable that such a composite velocity component is eliminated, and that only basic velocity components are output with respect to the moving objects. Hence, in the third embodiment of the present invention, with respect to each of velocity components $v_1, v_2, \ldots, v_N$ obtained with respect to N peaks, a sum of velocity components made up of all combinations of other velocity components is calculated, and a check is made to determine whether or not this sum matches each velocity component $v_i$ so as to judge the independence. After the check is made to judge the independence with respect to all velocity components $v_i$, only the velocity components which cannot be represented as a sum of other velocity components, that is, only the independent velocity components, are selected and output as the basic velocity components of the plurality of moving objects.

Of course, the method of obtaining the basic velocity components of the plurality of moving objects is not limited to the above described method used in the third embodiment of the present invention.

Therefore, according to the third embodiment of the present invention, the distribution of the tangent planes on the trajectory surface drawn in the spatiotemporal space by the contour of the moving object is obtained, and next, the histogram of the intersection line direction formed by the mutually non-parallel tangent planes is obtained. Then, the velocity components are estimated from the positions of the plurality of peaks in the histogram of the intersection line direction. As a result, it is possible to obtain a plurality of velocity components corresponding to each of the plurality of different moving objects from the image sequence in which the plurality of different moving objects exist. In addition, by judging the independence with respect to the velocity components which are obtained from the plurality of peaks, it becomes possible to extract only the basic velocity components of each of the objects.

Next, a description will be given of a fourth embodiment of the present invention.

Figure 12:
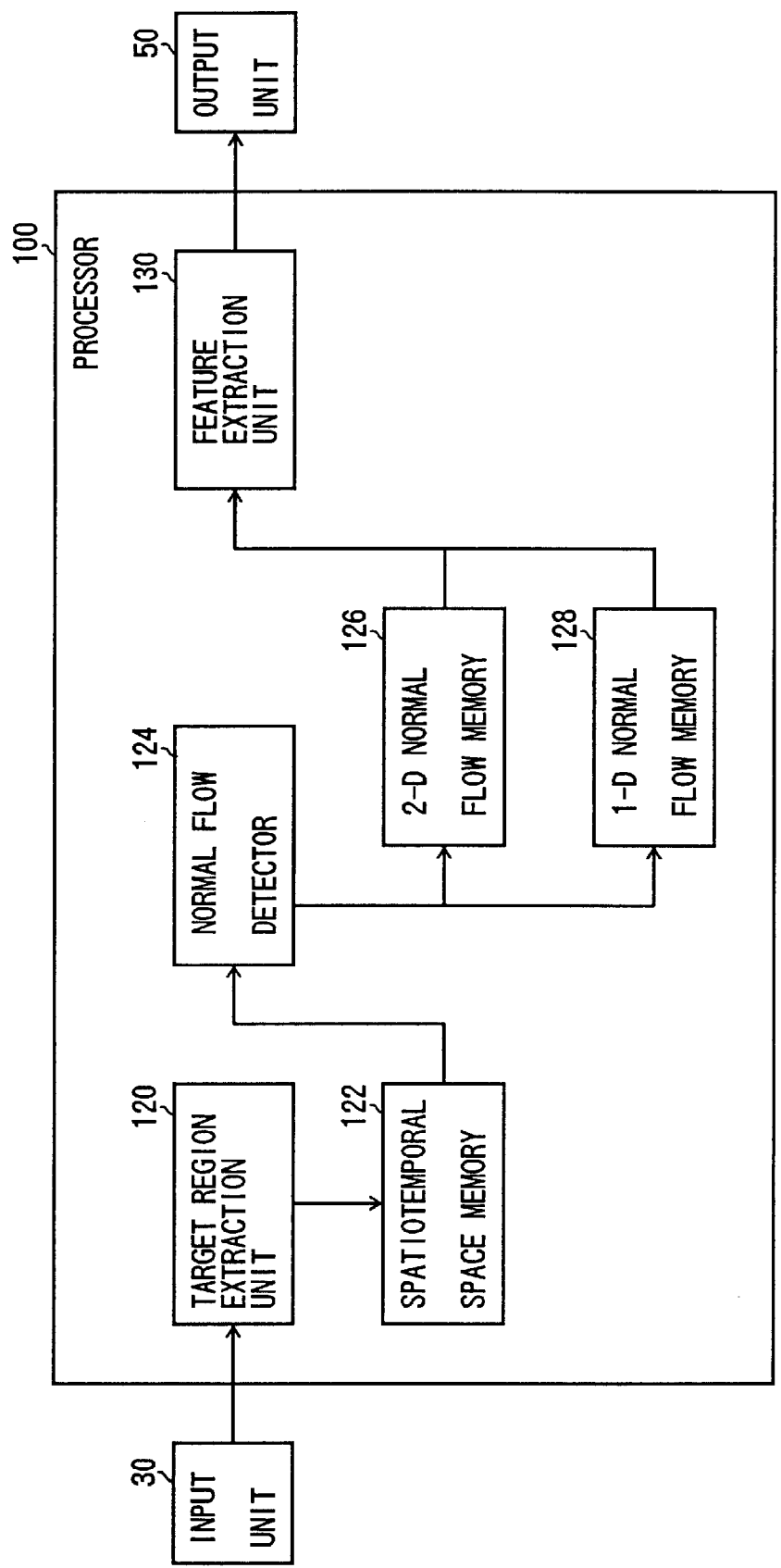
FIG. 12 is a system block diagram showing a functional system structure of a fourth embodiment of the present invention.

FIG. 12 shows a functional system structure of the fourth embodiment of the present invention. This fourth embodiment realizes a technique for extracting a distribution of normal velocities (normal flows) of the contour of the image from a plurality of frames within the image sequence, and measuring motion uniformity or specific components of motion from the extracted normal flows. The system structure of the fourth embodiment of the present invention includes a input unit for inputting the image sequence data, a processor 100 for extracting image features from the image sequence data, and an output unit 50 for outputting the processed result of the processor 100.

In this fourth embodiment of the present invention, the processor 100 includes a target region extraction unit 120 for extracting a target region where the features are to be extracted from the image sequence data input to the input unit 30, and a spatiotemporal space memory 122 for storing the target region extracted by the target region extraction unit 120. The processor 100 also includes a normal flow detector 124 for obtaining a histogram of the normal flows, a two-dimensional normal flow memory 126 for storing the obtained histogram of 2 variables of the normal flows, and a one-dimensional normal flow memory 128 for storing a histogram of normal flows related to the magnitude of the velocity. Furthermore, a feature extraction unit 130 of the processor 100 extracts the feature values related to the motion of the image based on the histograms of the normal flows stored in the two-dimensional normal flow memory 126 and the one-dimensional normal flow memory 128.

For example, the output unit 50 outputs the feature values output from the feature extraction unit 130 to a display unit or a file unit.

Figure 13:
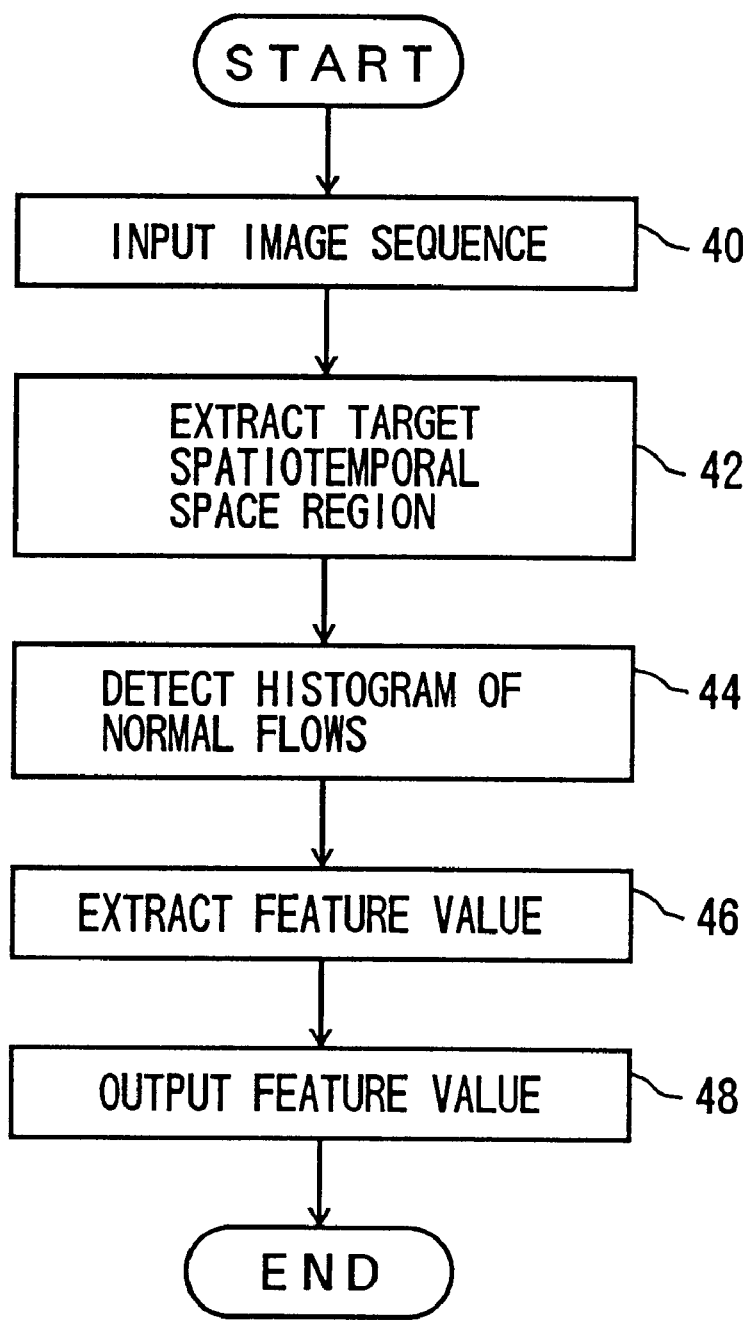
FIG. 13 is a flow chart for explaining an operation of the system structure of the fourth embodiment of the present invention.

FIG. 13 shows a flow chart for explaining the operation of the system structure of the fourth embodiment of the present invention. The system structure of this embodiment operates as follows. In a step 40, the image sequence data is input from the input unit 30 to the target region extraction unit 120 of the processor 100. In a step 42, the target region extraction unit 120 extracts from the input image sequence the target region from which the features are to be extracted, and the motion trajectory drawn by the edge and contour within the target region is obtained and stored in the spatiotemporal memory 122. Next, in a step 42, the normal flow detector 124 obtains a histogram of the normal flows within the target region, and stores the histogram in the two-dimensional normal flow memory 126 and the one-dimensional normal flow memory 128. In a step 46, the feature extraction unit 130 extracts the feature values related to the motion included in the image sequence based on the obtained histogram of the normal flows. Finally, in a step 48, the output unit 50 outputs the feature values obtained by the feature extraction unit 130.

Next, a more specific description will be given of the operation of each of the constituent elements of the processor 100.

The target region extraction unit 120 extracts from the image sequence input from the input unit 30 a region which has an arbitrary space range and time range and from which the image features are to be measured. The target region extraction unit 120 stores the extracted region in the spatiotemporal memory 122.

In the spatiotemporal memory 122, the region extracted from the image sequence by the target region extraction unit 120 is stored in 2 axes of the image space and 1 time axis (or time base), that is, in a total of 2 axes, as an array of three-dimensional image gray level (or brightness or intensity).

The normal flow detector 124 detects the normal flows of the target object included in the region which is extracted from the image sequence by the target region extraction unit 120 and stored in the spatiotemporal memory 122, and calculates a histogram of the normal flows. The normal flow detector 124 stores the calculated histogram of the normal flows in the two-dimensional normal flow memory 126 and the one-dimensional normal flow memory 128.

The fourth embodiment of the present invention employs a method which uses the histogram of the tangent planes as an example of a method of obtaining the histogram of the normal flows. More particularly, the method of obtaining the histogram of the normal flows is realized by the following four steps S1 through S4.

Step S1: First, a motion trajectory having the surface shape drawn in the three-dimensional spatiotemporal space by the moving contour of the target within the image when each of the frames of the image sequence are stacked in the time-axis direction is obtained.

Step S2: Next, a distribution of the tangent planes tangent to the motion trajectory having the surface shape is obtained.

Step S3: A histogram of 2 variables of the normal flows is obtained from the histogram of the tangent planes.

Step S4: A histogram of 1 variable of the normal flows is obtained from the histogram of the tangent planes.

In the fourth embodiment of the present invention, the above described step S1 can be realized by the same construction and functions as the combination of the motion trajectory extraction unit 102 and the spatiotemporal space memory 110 of the first embodiment of the present invention described above.

In addition, the above described step S2 can be realized by the same construction and functions as the combination of the Hough transform unit 104 and the three-dimensional voting. memory 112 of the first embodiment of the present invention described above.

Further, with regard to the above described step S3 of the fourth embodiment of the present invention, it is possible to store the two-dimensional normal flows representing the histogram of 2 variables of the normal flows into the two-dimensional normal flow memory 126 by employing the same construction and functions as the combination of the space projection unit 106 and the normal parameter space memory 114 of the first embodiment of the present invention described above.

However, with regard to the above described step S4, it is necessary to separately calculate the histogram of a variable of the normal flows.

Figure 14:
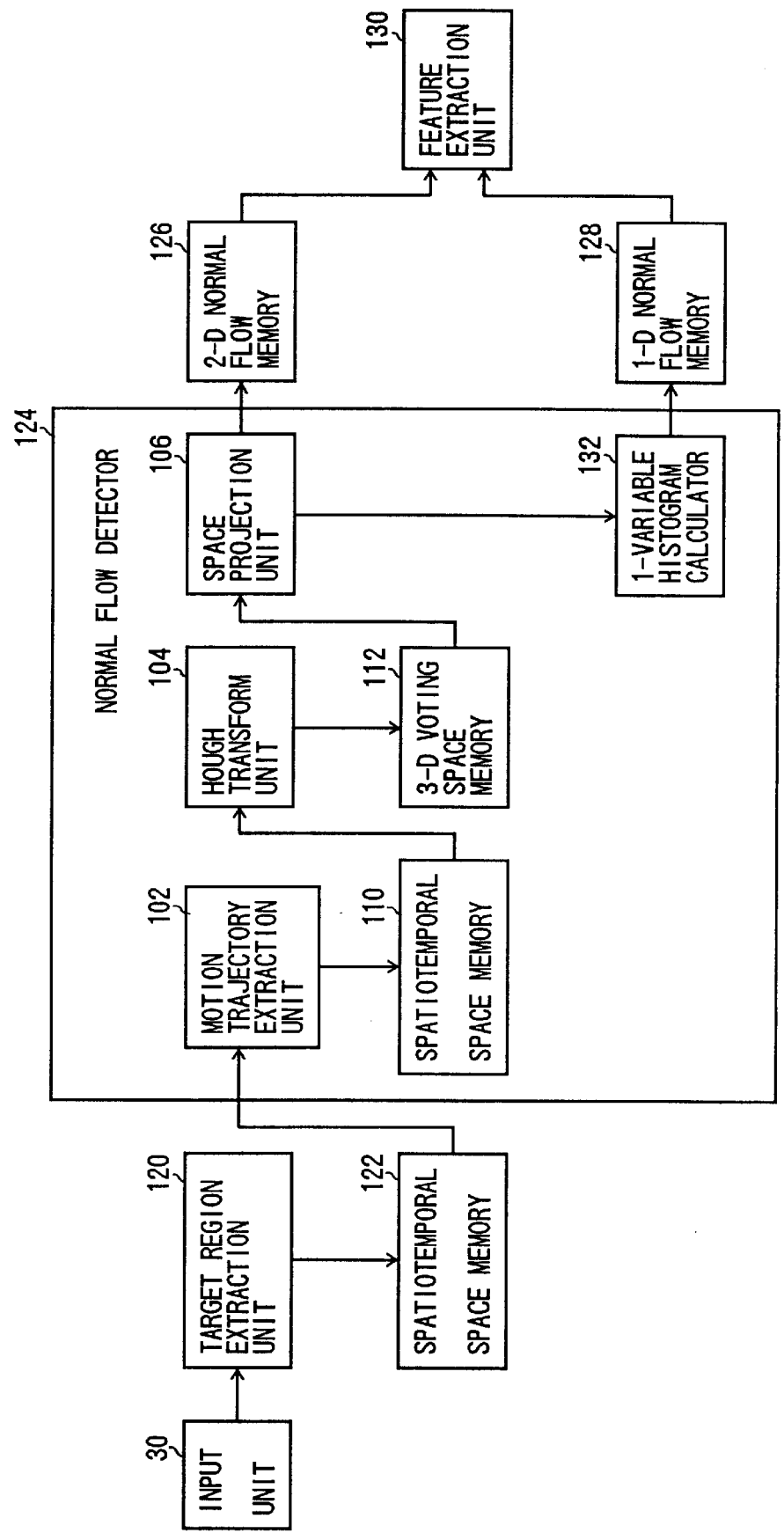
FIG. 14 is a system block diagram showing a construction of a normal flow detector of the fourth embodiment of the present invention.

FIG. 14 is diagram for explaining in more detail the normal flow detector 124 which realizes the above described steps S1 through S4. As shown in FIG. 14, the normal flow detector 124 includes the motion trajectory extraction unit 102, the spatiotemporal memory 110, the Hough transform unit 105, the three-dimensional voting space memory 112, and the space projection unit 106 shown in FIG. 2 described above. The normal flow detector 124 shown in FIG. 14 further includes a variable histogram calculator 132 for calculating the histogram of 1 variable of the normal flows.

The output of the space projection unit 106 35 within the normal flow detector 124 is stored in the two-dimensional normal flow memory 126 as the histogram of 2 variables of the normal flows. The output of the 1 variable histogram calculator 132 is stored in the one-dimensional normal flow memory 128 as the histogram of 1 variable of the normal flows.

A description will not be repeated with respect to the motion trajectory extraction unit 102, the spatiotemporal memory 110, the Hough transform unit 105 and the three-dimensional voting space memory 112 which were described above in conjunction with the first embodiment of the present invention.

In the parameter space $S_P(\theta, \emptyset, \rho)$ formed in the three-dimensional voting space memory 112, the parameter θ corresponds to the direction of the normal flow, the parameter ø corresponds to the magnitude of the velocity of the normal flow, and the parameter ρ indicates the position of the corresponding contour. Accordingly, by projecting the distribution within the parameter space $S_P(\theta, \emptyset, \rho)$ to a space formed by the parameters θ and ø, it is possible to obtain the histogram of 2 variables having the direction and velocity of the normal flow as the parameters. For example, a histogram $S_N(\theta, \emptyset)$ of 2 variables of the normal flows represented by the following formula (22) is obtained as a processed result of the space projection unit 106.

$$S_N(\theta, \emptyset) = \max_\rho S_P(\theta, \emptyset, \rho) \quad (22)$$

On the other hand, a histogram $S_L$ of 1 variable having the velocity of the normal flow as the parameter can be obtained by the following formula (23) using the histogram $S_N(\theta, \emptyset)$ of the two-dimensional normal flows.

$$S_L(\emptyset) = \Sigma_\theta S_N(\theta, \emptyset) \quad (23)$$

In this case, a relationship described by the following formula (24) stands between a magnitude V (pixels/frame) of the velocity of the normal flow and the parameter ø (degrees).

$$V = 1/\tan\emptyset \quad (24)$$

The histogram $S_N(\theta, \emptyset)$ of the two-dimensional normal flows obtained in this manner is stored in the two-dimensional normal flow memory 126 in the two-dimensional array. On the other hand, the histogram $S_L(\emptyset)$ of the one-dimensional normal flows is stored in the one-dimensional normal flow memory 128 in the one-dimensional array.

Next, the feature extraction unit 130 extracts the feature values of the motion included in the target region of the image sequence, based on the histograms of the 2-variable and 1-variable normal flows stored in the two-dimensional normal flow memory 126 and the one-dimensional normal flow memory 128. The feature extraction unit 130 supplies the extracted feature values to the output unit 50.

Figure 15:
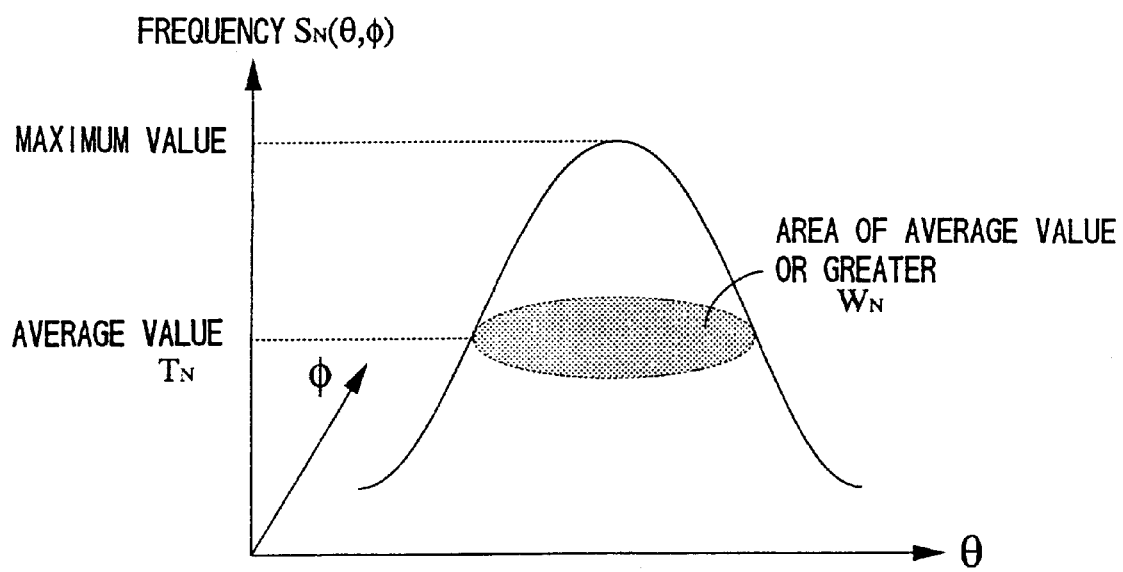
FIG. 15 is a diagram showing a three-dimensional representation of a histogram of normal flows.

In the fourth embodiment of the present invention, the feature extraction unit 130 first extracts the features related to the motion uniformity of the target included in the target region, based on the spread of the 2-variable histogram having the direction and velocity of the normal flow as the parameters. FIG. 15 shows the spread of the histogram of the normal flows. In order to extract the spread of the histogram of the normal flows such as that shown in FIG. 15, the feature values of the motion uniformity are calculated from a ratio of the maximum value of the histogram of the normal flows and an average value $T_N$ or, a ratio of the maximum value of the histogram of the normal flows and an area $W_N$ having a distribution of values greater than or equal to the average value. More particularly, although not limited to the following, the feature values can be calculated according to $f_1$ through $f_5$ based on the following formulas (25) through (29).

$$f_5 = [1/\{\max_{\theta,\phi} s_N(\theta, \phi)\}] \cdot [\{\max_{\theta,\phi} s_N(\theta, \phi) - T_N\}/W_N] \quad (29)$$

Second, with respect to the 1-variable histogram having the velocity of the normal flow as the parameter, the motion features of the target included in the image sequence is calculated from a ratio of an accumulated value of frequencies of the velocities of the normal flows within an arbitrary interval and an accumulated value of the frequencies of the velocities of the normal flows as a whole. More particularly, for example, a ratio occupied by motions having velocities greater than or equal to a velocity $V_{TH}$ (pixels/frame) of the normal flow which is arbitrarily set with respect to the motions as a whole can be calculated from the following formula (30), where $\emptyset_v = \tan^{-1} V_{TH}$.

$$f_6 = [\Sigma_\emptyset \geq \emptyset_v S_L(\emptyset)] / [\Sigma_\emptyset S_L(\varsigma)] \quad (30)$$

Of course, the method of extracting the feature values is not limited to the method described above.

As described above, the fourth embodiment of the present invention detects the motion of the target within the image sequence as the histogram of the normal flows, and the feature values such as the motion uniformity of the target within the image sequence is extracted from the spread of the histogram of the normal flows. Hence, the features related to the complex motion caused by the appearance, disappearance and non-rigidity of the target is extracted from the image sequence. In addition, in the fourth embodiment of the present invention, the histogram of the normal flows is detected as the histogram of the tangent planes tangent to the motion trajectory which has the surface shape and is drawn within the spatiotemporal space by the moving contour of the target within the image sequence. As a result, even under an environment in which the noise added to the image and the appearance and disappearance of the target occur, it is possible to stably calculate the motion features depending on the effects of the noise, appearance and disappearance.

Figure 16:
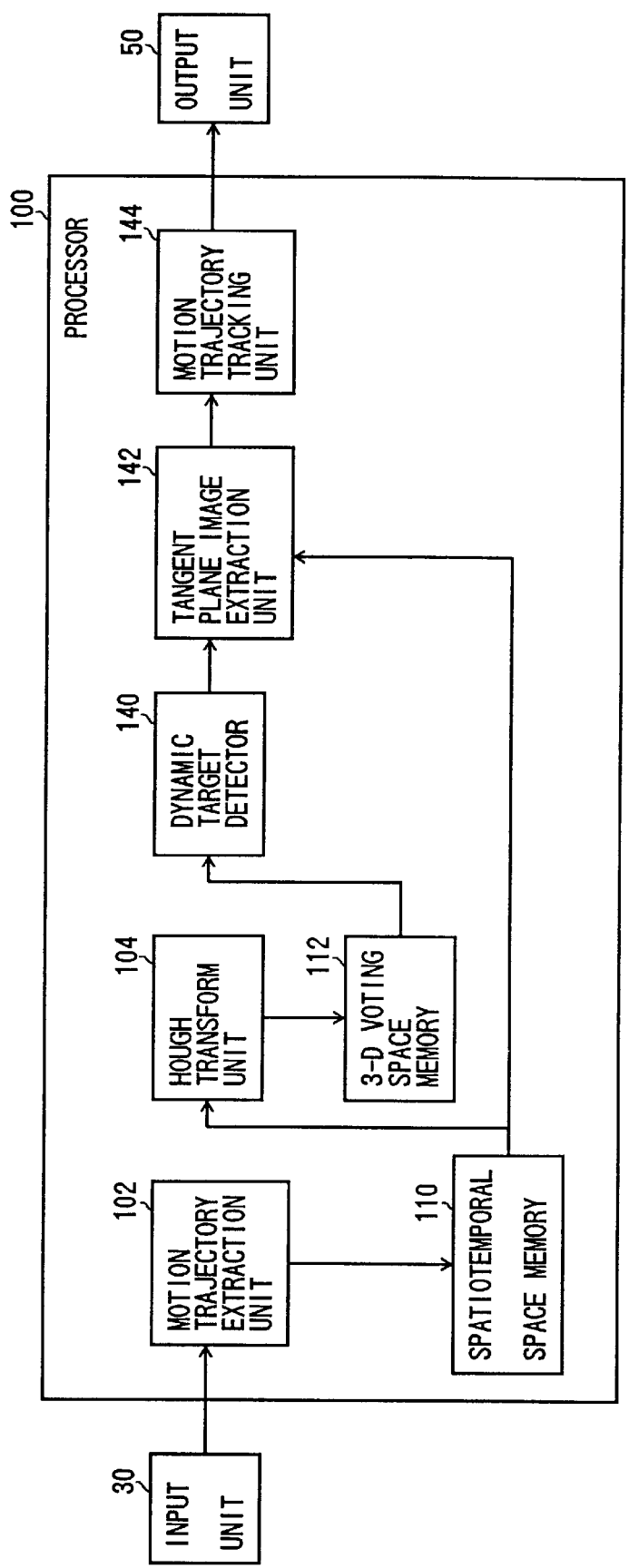
FIG. 16 is a system block diagram showing a functional system structure of a fifth embodiment of the present invention.

FIG. 16 shows a functional system structure of a fifth embodiment of the present invention. In the fifth embodiment of the present invention, temporal features related to the occlusion, appearance and disappearance of the target are extracted. For this reason, the tangent planes tangent to the motion trajectory are detected from the histogram of the tangent planes, and the distribution of the motion trajectory on the detected tangent planes is output as the image. Next, information related to the occlusion is defined from the discontinuity or run length along the moving direction of the motion trajectory.

The system structure shown in FIG. 16 includes an input unit 30, a processor 100, and an output unit 50. The processor 100 carries out a process of extracting the temporal features related to the occlusion, appearance and disappearance of the target, with respect to the image sequence input from the input unit 30. The processed result of the processor 100 is output via the output unit 50.

The processor 100 is constructed as follows. A motion trajectory extraction unit 102 extracts from the image sequence input from the input unit 30 a target region from which the features are to be extracted, and then extracts a motion trajectory drawn within the spatiotemporal space by he edge and contour within the target region. The motion trajectory extracted by the motion trajectory extraction unit 102 is stored in a spatiotemporal space memory 110. The processor 100 further includes a Hough transform unit 104 for obtaining a distribution of tangent planes tangent to the motion trajectory, and a three-dimensional voting space memory 112 for storing the distribution of the tangent planes obtained as a result of a Hough transform. The motion trajectory extraction unit 102, the spatiotemporal space memory 110, the Hough transform unit 104 and the three-dimensional voting space memory 112 have the same construction and functions as the corresponding constituent elements designated by the same reference numerals in the system structure of the first embodiment of the present invention shown in FIG. 2, and a more detailed description of these constituent elements will be omitted with respect to the fifth embodiment of the present invention.

The processor 100 also includes a dynamic target detector 140 for detecting a dynamic target within the target region from the distribution of the tangent planes stored in the three-dimensional voting space memory 112, and outputs a distribution of the tangent planes of this dynamic target. In addition, the processor 100 is provided with a tangent plane image extraction unit 142 for extracting a motion trajectory distribution on the tangent planes from the spatiotemporal space memory 110, and a motion trajectory tracking unit 144 for tracking the motion trajectory on the tangent plane image and measuring information related to occlusion.

Figure 17:
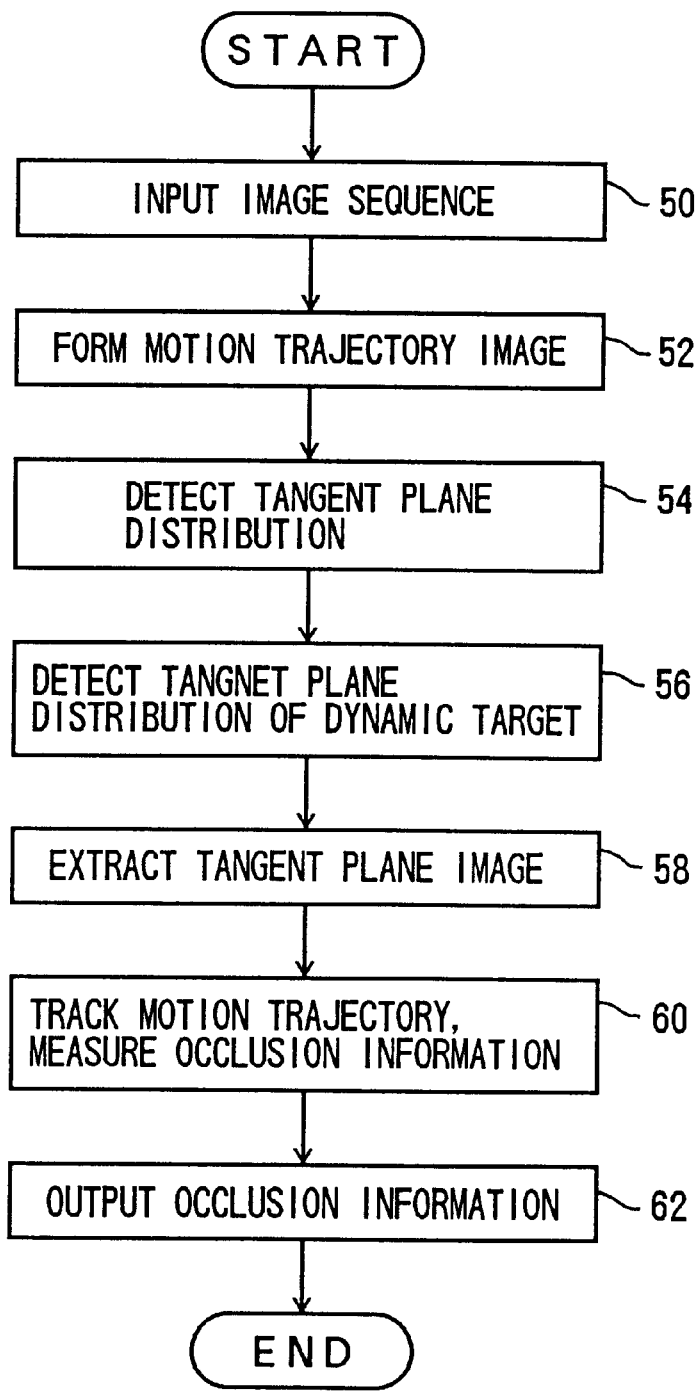
FIG. 17 is a flow chart for explaining an operation of the system structure of the fifth embodiment of the present invention.

FIG. 17 shows a flow chart for explaining the operation of the system structure of the fifth embodiment of the present invention. The system structure of this embodiment operates as follows.

First, in a step 50, the image sequence from the input unit 30 is supplied to the motion trajectory extraction unit 102. In a step 52, the motion trajectory extraction unit 102 extracts from the supplied image sequence the motion trajectory included in the target region, and stores the motion trajectory image in the spatiotemporal space memory 110. Next, in a step 54, the Hough transform unit 104 detects the tangent plane distribution of the motion trajectory from the motion trajectory image stored in the spatiotemporal space memory 110, and stores the tangent plane distribution in the three-dimensional voting space memory 112. In a step 56, the dynamic target detector 140 detects the tangent plane distribution related to the dynamic target within the target region, from the tangent plane distribution stored in the three-dimensional voting space memory 112. Next, in a step 58, the tangent plane image extraction unit 142 extracts as the image the planar motion trajectory distribution related to the detected tangent planes. In a step 60, the motion trajectory tracking unit 144 tracks the motion trajectory on the extracted image, measures occlusion information, and supplies the measured result to the output unit 50. Finally, in a step 62, the output unit 50 outputs the occlusion information obtained from the motion trajectory tracking unit 144.

Next, a more detailed description will be given of the functions of the processor 100. As described above, the motion trajectory extraction unit 102, the spatiotemporal space memory 110, the Hough transform unit 104 and the three-dimensional voting space memory 112 were described in detail in conjunction with the first embodiment of the present invention. Hence, a description will hereunder be given of the dynamic target detector 140, the tangent plane image extraction unit 142 and the motion trajectory tracking unit 144.

The dynamic target detector 140 detects the dynamic target within the target region, from the tangent plane distribution stored in the three-dimensional voting space memory 112, and operates so as to output the tangent plane distribution of the dynamic target. In the fifth embodiment of the present invention, attention is drawn particularly to the target which makes a translation motion at the same velocity and in the same direction within the target region. The velocity components of the target are estimated, and the tangent plane distribution originating from the target having the estimated velocity components is acquired.

Accordingly, in the case where the target translates in the same direction at the same velocity, the fifth embodiment of the present invention utilizes the characteristic that the directions of the intersection lines of the tangent planes all match the directions of the target motion. In addition, among the intersection lines formed by the combination of all of the tangent planes, the direction of the most conspicuous intersection line is acquired as the most dominant translational velocity component within the target region.

Figure 18:
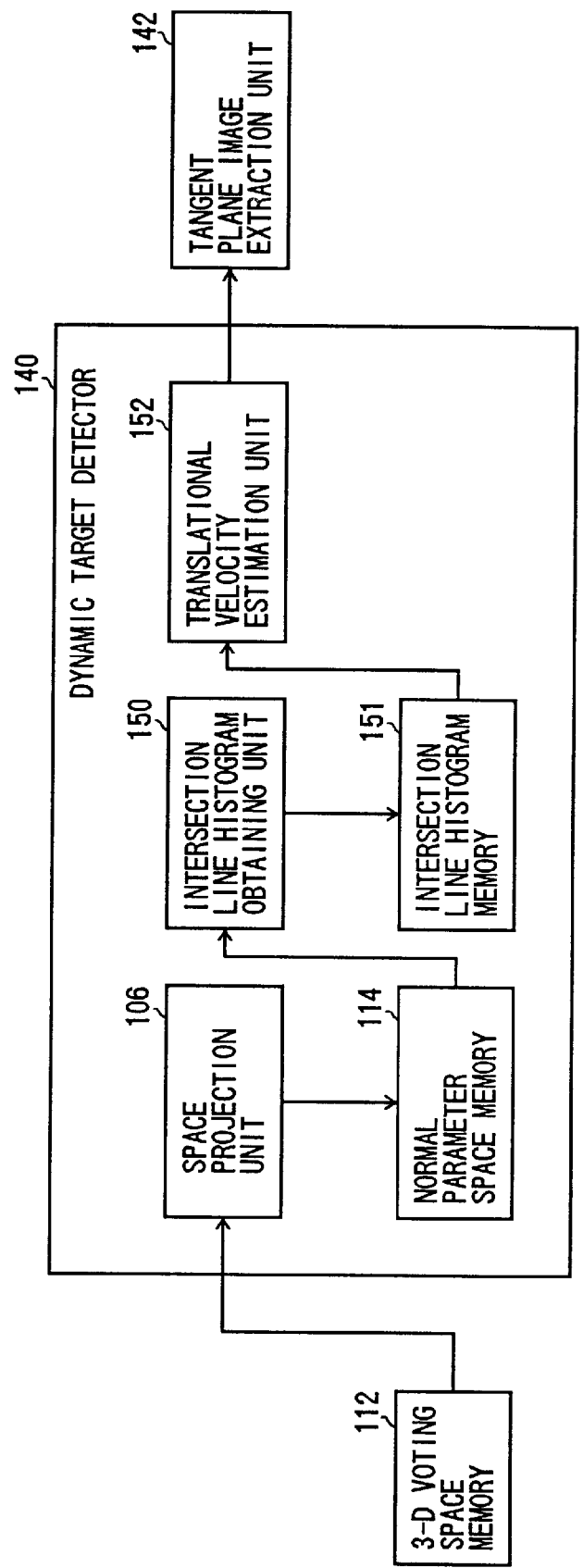
FIG. 18 is a system block diagram showing a dynamic target detector of the fifth embodiment of the present invention.

FIG. 18 shows the construction of the dynamic target detector 140 which realizes the above described operation, that is, acquires the most dominant translational velocity component within the target region from the tangent plane distribution stored in the three-dimensional voting space memory 112. As shown in FIG. 18, the dynamic target detector 140 includes a space projection unit 106, a normal parameter space memory 114, an intersection histogram obtaining unit 150, an intersection histogram memory 151, and a translational velocity estimation unit 152.

The above described dynamic target detector 140 may be constructed similarly to the construction which is realized in a part of the system structure of the second embodiment of the present invention describe above in conjunction with FIGS. 6 and 7. Accordingly, no further description will be given of each of the constituent elements of the dynamic target detector 140.

As already described above with respect to the second embodiment of the present invention, the translational velocity estimation unit 152 detects the peak in the vote distribution within the intersection parameter space $S_L$, and obtains the most dominant translational velocity component of the target object within the target region from the coordinate values $(\alpha_P, \beta_P)$ of the detected peak. The direction of the motion is obtained as $$\alpha_P \tag{31}$$

and a magnitude V of the velocity is obtained by the following formula (32).

$$V = 1/\tan\beta_P \tag{32}$$

Next, with respect to the dynamic target having such a velocity component detected within the target region, the distribution of the tangent planes tangent to the motion trajectory of the contour of this dynamic target is considered. When the translational velocity component of the dynamic target within the target region is denoted by the intersection line direction $(\alpha_P, \beta_P)$, a relationship described by the following formula (33) stands between the parameters θ and ø in the normal directions of the tangent planes, as described above.

$$\phi = -\tan^{-1}\{\tan\beta_P/\cos(\alpha_P - \theta)\} \tag{33}$$

From the formula (33), it may be seen that the distribution of the tangent planes to be acquired exists on a cylinder having the curve described by the formula (33) as the base curve of the cylinder, within the plane parameter space $S_P(\theta, \phi, \rho)$ which is a three-dimensional space.

The tangent plane image extraction unit 142 extracts as an image the motion trajectory distribution on the tangent planes from the tangent plane distribution of the motion trajectory drawn by the contour and edge having the translational velocity estimated by the dynamic target detector 140. A description will now be given of a particular example in the fifth embodiment of the present invention.

A case will be considered where occlusion information related to the contour and edge having the tangent line direction θ' is obtained. The parameter ø determined by the relationship described by the formula (33) is denoted by ø'. In addition, when the histogram $S_P(\theta', \phi', \rho)$ of the tangent planes is searched in the ρ direction, and the parameter ρ corresponding to the peak in the histogram $S_P(\theta', \phi', \rho)$ is denoted by ρ'. One tangent plane is determined by parameters (θ', ø', ρ'). Coordinates on the tangent planes are described by vectors in 2 directions, namely, the moving direction and the tangent line direction of the contour and edge. A vector V in the moving direction is described by the following formula (34), while a tangent line vector ps of the contour and edge is described by the following formula (35).

$$V=(V_x, V_y, V_z)=(\cos\alpha_P \cdot \cos\beta_P, \sin\alpha_P \cdot \cos\beta_P, \sin\beta_P) \quad (34)$$

$$p_s=(-\sin\theta', \cos\theta', 0) \quad (35)$$

In addition, a vertical vector $p_o$ from the origin within the target region to the tangent plane can be described by the following formula (36) using the formula (2) of the polar coordinates.

$$p_o=\rho' \cdot (\cos\theta' \cdot \sin\phi', \sin\theta' \cdot \sin\phi', \cos\phi') \quad (36)$$

Accordingly, a position vector z(s, 1) on the tangent plane can be described by the following formula (37), where 1 denotes a parameter of the moving direction (time), and s denotes a parameter of the tangent line direction (space) of the contour.

$$z(s, 1)=s \cdot p_s + 1 \cdot V + p_o \quad (37)$$

Next, when the spatiotemporal difference image D(x, y, t) stored in the spatiotemporal space memory 110 is cut out at the tangent plane of the formula (37) as the three-dimensional volume data, a cross sectional image obtained thereby is acquired as a tangent plane image Z(s, 1) which is described by the following formula (38). In this tangent plane image Z(s, 1), the motion trajectory of 1 point on the contour moves in the positive direction along 1 axis.

$$Z(s, 1)=(D(z(s, 1))=(D(s \cdot p_s + 1 \cdot V + p_o) \quad (38)$$

Next, the motion trajectory tracking unit 144 obtains the motion trajectory distribution on the tangent planes extracted as the image in the tangent plane image extraction unit 142, tracks the moving direction, and measures information related to the occlusion. For example, in the fifth embodiment of the present invention, the motion trajectory tracking unit 144 operates as follows.

First, the following method is employed as an example of a method for judging the existence of the occlusion. In the tangent plane image Z(s, 1), the motion trajectory distribution is checked along 1 axial direction with respect to each s. With respect to s for which the motion trajectory exists, an attempt is made to detect a position where the motion trajectory is interrupted. When no interruption of the motion trajectory is detected within the target region of the target tangent plane image, it is judged that no occlusion exists within the target region. On the other hand, it is judged that the occlusion exists within the target region when the interruption of the motion trajectory is detected.

In order to obtain information related to the degree of occlusion, a reference is made to the distribution of the motion trajectory along 1 axial direction in the tangent plane image Z(s, 1) for each s, and a run length of the motion trajectory from the appearance to the disappearance is measured. An average value of this run length is output as the degree of occlusion. When the average run length is long, it may be judged that the occlusion is small. On the other hand, it may be judged that the occlusion is large when the average run length is short. For example, when the average run length on the tangent plane image is denoted by LENGTH, a distance DIST for which the target appears on the image plane can be described by DIST=(LENGTH)·cosø'.

Furthermore, a description will now be given of an example of a method for acquiring information related to starting point and terminal point positions of the occlusion.

In the tangent plane image Z(s, 1), the motion trajectory along 1 axial direction is checked for each s, and a position ($s_d$, $1_d$) where the motion trajectory disappears is detected within the tangent plane image range included in the target region. Hence, it is possible to know the starting point of the occlusion. A spatial position within the spatiotemporal coordinates corresponding to the position ($s_d$, $1^d$) obtained from the formula (38) indicates the position on the image plane. Similarly, it is possible to know the position of the terminal point of the occlusion by detecting the position ($s_d$, $1_d$) where the motion trajectory appears.

As described above, according to the fifth embodiment of the present invention, the motion trajectory drawn within the spatiotemporal space by the contour and edge of the target which moves within the image sequence is extracted when measuring information related to the existence, frequency and/or position of the occlusion which has a possibility of occurring with respect to the dynamic target included within the image sequence. Next, the histogram of the tangent planes tangent to the extracted motion trajectory is acquired, and the motion trajectory distribution on the acquired tangent planes is extracted as the image. By measuring the intermittence of the motion trajectory in the moving direction with respect to this extracted image, it is possible to obtain information related to the occlusion of the target. Therefore, in a situation where the occlusion exists, the dynamic target is stable tracked, and it is possible to accurately obtain the information related to the occlusion.

Next, a description will be given of various modifications of the first through fifth embodiments of the present invention described above.

Modification 1:

In the embodiments described above, the Hough transform is used when obtaining the histogram of the tangent planes tangent to the motion trajectory from the motion trajectory which is structured as the three-dimensional volume data. However, the present invention is not limited to the use of the Hough transform. A description will be given of another method of obtaining from the motion trajectory the histogram of the tangent planes tangent to the motion trajectory. A histogram extraction unit which is constructed to realize this other method may be used in place of the Hough transform unit.

A normal vector ($D_x$, $D_y$, $D_t$) of the tangent plane tangent to the motion trajectory passing a certain point ($x_1$, $y_1$, $t_1$) within a spatiotemporal difference image D(x, y, t), can be calculated from the following formulas (39) through (41) as differences between adjacent pixels. Of course, differences between other adjacent pixels may be used.

$$D_x=D(x_1+1, y_1, t_1)-D(x_1, y_1, t_1) \quad (39)$$

$$D_y=D(x_1, y_1+1, t_1)-D(x_1, y_1 t_1) \quad (40)$$

$$D_t=D(x_1, y_1, t_1+1)-D(x_1, y_1, t_1) \quad (41)$$

Next, a unit normal vector ($n_x$, $n_y$, $n_t$) which is obtained by normalizing the magnitude of the normal vector ($D_x$, $D_y$, $D_t$) to 1 is calculated from the following formulas (42) through (44).

$$n_x=D_x/[D_x^2+D_y^2+D_t^2]^{1/2} \quad (42)$$

$$n_y=D_y/[D_x^2+D_y^2+D_t^2]^{1/2} \quad (43)$$

$$n_t=D_t/[D_x^2+D_y^2+D_t^2]^{1/2} \quad (44)$$

Generally, an equation of a plane which passes the point $(x_1, y_1, t_1)$ and has the unit normal vector $(n_x, n_y, n_t)$ can be described by the following formula (45).

$$n_x(x-x_1)+n_y(y-y_1)+n_t(t-t_1)=0 \tag{45}$$

Accordingly, the parameters $\theta$, $\emptyset$ and $\rho$ of the polar coordinate representation of the plane can be calculated from the following formulas (46) through (48) based on the relationship to the equation of the lane using these parameters.

$$\theta=\tan^{-1}(n_y/n_x) \tag{46}$$

$$\emptyset=\cos^{-1}n_t \tag{47}$$

$$\rho=n_x x_1+n_y y_1+n_t t_1 \tag{48}$$

Accordingly, with respect to each point $(x_1, y_1, t_1)$ within the spatiotemporal difference image $D(x, y, t)$, it is possible to calculate the parameters $(\theta, \emptyset, \rho)$ of the tangent planes on the motion trajectory. For this reason, the histogram of the tangent planes is secured as a three-dimensional array by making discrete the parameter space formed by the parameters of the tangent planes. Then, the values of all elements in the three-dimensional array are initialized to 0. The parameters $(\theta, \emptyset, \rho)$ of the tangent planes are calculated for each element $(x_1, y_1, t_1)$ of the spatiotemporal difference image $D(x, y, t)$, and the values of $D(x_1, y_1, t_1)$ are added to each element of the array in the corresponding parameter spaces. After such an operation is carried out with respect to the pixels within all of the spatiotemporal difference images, the parameter spaces are obtained as the histogram of the tangent planes.

This method described above obtains the normal direction of the tangent plane from the gray level difference of the adjacent pixels within the spatiotemporal difference image. For this reason, this method may be considered as being more sensitive to external disturbances such as noise as compared to the method employing the three-dimensional Hough transform.

Modification 2:

In the second embodiment of the present invention, extracting the distribution of the tangent planes along the tangent line direction of the contour, the distribution CC used to represent the histogram of the tangent line direction of the contour may be calculated from formulas other than the formula (15) described above, such as the following formula (49) or (50), where A denotes an average value of the distribution CS in the $\rho$ direction, and Wcs($\theta$) denotes a number of cells having values greater than or equal to an average value A when the distribution CS is checked in an order in the $\rho$ direction.

$$CC(\theta)=\max_\rho CS(\theta, \rho)-A \tag{49}$$

$$CC(\theta)=[\max_\rho CS(\theta, \rho)-A]/W_{CS}(\theta) \tag{50}$$

In addition, the uniformity of the contour or, the strength of the directionality, is defined by the formula (16) in the second embodiment of the present invention, but may be defined by the following formula (51), where $W_H$ denotes a number of cells of an arrangement $CC(\theta)$ having a value greater than or equal to an average value $\overline{CC}$.

$$f_1=[1/W_H][\{\max_\theta CC(\theta)-\overline{CC}\}/\{\max_\theta CC(\theta)\}] \tag{51}$$

Furthermore, instead of using the formula (17) to define the concentration of the contour in the tangent line direction $\theta$, it is possible to use the following formula (52).

$$f_2(\theta)=A/[\max_\rho CS(\theta, \rho)] \tag{52}$$

For example, assume a case where the gray level values of all edges are the same and have an impulse shape. In this case, when the contour (edge) parallel to the tangent line direction $\theta$ of a certain contour is considered, the number of contours (edges) per unit pixel in this case corresponds to the definition of the concentration of the contour. When only 1 contour exists, the concentration becomes a minimum, and the concentration increases as the number of contours increases. The concentration becomes a maximum when the edge exists at all of the pixels. In this state, all of the pixels are filled, and the edge in the direction $\theta$ is not visible.

The value of CC($\theta$) may be used as a feature value indicating the degree of scattering or the degree of coarseness, and having a meaning opposite to the concentration.

Instead of the repetition $f_3$ of the entire contour defined in the second embodiment of the present invention, it is also possible to use a minimum value of $f_2(\theta)$ as the feature value representing the concentration of the entire pattern, as indicated by the following formula (53).

$$f_3=\min_\theta f_2(\theta) \tag{53}$$

In addition, the degree of scattering of the entire pattern may be defined by a maximum value max eCC($\theta$), as another feature value.

Modification 3:

In the fourth embodiment of the present invention, when obtaining the histogram of the normal flows from the histogram of the tangent planes or partial planes, the formula (22) is used as the 2-variable histogram $S_N(\theta, \emptyset)$ of the normal flows. However, it is possible to use the definition of the following formula (54) or (55) in place of the formula (22), where A denotes an average value of $S_P$ in the pdirection.

$$S_N(\theta, \emptyset)=\max_\rho S_P(\theta, \emptyset, \rho)-A(\theta, \emptyset) \tag{54}$$

$$S_N(\theta, \emptyset)=[\max_\rho S_P(\theta, \emptyset, \rho)-A(\theta, \emptyset)]/[\max_\rho S_P(\theta, \emptyset, \rho) \tag{55}$$

In this case, the average value A can be calculated from the following formula (56), where $N_\rho$ denotes a number of divisions of the array $S_P$ in the $\rho$ direction, that is, the number of cells. When calculating the histogram of the tangent planes using the three-dimensional Hough transform as in the fourth embodiment of the present invention, this average value $A(\theta, \emptyset)$ is a constant value independent of $\theta$ and $\emptyset$.

$$A(\theta, \emptyset)=_\rho\Sigma S_P(\theta, \emptyset, \rho)/N \tag{56}$$

Modification 5:

In the second embodiment of the present invention, the tangent plane corresponding to the estimated velocity component is extracted when specifying the tangent plane from the histogram of the tangent planes. However, it is possible to employ other methods, such as a method which searches for a local maximum in the tangent plane distribution.

Next, a description will be given of applications of the first through fifth embodiments of the present invention to a weather radar image sequence obtained from a weather radar equipment.

Application 1:

Application of the first embodiment of the present invention

Figure 19A:
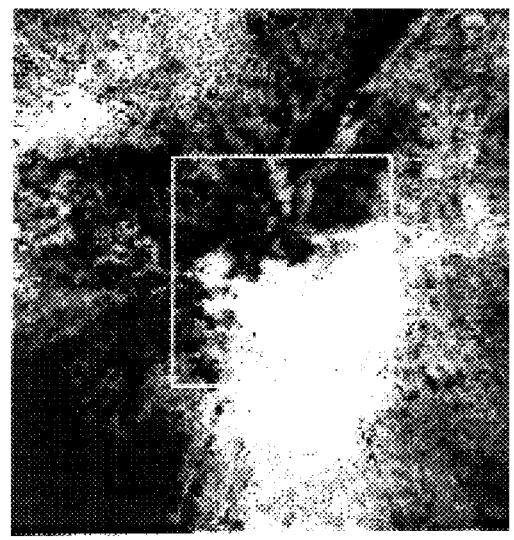
FIGS. 19A, 19B and 19C respectively are diagrams showing 3 input image sequence frames used in an application of the first embodiment of the present invention.
Figure 19B:
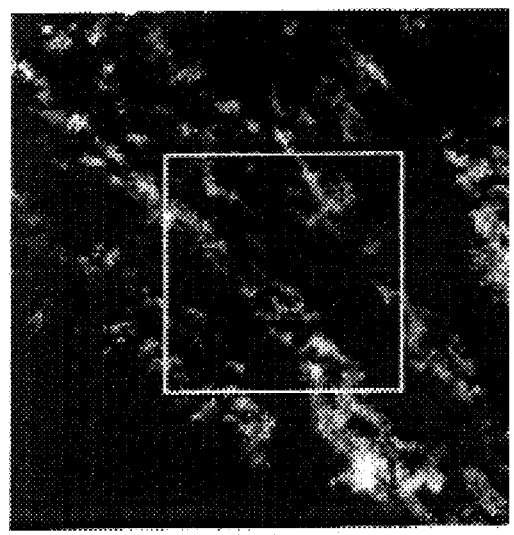
Figure 19C:
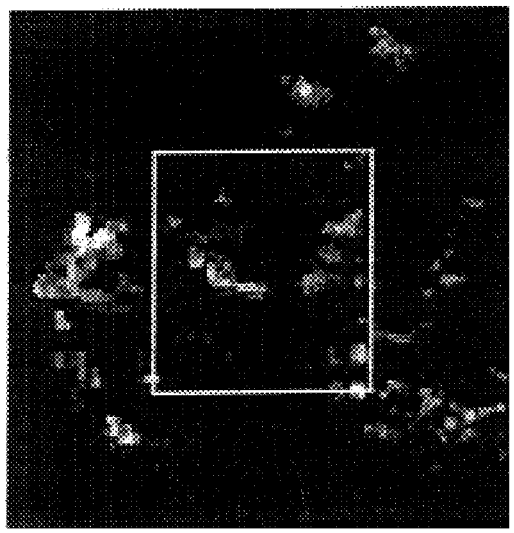

FIGS. 19A through 19C show patterns having 3 different features in a part within a frame of the weather radar image sequence obtained from the weather radar equipment. FIG. 19A shows a stagnating stratiform pattern, wherein random luminance change on the image surface is more conspicuous than the motion component. FIG. 19B shows a band-shaped pattern in which radar echo flows in a band shape. Each echo cell has a life cycle, and the band-shaped pattern is maintained by the regular occurrence of the appearance and disappearance of a plurality of echo cells. FIG. 19C shows a scattered pattern in which both the shape and arrangement of the echo are scattered at random. In FIGS. 19A through 19C, the target region is indicated by a square frame within the image. 20 successive frames were used for each of the patterns shown in FIGS. 19A through 19C.

Figure 20A:
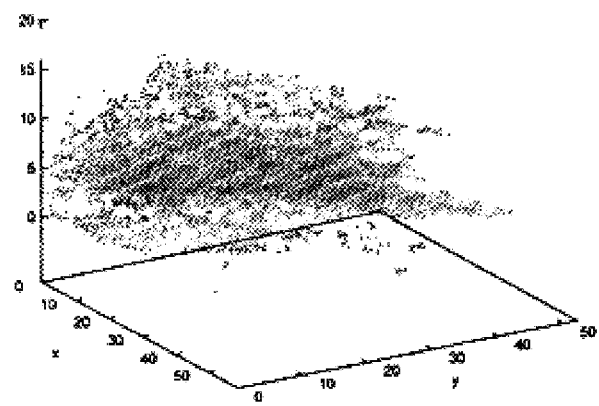
FIGS. 20A, 20B and 20C respectively are diagrams showing distributions of the motion trajectories obtained from the image sequence shown in FIGS. 19A, 19B and 19C by the application of the first embodiment of the present invention.
Figure 20B:
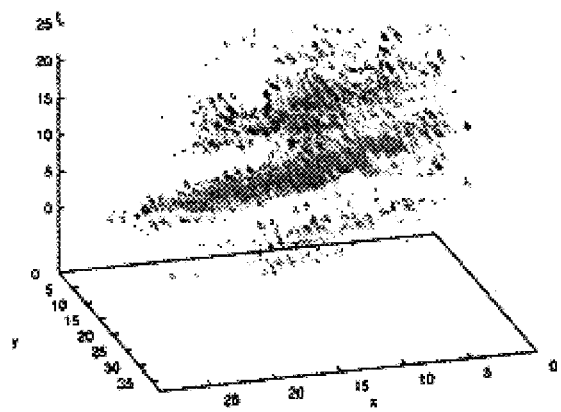
Figure 20C:
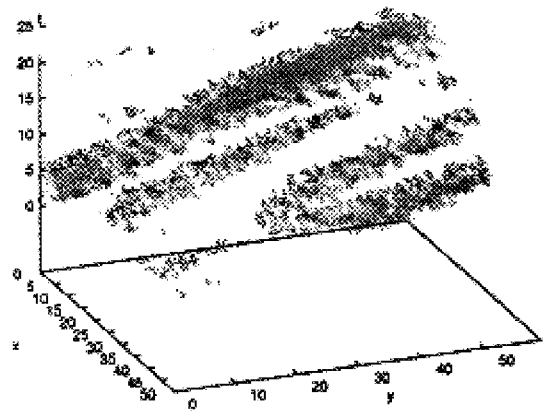

FIGS. 20A through 20C show distributions of the motion trajectories respectively generated by the motion trajectory extraction unit 102 from the image sequences shown in FIGS. 19A through 19C and accumulated in the spatiotemporal space memory 110. It may be seen from FIGS. 20A through 20C that motion trajectories having different features are obtained with respect to the 3 patterns shown in FIGS. 19A through 19C.

Figure 21A:
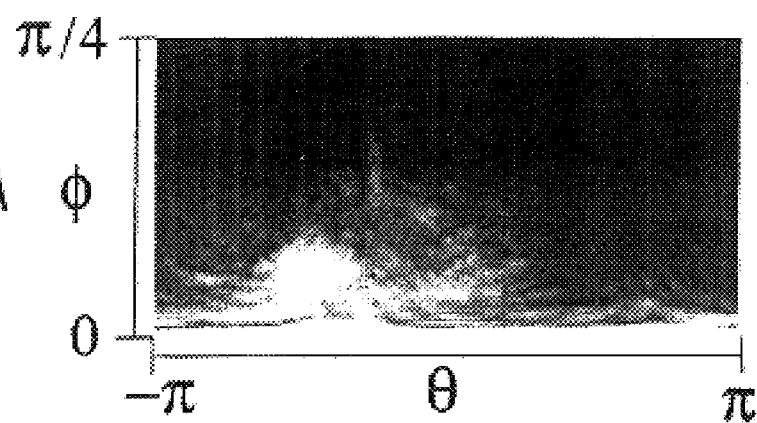
FIGS. 21A, 21B and 21C respectively are diagrams showing vote distributions obtained in a normal parameter space memory from the image sequence shown in FIGS. 19A, 19B and 19C by the application of the first embodiment of the present invention.
Figure 21B:
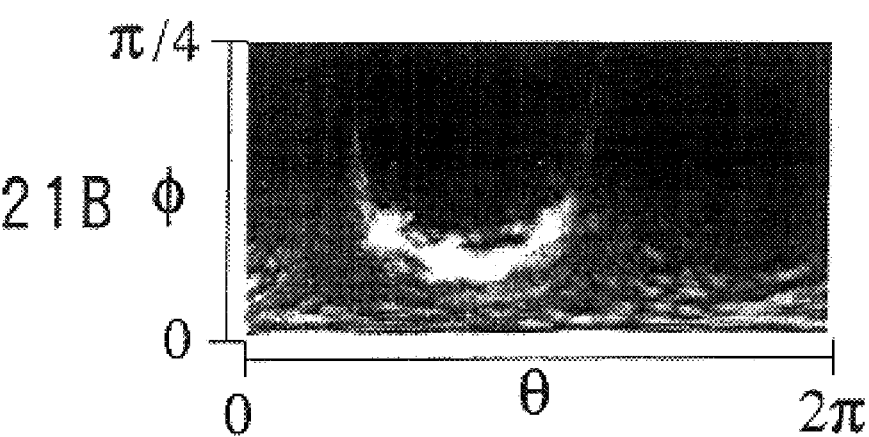
Figure 21C:
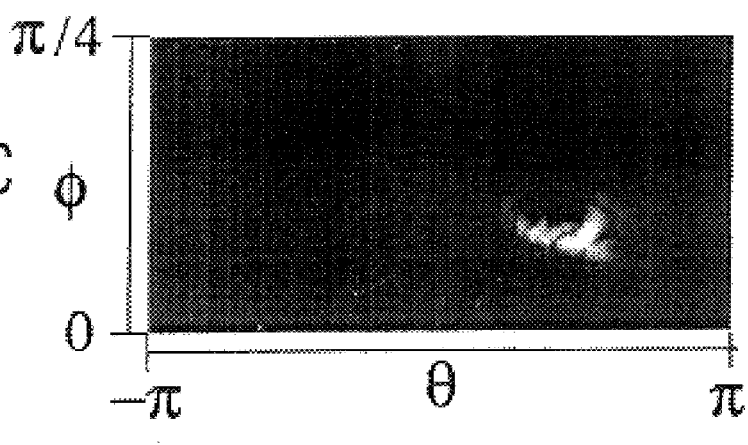

FIGS. 21A through 21C respectively show results obtained by carrying out the three-dimensional Hough transform by the Hough transform unit 104 with respect to the motion trajectories shown in FIGS. 20A through 20C and then projecting the results of the three-dimensional Hough transform to the two-dimensional space by the space projection unit 106. FIGS. 21A through 21C respectively correspond to the vote distributions accumulated in the normal parameter space memory 114 with respect to the image sequences shown in FIGS. 19A through 19C. At each point in FIGS. 21A through 21C, a white point indicates a large vote, and a black point indicates a small vote.

The distribution shown in FIG. 21A has a gradual peak, and the votes are distributed over a wide range. This means that velocity components having a certain directionality exist, and that the effects of the appearance and disappearance at the surface are large. On the other hand, conspicuous peaks linked in an arcuate shape can be observed in the distribution shown in FIG. 21B. It can be seen that FIG. 21B corresponds to the distribution of the tangent planes surrounding the cylindrical motion trajectory, and that a conspicuous translational velocity component exists in the target motion. In addition, the votes are distributed over a wide range in the bottom portion of FIG. 21B and indicate the effects of the appearance and disappearance of the echo cells. Furthermore, a peak of the vote concentrated at one location can be observed in the distribution shown in FIG. 21C. This means that echo cells having a relatively flat edge move at a uniform velocity without appearing and disappearing.

FIG. 22 shows the most dominant translational velocity component within the target region obtained by the feature extraction unit 108. The direction of the velocity is indicated by 0 degree for the direction from left to right, and the angle increases counterclockwise.

Therefore, according to the application of the first embodiment of the present invention, the features related to the shape and motion of the target within the image sequence are represented as the shape of the vote distribution as shown in FIGS. 21A through 21C. Hence, by observing the difference among the shapes of the vote distributions, it is possible to judge the temporal features and the spatial features of the image sequence. For this reason, the system structure of the first embodiment of the present invention may be utilized for classifying and searching a pattern in the image sequence. In addition, it is possible to objectively extract the vote distribution by the feature extraction unit 108, so that it is possible to realize an automatic classification of the image sequence. Furthermore, with respect to the weather radar images shown in FIGS. 19A through 19C, it is possible to apply the present invention to weather forecast by referring to past weather radar images similar to the present weather conditions.

Application 2:
Application of the second embodiment of the present invention

Figure 23:
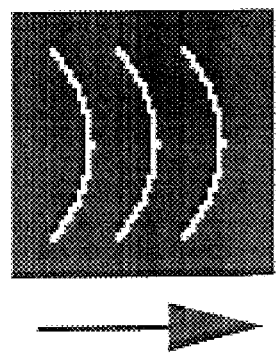
FIG. 23 is a diagram showing an input image sequence used in an application of the second embodiment of the present invention.
Figure 24:
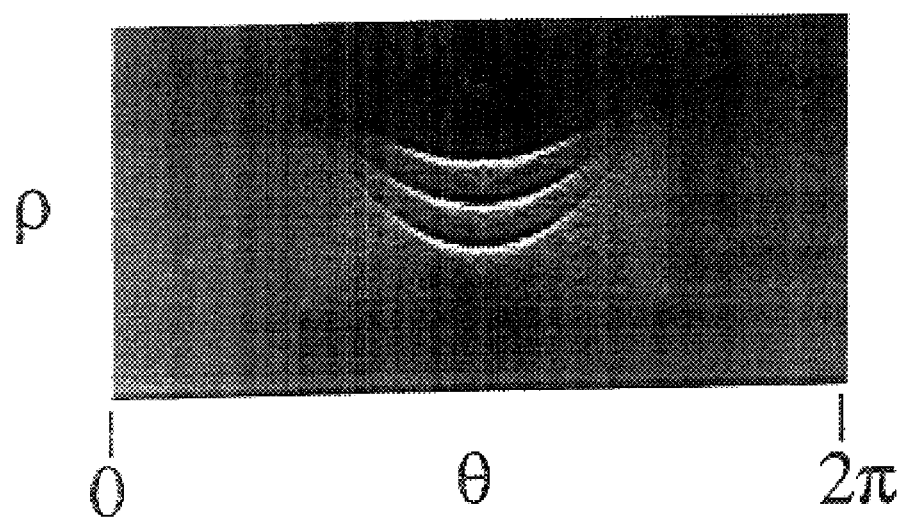
FIG. 24 is a diagram showing a distribution of tangent planes obtained from the image sequence shown in FIG. 23 by the application of the second embodiment of the present invention.

FIG. 23 shows 1 frame of the image sequence when the second embodiment of the present invention is applied. This frame includes a scene having 3 contours which form curves and move uniformly from the left to right. FIG. 24 shows a histogram of the tangent planes on the constraint surface which is obtained with respect to this image sequence. In FIG. 24, it is possible to observe the tangent plane distributions CS having curved shapes corresponding to the 3 contours.

Figure 25:
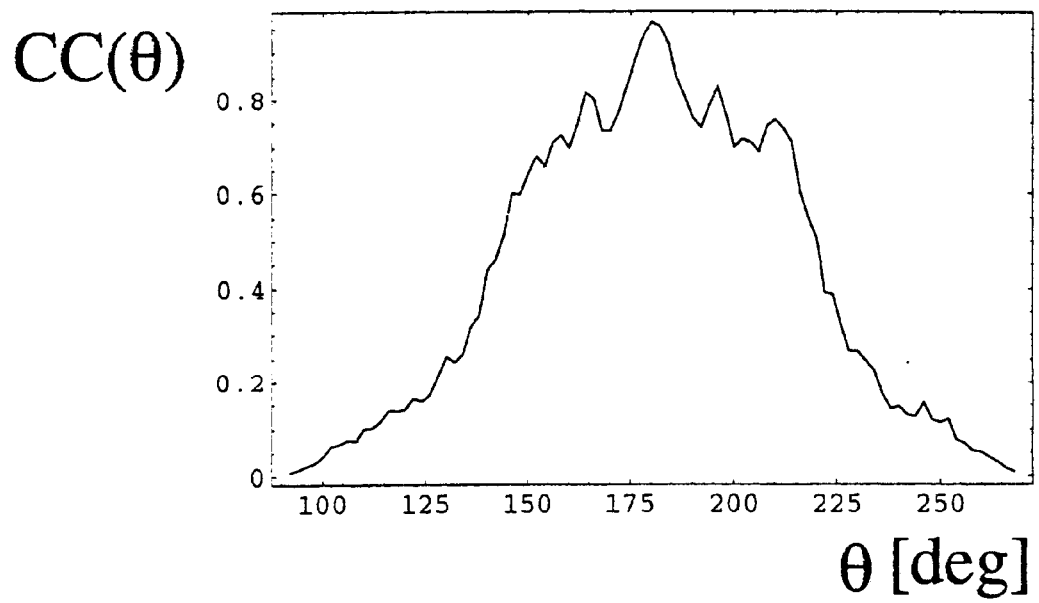
FIG. 25 is a diagram showing a directional histogram of contours obtained by the application of the second embodiment of the present invention.

FIG. 25 shows a tangent line direction histogram CC acquired from the tangent plane distributions CS described above according to the method employed in the second embodiment of the present invention. From FIG. 25, it is possible to confirm the existence of peaks which spread in correspondence with the directions of the contours forming the curves. However, the distribution itself of the peaks is not smooth due to the effects of the discretization of the image. The uniformity $f_1$ in the contour direction obtained from this distribution of the peaks is 0.01.

Figure 26:
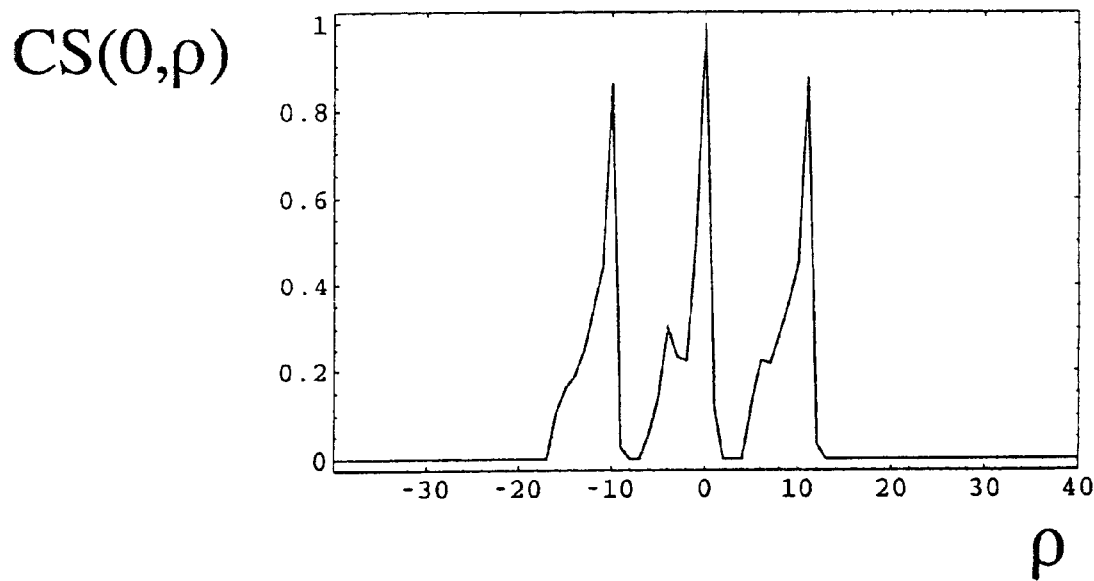
FIG. 26 is a diagram showing a spatial arrangement of the contours obtained by the application of the second embodiment of the present invention.

FIG. 26 shows an example of the distribution in the direction of the tangent plane distributions CS for $\theta=0$ (horizontal direction). In this case, the repetition $f_2$ in the contour direction is 0.91.

Application 3:
Application of the third embodiment of the present invention

Figure 27A:
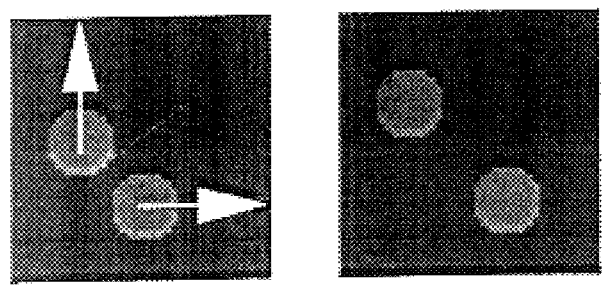
FIGS. 27A, 27B and 27C respectively are diagrams for explaining a process applied with the third embodiment of the present invention.
Figure 27B:
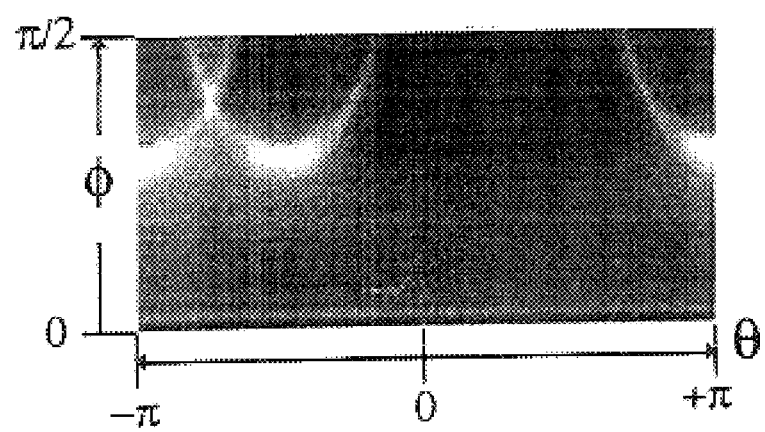
Figure 27C:
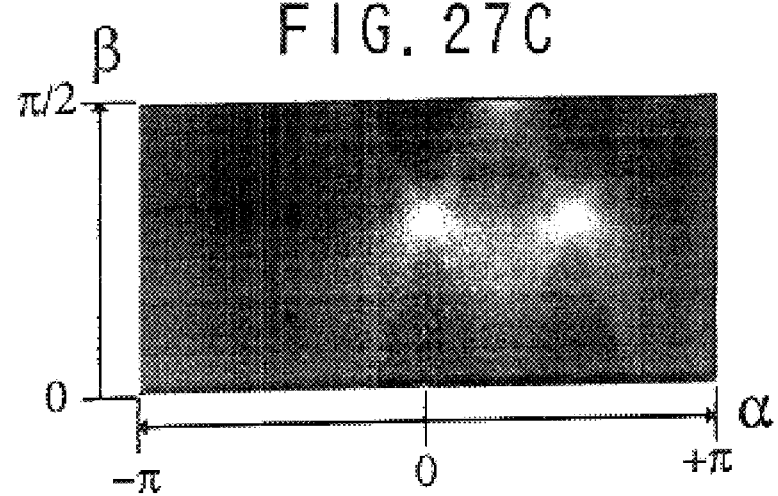

FIGS. 27A through 27C are diagrams for explaining the process carried out by the third embodiment of the present invention. A case will be considered where 2 objects having different motions within the image sequence exist as shown in FIG. 27A. In this particular case, a circle which moves 1 (pixel/frame) from the right to left, and a circle which moves 1 (pixel/frame) from the bottom to top exist. FIG. 27B shows the tangent plane distributions $S_N(\theta, \phi)$ (=normal parameter space) of the trajectory surface of the moving objects, with respect to the image sequence shown in FIG. 27A. It may be observed from FIG. 27B that the distributions of the tangent planes in the periphery of the contours of the 2 moving objects appear as 2 curved distributions. FIG. 27C shows a histogram of the intersection directions obtained from the tangent plane distributions shown in FIG. 27B. It is possible to clearly observe the existence of 2 different peaks from FIG. 27C. The positions of the 2 peaks can be obtained as $(\alpha_1, \beta_1)=(0, 45)$ (deg) and $(\alpha_2, \beta_2)=(90, 45)$ (deg). With respect to the 2 peak positions, it is possible to obtain the velocity components of the 2 moving objects as $v_1 \sim (1, 0)$ (pixel/frame) and $v_2=(0, 1)$ (pixel/frame) based on the formulas (20) and (21). In this particular case, it is unnecessary to take into consideration the composite velocity component because only 2 peaks exist.

Application 4:
Application of the fourth embodiment of the present invention

Figure 28A:
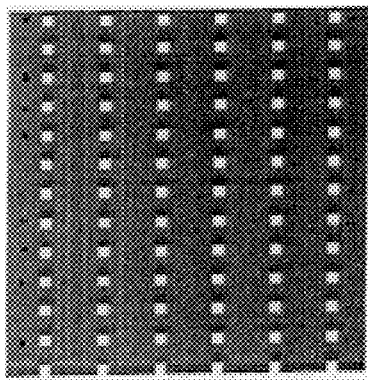
FIGS. 28A and 28B respectively are diagrams showing a basic pattern image and a pattern image added with noise of 1 frame of an image sequence used in an application of the fourth embodiment of the present invention.
Figure 28B:
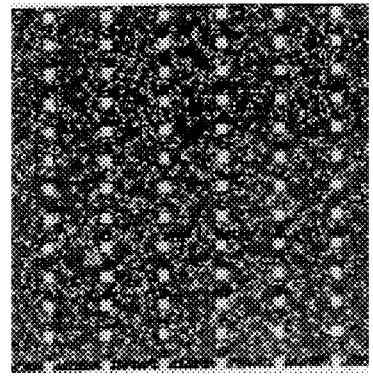

An image sequence pattern will be considered in which cells arranged in a lattice as shown in FIG. 28A move uniformly at a velocity of $\sqrt{2}$ (pixels/frame) towards the top right direction. In this basic pattern, it may be evaluated that the motion uniformity is high because all of the image elements move uniformly. In addition, FIG. 28B shows an image sequence pattern obtained by adding contrasting random noise with respect to the basic pattern. Since the random noise are distributed at random in all of the frames, the random noise have various complex motions completely different from the motion of the basic lattice pattern.

Figures 29A, 29B:
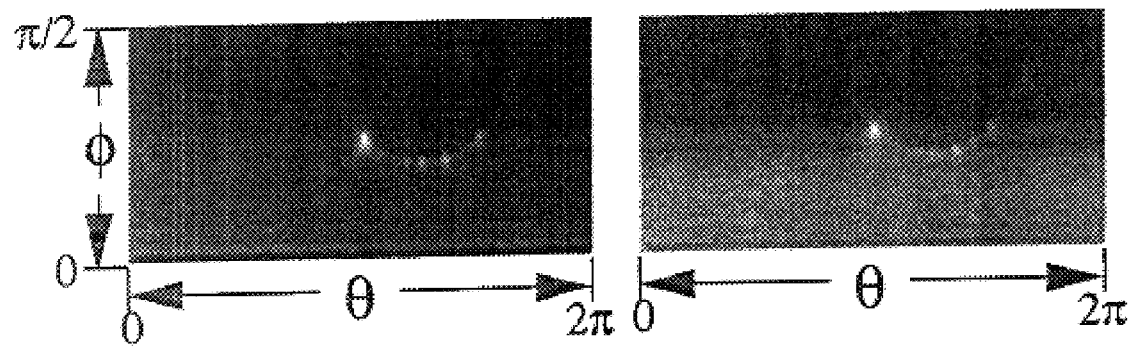
FIGS. 29A and 29B respectively are diagrams showing a histogram of normal flows with respect to the basic pattern and a histogram of normal flows with respect to the pattern added with noise which are obtained by the application of the fourth embodiment of the present invention.

FIGS. 29A and 29B respectively show the histograms of the normal flows with respect to the patterns shown in FIGS. 28A and 28B. The gray level of each point in the images shown in FIGS. 29A and 29B correspond to the histograms of the normal flows, and the frequency is higher for points which are more white. The distribution which spreads in a curve and is seen at the central part of FIG. 29A corresponds to the normal flow components of the basic pattern shown in FIG. 28A. In this case, only the points on the curve have extremely high values as compared to the points at other portions. For this reason, the feature values $f_1$ through $f_5$ of the motion uniformity described by the formulas (25) through (29) show high values. On the other hand, in FIG. 29B, not only the distribution having the curved shape and corresponding to the normal flow components of the basic pattern, but also the normal flow components corresponding to the random noise added to the image are widely spread in various directions and at various velocities. For this reason, the feature values of the motion uniformity show low values in the case shown in FIG. 28B as compared to the case shown in FIG. 28A where only the basic pattern exists.

Figure 30:
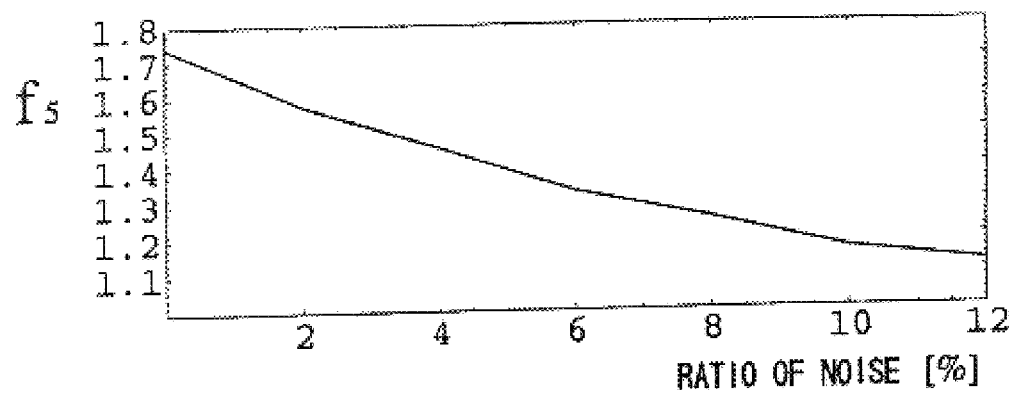
FIG. 30 is a diagram showing a change in feature values of motion uniformity obtained by the application of the fourth embodiment of the present invention in a case where an amount of noise added to the image is changed.

FIG. 30 shows a change in the feature values of the motion uniformity in a case where an amount of random noise added to the image is changed. In this particular case, $f_5$ described by the formula (29) is used as the feature value of the motion uniformity. In FIG. 30, the abscissa indicates a ratio of the number of pixels added with the random noise with respect to the total number of pixels in the image. From FIG. 30, it may be observed that the motion uniformity decreases as the ratio of the noise increases.

Application 5:

Application of the fifth embodiment of the present invention

Figure 31C:
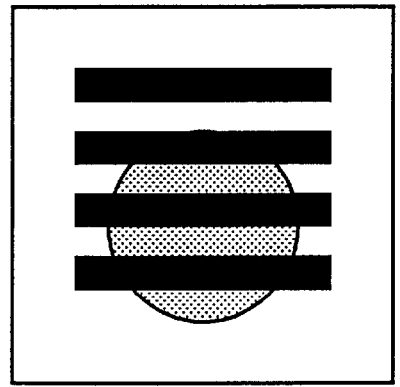
FIGS. 31A, 31B, 31C, 31D and 31E respectively are diagrams for explaining an application of the fifth embodiment of the present invention.
Figure 31B:
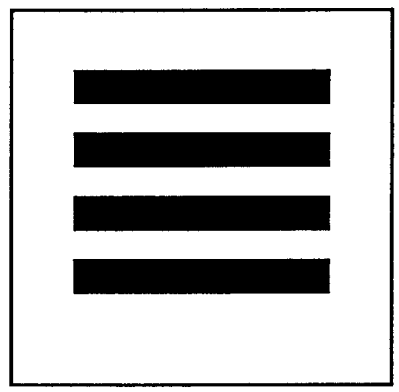
Figure 31A:
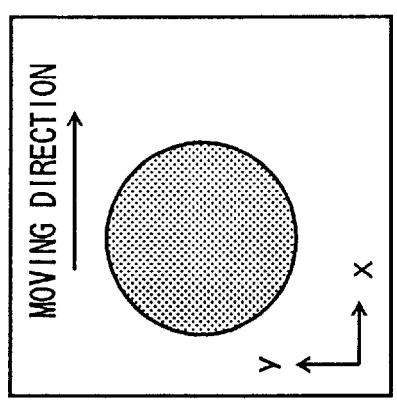
Figure 31E:
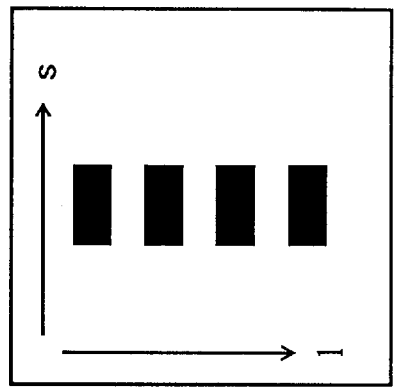
Figure 31D:
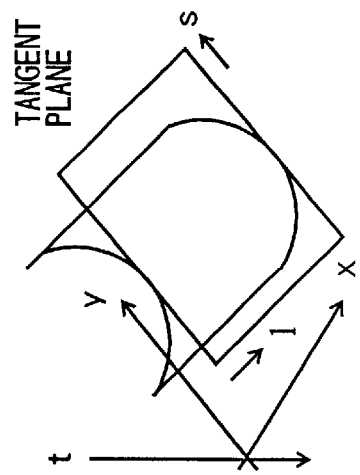

A scene will be considered of in which a target moves from the left to right as shown in FIG. 31A. In this state, if an occluding object shown in FIG. 31B is interposed between the target and an observer, an image shown in FIG. 31C is observed by the observer. A motion trajectory drawn by a portion of the contour of the target in this case is shown in FIG. 31D. When the motion trajectory on the tangent plane shown in FIG. 31D is extracted, an intermittent motion trajectory distribution shown in FIG. 31E is obtained. Since the occluding object is represented as a discontinuous motion trajectory, it is possible to judge the degree of the occlusion by making a search on the tangent plane image in 1 direction and measuring the run length of the motion trajectory.

Application 6:

Particular field of application

As applications which use the image features extracted by the present invention, there are supports associated with the monitoring of the weather phenomenon using the weather radar image, the weather forecast using search and classification of the weather radar image, and the analysis of the weather phenomenon.

The weather radar image is obtained by visualizing the radar echo reflection intensity obtained by the weather radar equipment. The weather radar image includes a pattern called the echo pattern, and represents a spatial distribution of the precipitation intensity. When observations are made at constant time intervals, it is possible to obtain a sequence of images. The echo pattern is a non-rigid body which appears, disappears and deforms, and has a shape, pattern and motion peculiar to each precipitation phenomenon.

For example, as often seen in the Japan Sea and the Gulf of Mexico during the winter time, when a roll-shaped convection occurs due to the monsoon wind from the continent, the band-shaped echo pattern shown in FIG. 19B appears on the weather radar image. In addition, when a low (atmospheric) pressure approaches, the stratiform echo pattern shown in FIG. 19A appears at the front part of the low pressure.

In the band-shaped echo pattern, small image elements called echo cells move along the atmospheric flow, thereby forming several bands. Each echo cell has a life cycle peculiar thereto, including appearance, growth and decay. In addition, the stratiform echo pattern has a relatively large area and a misty surface, and the pattern thereof changes at a high speed.

The feature values can be calculated using the method and equipment of the present invention, by inputting the weather radar image sequence obtained by observing the above described whether phenomena. As a result, the difference among the echo patterns is reflected as a difference among the feature values. For example, the feature value of the motion uniformity becomes larger in the case of the band-shaped echo as compared to the stratiform echo pattern, and the ratio of the high-velocity components becomes larger in the case of the stratiform echo pattern as compared to the band-shaped echo pattern.

Accordingly, echo patterns corresponding to several typical weather phenomena are selected from the past weather radar images, and the feature values obtained from the selected echo patterns are stored in advance. By comparing the feature values which are calculated from the newly obtained weather radar image with the stored feature values, it is possible. to judge a past weather phenomenon which includes echo patterns closest to the echo patterns of the newly input weather image. As a result, it becomes possible to automatically monitor the weather phenomenon, and the present invention may be used as a tool for analyzing the weather phenomenon.

In addition, by constructing a database which accumulates the past weather radar images and the feature values at each point in time, it is possible to use the feature values obtained from the most recent weather radar image as keys to retrieve a past weather radar image which most resembles the feature values. In this case, it is possible to retrieve a weather radar image which comprehends a phenomenon similar to the present weather phenomenon. Next, by providing changes in the retrieved weather radar image with time with respect to a user such as a meteorologist, it is possible to support the weather forecast.

The present invention may be realized in the form of a computer or an apparatus similar to a computer which is used as a hardware platform. The computer in this case includes a storage unit such as a hard disk unit capable of freely storing data and reading the data, a unit such as a buffer which is used when processing the data, an output unit such as a display unit and a file unit for displaying or outputting desired information, and a central processing unit for controlling the storage unit, the unit such as the buffer and the output unit based on a predetermined procedure. All or a portion of the process carried out by the system structure of the various embodiments of the present invention described above may be realized by providing a program or the like containing algorithms of the process to the hardware platform, and controlling the hardware platform to execute the program. The program or the like may be recorded, provided and distributed in the form of a ROM, memory card, CD-ROM, floppy disk (FD), magneto-optic disk (MO), DVD and other computer-readable recording mediums suited for storing the program.

Further, the present invention is not limited to these embodiments, but various variations and modifications may be made without departing from the scope of the present invention.

What is claimed is:

1. A method for extracting image features from an image sequence in which frames indicating images are time-sequentially arranged with respect to time, said method comprising the steps of:

(a) inputting the image sequence;

(b) acquiring a motion trajectory of an image contour of a target included within a region defined by an arbitrary spatial range and time range within the image sequence input by said step (a), as three-dimensional volume data drawn within a spatiotemporal space in which each of the frames is time-sequentially stacked;

(c) acquiring a plane histogram of one of tangent planes tangent to the motion trajectory and partial planes which may be included in the motion trajectory; and (d) measuring temporal features and spatial features of the image from the plane histogram which is acquired by said step (c).

2. The method as claimed in claim 1, wherein the plane histogram is obtained as votes accumulated in a plane parameter space obtained by use of a three-dimensional Hough transform.

3. The method as claimed in claim 1, wherein the three-dimensional volume data is obtained by forming difference images among the frames in time sequence, and stacking the formed difference images.

4. A method for extracting image features from an image sequence in which frames indicating images are time-sequentially arranged with respect to time, said method comprising the steps of:

(a) inputting the image sequence;

(b) acquiring a motion trajectory of an image contour of a target included within a region defined by an arbitrary spatial range and time range within the image sequence input by said step (a), as three-dimensional volume data drawn within a spatiotemporal space in which each of the frames is time-sequentially stacked;

(c) acquiring a plane histogram of tangent planes tangent to the motion trajectory;

(d) estimating a velocity component of the target which moves within the region from the plane histogram acquired by said step (c);

(e) extracting a distribution of the tangent planes corresponding to the image contour of the target which moves at the velocity component estimated by said step (d), from the plane histogram acquired by said step (c); and (f) acquiring spatial features of the image from the distribution of the tangent planes extracted by said step (e).

5. The method as claimed in claim 4, wherein said step (d) includes the substeps of:

(d1) acquiring a histogram of intersection lines of the tangent planes from the plane histogram acquired by said step (c); and (d2) acquiring, as image features, a most dominant translational velocity component of the target which moves within the defined region, from the histogram of the intersection lines acquired by said substep (d2).

6. The method as claimed in claim 4, wherein said step (d) includes the substeps of:

(d1) acquiring a histogram of intersection lines of the tangent planes from the plane histogram acquired by said step (c); and (d2) detecting a plurality of peaks from the histogram of the intersection lines acquired by said substep (d1);

(d3) acquiring velocity components of a plurality of motions within the region corresponding to the plurality of peaks detected by said substep (d2); and (d4) judging whether or not each of the velocity components can be represented by a composite velocity of other velocity components, with respect to the velocity components acquired by said substep (d3), and outputting an independent velocity component which cannot be represented by the composite velocity of the other velocity components.

7. The method as claimed in claim 4, wherein said step (e) extracts a distribution of tangent planes along tangent line directions to the image contour of the target, and said step (f) calculates feature values related to a directionality of the image contour of the target from the distribution of the tangent planes extracted by said step (e).

8. The method as claimed in claim 4, wherein said step (e) extracts a distribution of tangent planes in directions perpendicular to a direction of the image contour of the target, and said step (f) extracts features related to a spatial arrangement of the image contour of the target.

9. The method as claimed in claim 4, wherein the three-dimensional volume data is obtained by forming difference images among the frames in time sequence, and stacking the formed difference images.

10. The method as claimed in claim 4, wherein the plan histogram is obtained as votes accumulated in a plane parameter space obtained by use of a three-dimensional Hough transform.

11. A method for extracting image features from an image sequence in which frames indicating images are time-sequentially arranged with respect to time, said method comprising the steps of:

(a) inputting the image sequence;

(b) acquiring a motion trajectory of an image contour of a target included within a region defined by an arbitrary spatial range and time range within the image sequence input by said step (a), as three-dimensional volume data drawn within a spatiotemporal space in which each of the frames is time-sequentially stacked;

(c) acquiring a plane histogram of tangent planes tangent to the motion trajectory;

(d) acquiring a histogram of intersection lines of the tangent planes from the plane histogram acquired by said step (c);

(e) detecting a plurality of peaks from the histogram of the intersection lines acquired by said step (d); and (e) acquiring a plurality of velocity components of motions within the region corresponding to the plurality of peaks detected by said step (e).

12. The method as claimed in claim 11, which further comprises the steps of:

(f) judging whether or not each of the velocity components can be represented by a composite velocity of other velocity components, with respect to the plurality of velocity components acquired by said step (e); and (g) outputting an independent velocity component which cannot be represented by the composite velocity of the other velocity components.

13. The method as claimed in claim 11, wherein the three-dimensional volume data is obtained by forming difference images among the frames in time sequence, and stacking the formed difference images.

14. The method as claimed in claim 11, wherein the plan histogram is obtained as votes accumulated in a plane parameter space obtained by use of a three-dimensional Hough transform.

15. A method for extracting image features from an image sequence in which frames indicating images are time-sequentially arranged with respect to time, said method comprising the steps of:

(a) inputting the image sequence;

(b) acquiring a motion trajectory of an image contour of a target included within a region defined by an arbitrary spatial range and time range within the image sequence input by said step (a), as three-dimensional volume data drawn within a spatiotemporal space in which each of the frames is time-sequentially stacked;

(c) acquiring a plane histogram of one of tangent planes tangent to the motion trajectory and partial planes which may be included in the motion trajectory;

(d) acquiring a normal flow histogram of normal flows of the image from the plane histogram acquired by said step (c); and (e) acquiring temporal features of the image from the normal flow histogram acquired by said step (d).

16. The method as claimed in claim 15, wherein said step (d) acquires a normal flow histogram having direction and velocity of the normal flows as variables, and said step (e) calculates spreading of the normal flow histogram as feature values representing motion uniformity of the image.

17. The method as claimed in claim 15, wherein said step (d) acquires a normal flow histogram having velocity of the normal flows as a variable, and said step (e) calculates a ratio of totalled frequency value corresponding to normal flows having specific velocities with respect to a totalled frequency value as a whole as feature values representing the motion of the image.

18. The method as claimed in claim 15, wherein the three-dimensional volume data is obtained by forming difference images among the frames in time sequence, and stacking the formed difference images.

19. The method as claimed in claim 15, wherein the plan histogram is obtained as votes accumulated in a plane parameter space obtained by use of a three-dimensional Hough transform.

20. A method for extracting image features from an image sequence in which frames indicating images are time-sequentially arranged with respect to time, said method comprising the steps of:

(a) inputting the image sequence;

(b) acquiring a motion trajectory of an image contour of a target included within a region defined by an arbitrary spatial range and time range within the image sequence input by said step (a), as three-dimensional volume data drawn within a spatiotemporal space in which each of the frames is time-sequentially stacked;

(c) detecting tangent planes tangent to the motion trajectory;

(d) extracting, as an image, a distribution of the motion trajectory existing on the tangent planes detected by said step (c); and (e) tracking a motion trajectory on the image extracted by said step (d) and detecting an occlusion of the target.

21. The method as claimed in claim 20, wherein said step (e) includes the substeps of:

(e1) measuring intermittence along a moving direction of the motion trajectory; and (e2) detecting the occlusion of the target based on the intermittence measured by said substep (e1).

22. The method as claimed in claim 20, wherein said step (e) includes the substeps of:

(e1) measuring statistics of a run length along a moving direction of the motion trajectory; and (e2) detecting a degree of the occlusion of the target from the statistics of the run length measured by said substep (e1).

23. The method as claimed in claim 20, wherein said step (c) detects the tangent planes in a form of a histogram of the tangent planes which are represented as a distribution of votes accumulated in a plane parameter space obtained by use of a three-dimensional Hough transform.

24. The method as claimed in claim 20, wherein said step (c) detects tangent planes corresponding estimated velocity components.

25. The method as claimed in claim 20, wherein the three-dimensional volume data is obtained by forming difference images among the frames in time sequence, and stacking the formed difference images.

26. An equipment for extracting image features from an image sequence in which frames indicating images are time-sequentially arranged with respect to time, said equipment comprising:

first means for inputting the image sequence;

second means for acquiring a motion trajectory of an image contour of a target included within a region defined by an arbitrary spatial range and time range within the image sequence input by said first means, as three-dimensional volume data drawn within a spatiotemporal space in which each of the frames is time-sequentially stacked;

third means for acquiring a plane histogram of one of tangent planes tangent to the motion trajectory and partial planes which may be included in the motion trajectory; and fourth means for measuring temporal features and spatial features of the image from the plane histogram which is acquired by said third means.

27. The equipment as claimed in claim 26, wherein the plane histogram is obtained as votes accumulated in a plane parameter space obtained by use of a three-dimensional Hough transform.

28. The equipment as claimed in claim 26, wherein the three-dimensional volume data is obtained by forming difference images among the frames in time sequence, and stacking the formed difference images.

29. An equipment for extracting image features from an image sequence in which frames indicating images are time-sequentially arranged with respect to time, said equipment comprising:

first means for inputting the image sequence;

second means for acquiring a motion trajectory of an image contour of a target included within a region defined by an arbitrary spatial range and time range within the image sequence input by said first means, as three-dimensional volume data drawn within a spatiotemporal space in which each of the frames is time-sequentially stacked;

third means for acquiring a plane histogram of tangent planes tangent to the motion trajectory;

fourth means for estimating a velocity component of the target which moves within the region from the plane histogram acquired by said third means;

fifth means for extracting a distribution of the tangent planes corresponding to the image contour of the target which moves at the velocity component estimated by said fourth means, from the plane histogram acquired by said third means; and sixth means for acquiring spatial features of the image from the distribution of the tangent planes extracted by said fifth means.

30. The equipment as claimed in claim 29, wherein said fourth means includes:

seventh means for acquiring a histogram of intersection lines of the tangent planes from the plane histogram acquired by said third means; and eighth means for acquiring, as image features, a most dominant translational velocity component of the target which moves within the defined region, from the histogram of the intersection lines acquired by said seventh means.

31. The equipment as claimed in claim 30, wherein the plane histogram is obtained as votes accumulated in a plane parameter space obtained by use of a three-dimensional Hough transform.

32. The equipment as claimed in claim 29, wherein said fourth means includes:
    seventh means for acquiring a histogram of intersection lines of the tangent planes from the plane histogram acquired by said third means; and
    eighth means for detecting a plurality of peaks from the histogram of the intersection lines acquired by said seventh means;
    ninth means for acquiring velocity components of a plurality of motions within the region corresponding to the plurality of peaks detected by said eighth means; and
    tenth means for judging whether or not each of the velocity components can be represented by a composite velocity of other velocity components, with respect to the velocity components acquired by said ninth means, and outputting an independent velocity component which cannot be represented by the composite velocity of the other velocity components.

33. The equipment as claimed in claim 29, wherein said fifth means extracts a distribution of tangent planes along tangent line directions to the image contour of the target, and said sixth means calculates feature values related to a directionality of the image contour of the target from the distribution of the tangent planes extracted by said fifth means.

34. The equipment as claimed in claim 29, wherein said fifth means extracts a distribution of tangent planes in directions perpendicular to a direction of the image contour of the target, and said sixth means extracts features related to a spatial arrangement of the image contour of the target.

35. The equipment as claimed in claim 29, wherein the three-dimensional volume data is obtained by forming difference images among the frames in time sequence, and stacking the formed difference images.

36. The equipment as claimed in claim 29, wherein the plane histogram is obtained as votes accumulated in a plane parameter space obtained by use of a three-dimensional Hough transform.

37. An equipment for extracting image features from an image sequence in which frames indicating images are time-sequentially arranged with respect to time, said equipment comprising:
    first means for inputting the image sequence;
    second means for acquiring a motion trajectory of an image contour of a target included within a region defined by an arbitrary spatial range and time range within the image sequence input by said first means, as three-dimensional volume data drawn within a spatiotemporal space in which each of the frames is time-sequentially stacked;
    third means for acquiring a plane histogram of tangent planes tangent to the motion trajectory;
    fourth means for acquiring a histogram of intersection lines of the tangent planes from the plane histogram acquired by said third means;
    fifth means for detecting a plurality of peaks from the histogram of the intersection lines acquired by said fourth means; and
    sixth means for acquiring a plurality of velocity components of motions within the region corresponding to the plurality of peaks detected by said fifth means.

38. The equipment as claimed in claim 37, which further comprises:
    seventh means for judging whether or not each of the velocity components can be represented by a composite velocity of other velocity components, with respect to the plurality of velocity components acquired by said fifth means; and
    eighth means for outputting an independent velocity component which cannot be represented by the composite velocity of the other velocity components.

39. The equipment as claimed in claim 37, wherein the three-dimensional volume data is obtained by forming difference images among the frames in time sequence, and stacking the formed difference images.

40. An equipment for extracting image features from an image sequence in which frames indicating images are time-sequentially arranged with respect to time, said equipment comprising:
    first means for inputting the image sequence;
    second means for acquiring a motion trajectory of an image contour of a target included within a region defined by an arbitrary spatial range and time range within the image sequence input by said first means, as three-dimensional volume data drawn within a spatiotemporal space in which each of the frames is time-sequentially stacked;
    third means for acquiring a plane histogram of one of tangent planes tangent to the motion trajectory and partial planes which may be included in the motion trajectory;
    fourth means for acquiring a normal flow histogram of normal flows of the image from the plane histogram acquired by said third means; and
    fifth means for acquiring temporal features of the image from the normal flow histogram acquired by said fourth means.

41. The equipment as claimed in claim 40, wherein said fourth means acquires a normal flow histogram having direction and velocity of the normal flows as variables, and said fifth means calculates spreading of the normal flow histogram as feature values representing motion uniformity of the image.

42. The equipment as claimed in claim 40, wherein said fourth means acquires a normal flow histogram having velocity of the normal flows as a variable, and said fifth means calculates a ratio of totalled frequency value corresponding to normal flows having specific velocities with respect to a totalled frequency value as a whole as feature values representing the motion of the image.

43. The equipment as claimed in claim 40, wherein the three-dimensional volume data is obtained by forming difference images among the frames in time sequence, and stacking the formed difference images.

44. The equipment as claimed in claim 40, wherein the plane histogram is obtained as votes accumulated in a plane parameter space obtained by use of a three-dimensional Hough transform.

45. An equipment for extracting image features from an image sequence in which frames indicating images are time-sequentially arranged with respect to time, said equipment comprising:
    first means for inputting the image sequence;
    second means for acquiring a motion trajectory of an image contour of a target included within a region defined by an arbitrary spatial range and time range within the image sequence input by said first means, as three-dimensional volume data drawn within a spatiotemporal space in which each of the frames is time-sequentially stacked;

third means for detecting tangent planes tangent to the motion trajectory;

fourth means for extracting, as an image, a distribution of the motion trajectory existing on the tangent planes detected by said third means; and fifth means for tracking a motion trajectory on the image extracted by said fourth means and detecting an occlusion of the target.

46. The equipment as claimed in claim 45, wherein said fifth means includes:

sixth means for measuring intermittence along a moving direction of the motion trajectory; and seventh means for detecting the occlusion of the target based on the intermittence measured by said sixth means.

47. The equipment as claimed in claim 45, wherein said fifth means includes:

sixth means for measuring statistics of a run length along a moving direction of the motion trajectory; and seventh means for detecting a degree of the occlusion of the target from the statistics of the run length measured by said sixth means.

48. The equipment as claimed in claim 45, wherein said third means detects the tangent planes in a form of a histogram of the tangent planes which are represented as a distribution of votes accumulated in a plane parameter space obtained by use of a three-dimensional Hough transform.

49. The equipment as claimed in claim 45, wherein said third means detects tangent planes corresponding estimated velocity components.

50. The equipment as claimed in claim 45, wherein the three-dimensional volume data is obtained by forming difference images among the frames in time sequence, and stacking the formed difference images.

51. A computer-readable recording medium recorded with a program for causing a computer to extract image features from an image sequence in which frames indicating images are time-sequentially arranged with respect to time, said program comprising:

a first code for causing the computer to input the image sequence;

a second code for causing the computer to acquire a motion trajectory of an image contour of a target included within a region defined by an arbitrary spatial range and time range within the image sequence input by said first code, as three-dimensional volume data drawn within a spatiotemporal space in which each of the frames is time-sequentially stacked;

a third code for causing the computer to acquire a plane histogram of one of tangent planes tangent to the motion trajectory and partial planes which may be included in the motion trajectory; and a fourth code for causing the computer to measure temporal features and spatial features of the image from the plane histogram which is acquired by said third code.

52. The computer-readable recording medium as claimed in any of claim 51, wherein the plane histogram is obtained as votes accumulated in a plane parameter space obtained by use of a three-dimensional Hough transform.

53. The computer-readable recording medium as claimed in claim 51, wherein the three-dimensional volume data is obtained by forming difference images among the frames in time sequence, and stacking the formed difference images.

54. A computer-readable recording medium recorded with a program for causing a computer to extract image features from an image sequence in which frames indicating images are time-sequentially arranged with respect to time, said program comprising:

a first code for causing the computer to input the image sequence;

a second code for causing the computer to acquire a motion trajectory of an image contour of a target included within a region defined by an arbitrary spatial range and time range within the image sequence input by said first code, as three-dimensional volume data drawn within a spatiotemporal space in which each of the frames is time-sequentially stacked;

a third code for causing the computer to acquire a plane histogram of tangent planes tangent to the motion trajectory;

a fourth code for causing the computer to estimate a velocity component of the target which moves within the region from the plane histogram acquired by said third code;

a fifth code for causing the computer to extract a distribution of the tangent planes corresponding to the image contour of the target which moves at the velocity component estimated by said fourth code, from the plane histogram acquired by said third code; and a sixth code for causing the computer to acquire spatial features of the image from the distribution of the tangent planes extracted by said fifth code.

55. The computer-readable recording medium as claimed in claim 54, wherein said fourth code includes:

seventh code for causing the computer to acquire a histogram of intersection lines of the tangent planes from the plane histogram acquired by said third code; and an eighth code for causing the computer to acquire, as image features, a most dominant translational velocity component of the target which moves within the defined region, from the histogram of the intersection lines acquired by said seventh code.

56. The computer-readable recording medium as claimed in claim 55, wherein the plane histogram is obtained as votes accumulated in a plane parameter space obtained by use of a three-dimensional Hough transform.

57. The computer-readable recording medium as claimed in claim 54, wherein said fourth code includes:

a seventh code for causing the computer to acquire a histogram of intersection lines of the tangent planes from the plane histogram acquired by said third code; and an eighth code for causing the computer to detect a plurality of peaks from the histogram of the intersection lines acquired by said seventh code;

a ninth code for causing the computer to acquire velocity components of a plurality of motions within the region corresponding to the plurality of peaks detected by said eighth code; and a tenth code for causing the computer to judge whether or not each of the velocity components can be represented by a composite velocity of other velocity components, with respect to the velocity components acquired by said ninth code, and output an independent velocity component which cannot be represented by the composite velocity of the other velocity components.

58. The computer-readable recording medium as claimed in claim 54, wherein said fifth code causes the computer to extract a distribution of tangent planes along tangent line directions to the image contour of the target, and said sixth code causes the computer to calculate feature values related to a directionality of the image contour of the target from the distribution of the tangent planes extracted by said fifth code.

59. The computer-readable recording medium as claimed in claim 54, wherein said fifth code causes the computer to extract a distribution of tangent planes in directions perpendicular to a direction of the image contour of the target, and said sixth code causes the computer to extract features related to a spatial arrangement of the image contour of the target.

60. The computer-readable recording medium as claimed in claim 54, wherein the three-dimensional volume data is obtained by forming difference images among the frames in time sequence, and stacking the formed difference images.

61. A computer-readable recording medium recorded with a program for causing a computer to extract image features from an image sequence in which frames indicating images are time-sequentially arranged with respect to time, said program comprising:
   a first code for causing the computer to input the image sequence;
   a second code for causing the computer to acquire a motion trajectory of an image contour of a target included within a region defined by an arbitrary spatial range and time range within the image sequence input by said first code, as three-dimensional volume data drawn within a spatiotemporal space in which each of the frames is time-sequentially stacked;
   a third code for causing the computer to acquire a plane histogram of tangent planes tangent to the motion trajectory;
   a fourth code for causing the computer to acquire a histogram of intersection lines of the tangent planes from the plane histogram acquired by said third code;
   a fifth code for causing the computer to detect a plurality of peaks from the histogram of the intersection lines acquired by said fourth code; and
   a sixth code for causing the computer to acquire a plurality of velocity components of motions within the region corresponding to the plurality of peaks detected by said fifth code.

62. The computer-readable recording medium as claimed in claim 61, wherein said program further comprises:
   a seventh code for causing the computer to judge whether or not each of the velocity components can be represented by a composite velocity of other velocity components, with respect to the plurality of velocity components acquired by said fifth code; and
   an eighth code for causing the computer to output an independent velocity component which cannot be represented by the composite velocity of the other velocity components.

63. The computer-readable recording medium as claimed in claim 61, wherein the three-dimensional volume data is obtained by forming difference images among the frames in time sequence, and stacking the formed difference images.

64. The computer-readable recording medium as claimed in claim 61, wherein the plane histogram is obtained as votes accumulated in a plane parameter space obtained by use of a three-dimensional Hough transform.

65. A computer-readable recording medium recorded with a program for causing a computer to extract image features from an image sequence in which frames indicating images are time-sequentially arranged with respect to time, said program comprising:
   a first code for causing the computer to input the image sequence;
   a second code for causing the computer to acquire a motion trajectory of an image contour of a target included within a region defined by an arbitrary spatial range and time range within the image sequence input by said first code, as three-dimensional volume data drawn within a spatiotemporal space in which each of the frames is time-sequentially stacked;
   a third code for causing the computer to acquire a plane histogram of one of tangent planes tangent to the motion trajectory and partial planes which may be included in the motion trajectory;
   a fourth code for causing the computer to acquire a normal flow histogram of normal flows of the image from the plane histogram acquired by said third code; and
   a fifth code for causing the computer to acquire temporal features of the image from the normal flow histogram acquired by said fourth code.

66. The computer-readable recording medium as claimed in claim 65, wherein said fourth code causes the computer to acquire a normal flow histogram having direction and velocity of the normal flows as variables, and said fifth code causes the computer to calculate spreading of the normal flow histogram as feature values representing motion uniformity of the image.

67. The computer-readable recording medium as claimed in claim 65, wherein said fourth code causes the computer to acquire a normal flow histogram having velocity of the normal flows as a variable, and said fifth code causes the computer to calculate a ratio of totalled frequency value corresponding to normal flows having specific velocities with respect to a totalled frequency value as a whole as feature values representing the motion of the image.

68. The computer-readable recording medium as claimed in claim 65, wherein the three-dimensional volume data is obtained by forming difference images among the frames in time sequence, and stacking the formed difference images.

69. The computer-readable recording medium as claimed in claim 65, wherein the plane histogram is obtained as votes accumulated in a plane parameter space obtained by use of a three-dimensional Hough transform.

70. A computer-readable recording medium recorded with a program for causing a computer to extract image features from an image sequence in which frames indicating images are time-sequentially arranged with respect to time, said program comprising:
   a first code for causing the computer to input the image sequence;
   a second code for causing the computer to acquire a motion trajectory of an image contour of a target included within a region defined by an arbitrary spatial range and time range within the image sequence input by said first code, as three-dimensional volume data drawn within a spatiotemporal space in which each of the frames is time-sequentially stacked;
   a third code for causing the computer to detect tangent planes tangent to the motion trajectory;
   a fourth code for causing the computer to extract, as an image, a distribution of the motion trajectory existing on the tangent planes detected by said third code; and
   a fifth code for causing the computer to track a motion trajectory on the image extracted by said fourth code and detecting an occlusion of the target.

71. The computer-readable recording medium as claimed in claim 70, wherein said fifth code includes:
   a sixth code for causing the computer to measure intermittence along a moving direction of the motion trajectory; and a seventh code for causing the computer to detect the occlusion of the target based on the intermittence measured by said sixth code.

72. The computer-readable recording medium as claimed in claim 70, wherein said fifth code includes:

a sixth code for causing the computer to measure statistics of a run length along a moving direction of the motion trajectory; and a seventh code for causing the computer to detect a degree of the occlusion of the target from the statistics of the run length measured by said sixth code.

73. The computer-readable recording medium as claimed in claim 70, wherein said third code causes the computer to detect the tangent planes in a form of a histogram of the tangent planes which are represented as a distribution of votes accumulated in a plane parameter space obtained by use of a three-dimensional Hough transform.

74. The computer-readable recording medium as claimed in claim 70, wherein said third code causes the computer to detect tangent planes corresponding estimated velocity components.

75. The computer-readable recording medium as claimed in claim 70, wherein the three-dimensional volume data is obtained by forming difference images among the frames in time sequence, and stacking the formed difference images.

76. The computer-readable recording medium as claimed in claim 54, wherein the plane histogram is obtained as votes accumulated in a plane parameter space obtained by use of a three-dimensional Hough transform.

* * * * *

UNITED STATES PATENT AND TRADEMARK OFFICE
CERTIFICATE OF CORRECTION

PATENT NO.   : 6,263,089 B1
DATED        : July 17, 2001
INVENTOR(S)  : Kazuhiro Otsuka et al.

It is certified that error appears in the above-identified patent and that said Letters Patent is hereby corrected as shown below:

Title page,
ABSTRACT,
Line 3, change "time-sequentially arranged with respect to time" to -- time-sequentially arranged --.

Column 2,
Line 24, correct "referred" to -- referred to --.
Line 48, correct "air photograph and sandstone" to -- aerial photograph --.

Column 24,
Line 11, correct "$\alpha \approx \alpha, \beta \approx \beta_i \}$" to -- $\alpha \neq \alpha, \beta \neq \beta_i \}$ --.

Column 28,
Line 5, insert $$f_1 = [\max_{\theta, \varphi} S_N(\theta, \varphi)]/T_N \quad (25)$$
$$f_2 = [\max_{\theta, \varphi} S_N(\theta, \varphi) - T_N]/[\max_{\theta, \varphi} S_N(\theta, \varphi)] \quad (26)$$
$$f_3 = W_N \quad (27)$$
$$f_4 = [\max_{\theta, \varphi} S_N(\theta, \varphi)]/W_N \quad (28)$$

Column 33,
Line 59, change "CC" to -- $\overline{CC}$ --.

Column 40,
Line 41, change "(e)" to -- (f) --.
Line 46, change "(f)" to -- (g) --.
Line 49, change "(e)" to -- (e) --.
Line 50, change "(g)" to -- (h) --.

UNITED STATES PATENT AND TRADEMARK OFFICE
CERTIFICATE OF CORRECTION

PATENT NO. : 6,263,089 B1
DATED : July 17, 2001
INVENTOR(S) : Kazuhiro Otsuka et al.

It is certified that error appears in the above-identified patent and that said Letters Patent is hereby corrected as shown below:

Column 42,
Line 2, change "corresponding estimated" to -- corresponding to estimated --.

Signed and Sealed this

Twentieth Day of August, 2002

Attest:

JAMES E. ROGAN
*Attesting Officer*     *Director of the United States Patent and Trademark Office*